(12) United States Patent
Herman et al.

(10) Patent No.: US 7,964,009 B2
(45) Date of Patent: Jun. 21, 2011

(54) INERTIAL GAS-LIQUID SEPARATOR WITH AXIALLY VARIABLE ORIFICE AREA

(75) Inventors: Peter K. Herman, Stoughton, WI (US); Scott P. Heckel, Stoughton, WI (US); Michael J. Connor, Stoughton, WI (US); Christopher E. Holm, Madison, WI (US); Chirag D. Parikh, Madison, WI (US); Bradley A. Smith, Madison, WI (US); Glen B. Schneider, Evansville, WI (US); Ashwin K. Koleshwar, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 290 days.

(21) Appl. No.: 12/410,111

(22) Filed: Mar. 24, 2009

(65) Prior Publication Data

US 2010/0101425 A1    Apr. 29, 2010

Related U.S. Application Data

(63) Continuation-in-part of application No. 11/622,051, filed on Jan. 11, 2007, now Pat. No. 7,648,543, and a continuation-in-part of application No. 12/183,232, filed on Jul. 31, 2008, now Pat. No. 7,828,865, said application No. 11/622,051 is a continuation-in-part of application No. 11/168,688, filed on Jun. 28, 2005, now Pat. No. 7,473,291, which is a continuation-in-part of application No. 10/946,603, filed on Sep. 21, 2004, now Pat. No. 7,238,216.

(51) Int. Cl.
*B01D 51/00* (2006.01)
(52) U.S. Cl. .......... 55/418; 55/462; 55/465; 55/DIG. 19
(58) Field of Classification Search .................... 55/418, 55/462, 465, DIG. 19
See application file for complete search history.

(56) References Cited

U.S. PATENT DOCUMENTS

| | | | |
|---|---|---|---|
| 3,872,012 | A | 3/1975 | Endicott |
| 4,026,122 | A | 5/1977 | Kuhn et al. |
| 4,711,207 | A | 12/1987 | Bonvallet |
| 4,993,517 | A | 2/1991 | Leipelt et al. |
| 5,205,848 | A | 4/1993 | Blanc et al. |
| 5,564,401 | A | 10/1996 | Dickson |
| 6,247,463 | B1 | 6/2001 | Fedorowicz et al. |

(Continued)

FOREIGN PATENT DOCUMENTS

DE    1544126    6/1969
(Continued)

OTHER PUBLICATIONS

Highly Efficient Oil Separation Systems for Minimised Oil Carry Over, MTZ Apr. 2008, vol. 69, pp. 32-37.

*Primary Examiner* — Robert A Hopkins
(74) *Attorney, Agent, or Firm* — Andrus, Sceales, Starke & Sawall, LLP; J. Bruce Schelkopf

(57) ABSTRACT

An inertial gas-liquid separator removes liquid particles from a gas-liquid stream and has a variable orifice area variable along an axial direction and dependent upon axial movement of a plunger relative to a housing sleeve.

41 Claims, 38 Drawing Sheets

U.S. PATENT DOCUMENTS

| | | |
|---|---|---|
| 6,279,556 B1 | 8/2001 | Busen et al. |
| 6,290,738 B1 | 9/2001 | Holm |
| 6,354,283 B1 | 3/2002 | Hawkins et al. |
| 6,478,018 B2 | 11/2002 | Fedorowicz et al. |
| 6,478,019 B2 | 11/2002 | Fedorowicz et al. |
| 6,505,615 B2 | 1/2003 | Pietschner |
| 6,626,163 B1 | 9/2003 | Busen et al. |
| 6,684,864 B1 | 2/2004 | Busen et al. |
| 6,797,040 B2 * | 9/2004 | Lenzing .................. 95/267 |
| 7,080,636 B2 | 7/2006 | Knaus et al. |
| 7,185,643 B2 | 3/2007 | Gronberg et al. |
| 7,238,216 B2 | 7/2007 | Malgorn |
| 7,406,960 B2 | 8/2008 | Knauf |
| 7,473,291 B2 | 1/2009 | Evenstad et al. |
| 2007/0256566 A1 | 11/2007 | Faber et al. |
| 2008/0179236 A1 | 7/2008 | Wieczorek et al. |
| 2008/0264018 A1 | 10/2008 | Herman |
| 2008/0276580 A1 | 11/2008 | Knauf et al. |
| 2009/0050121 A1 | 2/2009 | Holzmann et al. |
| 2009/0100811 A1 | 4/2009 | Scheckel et al. |
| 2009/0120854 A1 | 5/2009 | Parikh et al. |

FOREIGN PATENT DOCUMENTS

| | | |
|---|---|---|
| DE | 102005042286 | 4/2007 |
| EP | 0754840 | 1/1997 |
| FR | 2852056 | 9/2004 |
| WO | WO-2007/000281 | 1/2007 |
| WO | WO-2007/028351 | 3/2007 |
| WO | WO-2007/137934 | 12/2007 |
| WO | WO-2007/138008 | 12/2007 |

* cited by examiner

US 7,964,009 B2

INERTIAL GAS-LIQUID SEPARATOR WITH AXIALLY VARIABLE ORIFICE AREA

CROSS-REFERENCE TO RELATED APPLICATIONS

This application is a continuation-in-part of U.S. patent application Ser. No. 11/622,051, filed Jan. 11, 2007, and a continuation-in-part of U.S. patent application Ser. No. 12/183,232, filed Jul. 31, 2008. The '051 application is a continuation-in-part of U.S. patent application Ser. No. 11/168,688 filed Jun. 28, 2005, and a continuation-in-part of U.S. patent application Ser. No. 10/946,603, filed Sep. 21, 2004, now U.S. Pat. No. 7,238,216, issued Jul. 3, 2007. The '688 application is a continuation-in-part of the '603 application.

BACKGROUND AND SUMMARY

The above noted parent applications relate to inertial gas-liquid impactor separators for removing and coalescing liquid particles from a gas-liquid stream including in engine crankcase ventilation separation applications, including closed crankcase ventilation (CCV) and open crankcase ventilation (OCV).

Inertial gas-liquid separators are known in the prior art. Liquid particles are removed from a gas-liquid stream by accelerating the stream or aerosol to high velocities through nozzles or orifices and directing same against an impactor, typically causing a sharp directional change, effecting with the noted liquid separation. Coalescing separators are also known in the prior art, wherein liquid particles are removed from the gas-liquid stream by coalescence. The noted separators, including inertial impactors and coalescers, have various uses, including in oil separation applications for blowby gases from the crankcase of an internal combustion engine.

The present invention arose during continuing development efforts in the above technology.

BRIEF DESCRIPTION OF THE DRAWINGS

Parent Applications

FIG. 1 is a schematic sectional illustration of an inertial gas-liquid impactor separator in accordance with the parent '603 application.

FIG. 2 is a sectional view taken along line 2-2 of FIG. 1.

FIG. 3 is a schematic perspective view of a portion of FIG. 1 but showing another embodiment.

FIG. 4 is a schematic perspective view of a portion of FIG. 1 but showing another embodiment.

FIG. 5 is a perspective elevational view of an inertial gas-liquid impactor separator incorporating the embodiment of FIG. 4.

FIG. 6 is a perspective view partially broken away of the construction of FIG. 5.

FIG. 7 is a perspective view partially broken away of the construction of FIG. 5.

FIG. 8 is an exploded perspective view of a portion of FIG. 5.

FIG. 9 is a sectional view of the construction of FIG. 5 showing a first position of the actuator.

FIG. 10 is like FIG. 9 and shows another position of the actuator.

FIG. 11 is a schematic perspective view of a portion of FIG. 1 but showing another embodiment.

FIG. 12 is a schematic illustration of a portion of another inertial gas-liquid impactor separator in accordance with the parent '603 application.

FIG. 13 is a sectional view of an inertial gas-liquid impactor separator incorporating the embodiment of FIG. 12.

FIG. 14 is like FIG. 13 and shows another position of the actuator.

FIG. 15 is a sectional view of the construction of FIG. 13.

FIG. 16 is a perspective view of the construction of FIG. 13.

FIG. 17 is an exploded perspective view of the construction of FIG. 16.

FIG. 18 is another exploded perspective view of the construction of FIG. 16.

FIG. 19 is a schematic perspective view of a portion of another inertial gas-liquid impactor separator in accordance with the parent '603 application.

FIG. 20 is a sectional view of another embodiment of an inertial gas-liquid impactor separator in accordance with the parent '603 application.

FIG. 21 is a top elevation view taken along line 21-21 of FIG. 20.

FIG. 22 is an enlarged view of a portion of FIG. 20.

FIG. 23 is a schematic sectional view of an inertial gas-liquid separator in accordance with the parent '688 application.

FIG. 24 is like FIG. 23 and shows another embodiment.

FIG. 25 is like FIG. 23 and shows another embodiment.

FIG. 26 is like FIG. 23 and shows another embodiment.

FIG. 27 is schematic sectional illustration of an inertial gas-liquid impactor separator in accordance with the '051 application.

FIG. 28 is like FIG. 27 and shows a further operational condition.

FIG. 29 is an enlarged view of a portion of FIG. 27.

FIG. 30 is a sectional view taken along line 30-30 of FIG. 29.

FIG. 31 is a perspective view from below of the construction of FIG. 29.

FIG. 32 is a schematic sectional illustration of another embodiment of an inertial gas-liquid impactor separator.

FIG. 33 is like FIG. 32 and shows a further embodiment.

FIG. 34 is like FIG. 32 and shows a further embodiment.

FIG. 35 is an end elevation view of the device of FIG. 34.

FIG. 36 is a perspective view of a component of FIG. 32.

FIG. 37 is like FIG. 32 and shows a further embodiment.

Present Application

Figure 38:
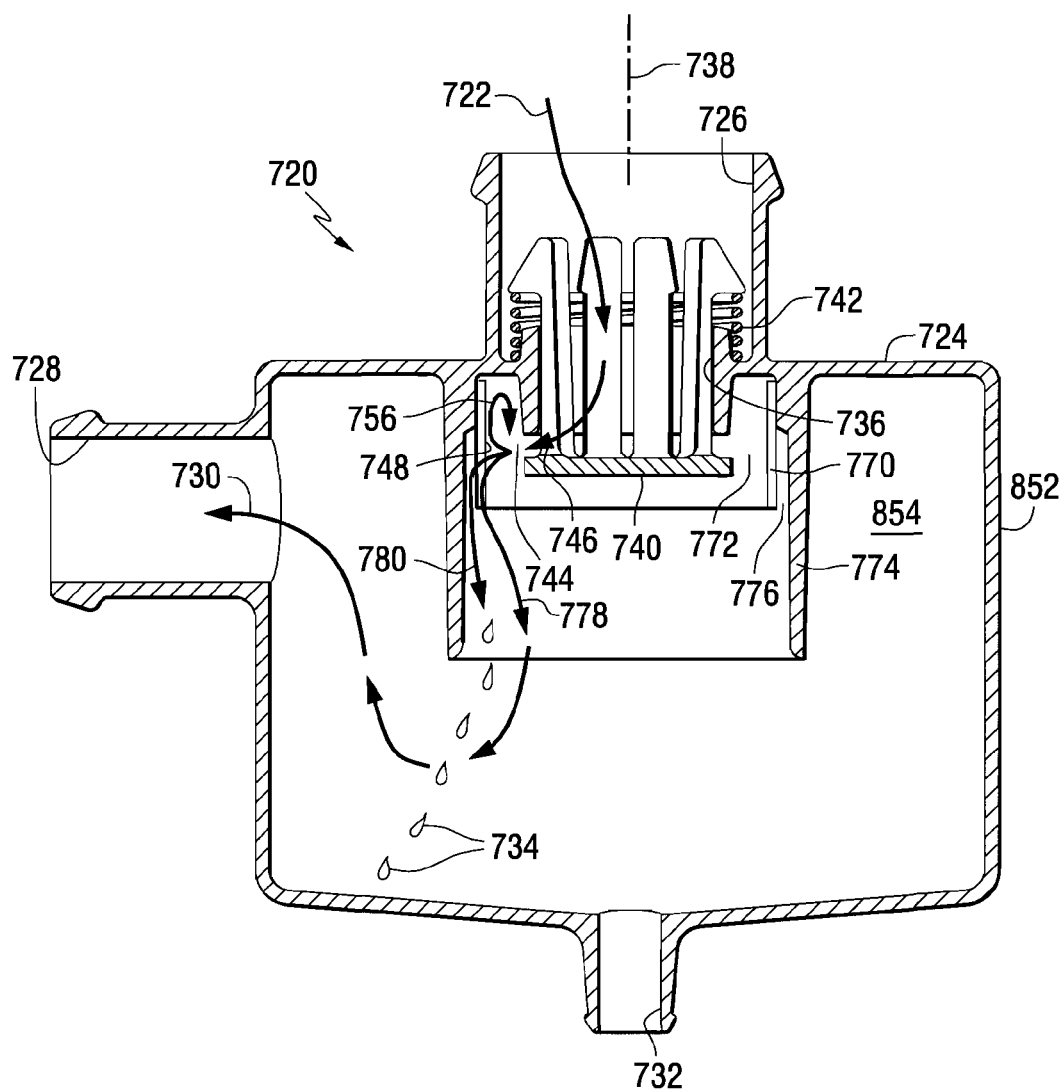
Figure 39:
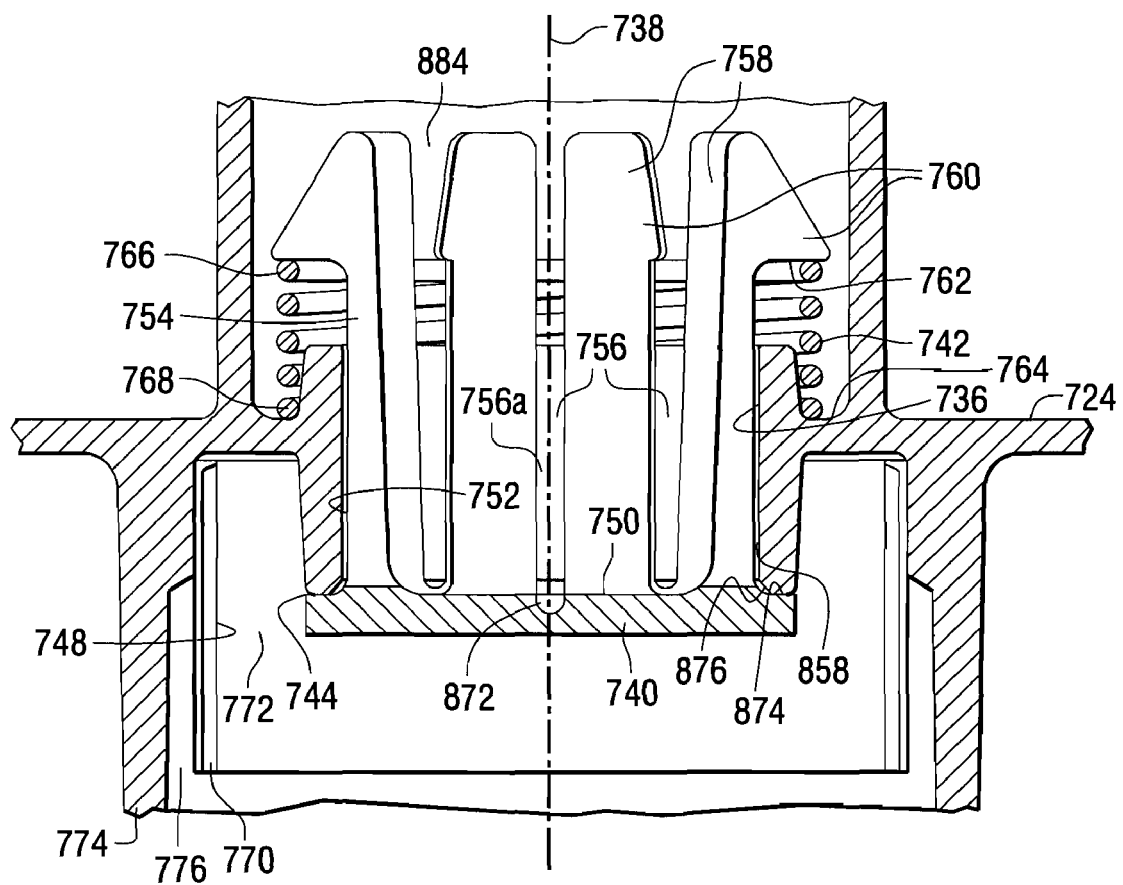

FIG. 38 is a schematic illustration of an inertial gas-liquid impactor separator in accordance with the invention FIG. 39 is an enlarged view of a portion of FIG. 38 and showing a further operational condition.

Figure 40:
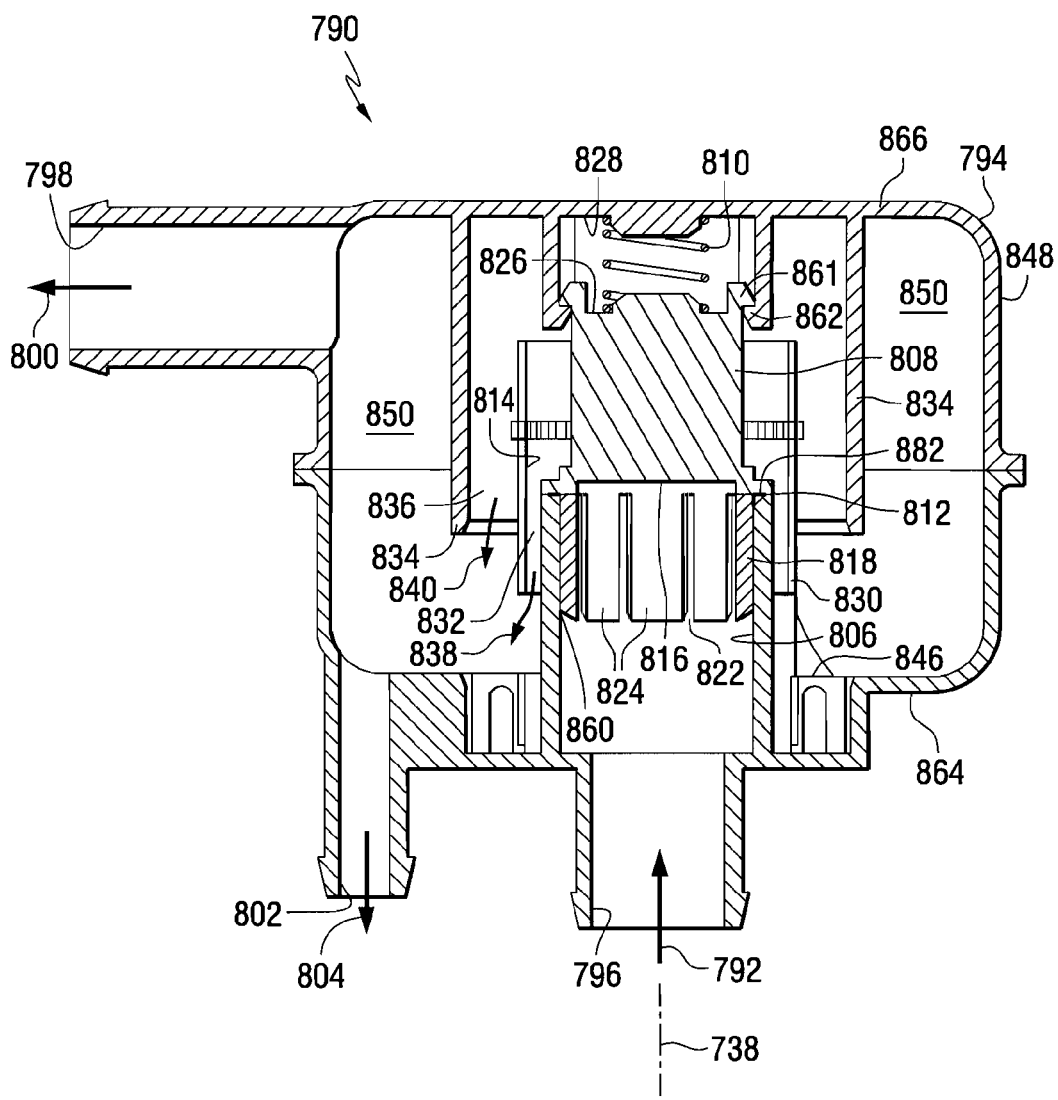

FIG. 40 is like FIG. 38 and shows another embodiment.

Figure 41:
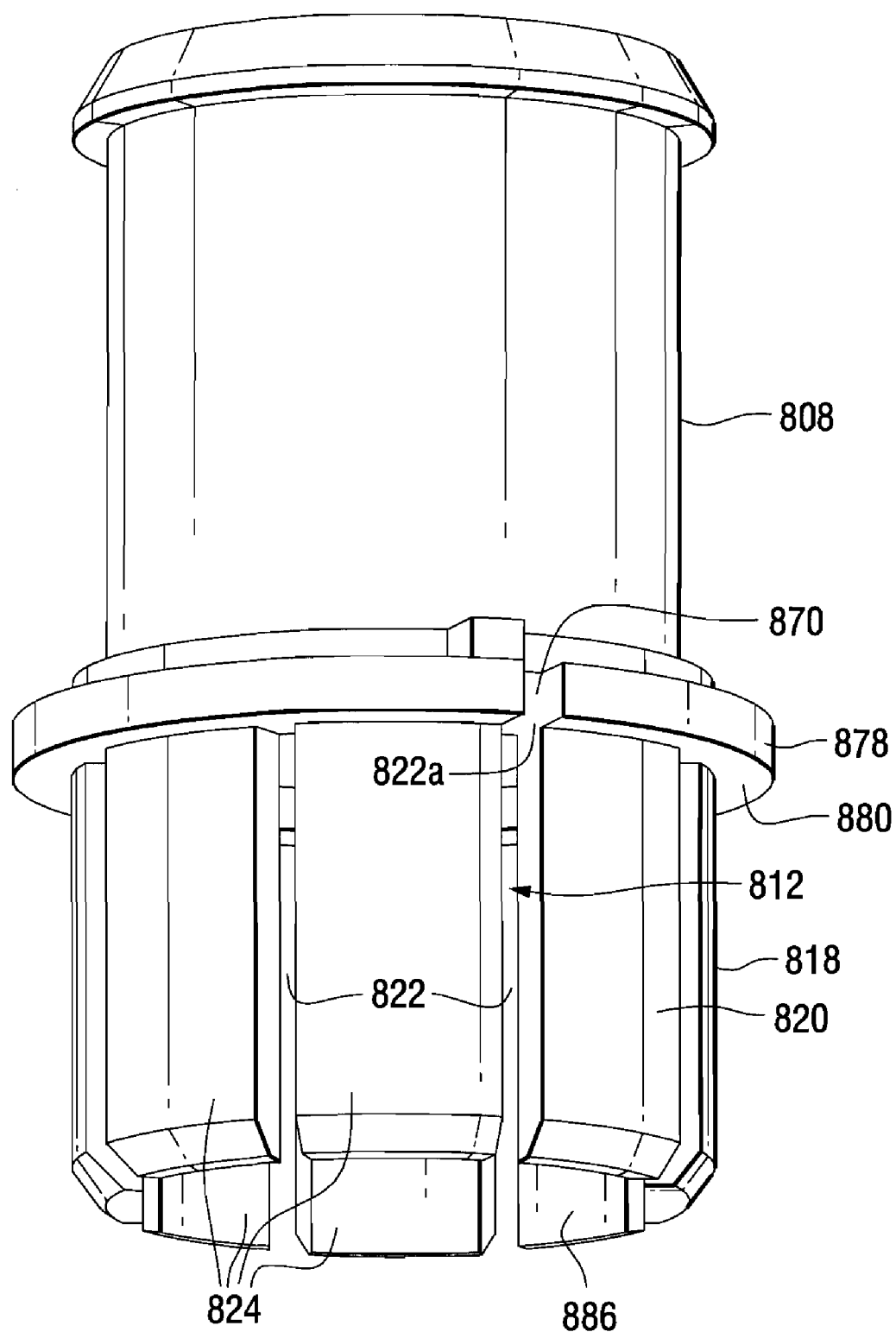

FIG. 41 is a perspective view of a component of FIG. 40.

Figure 42:
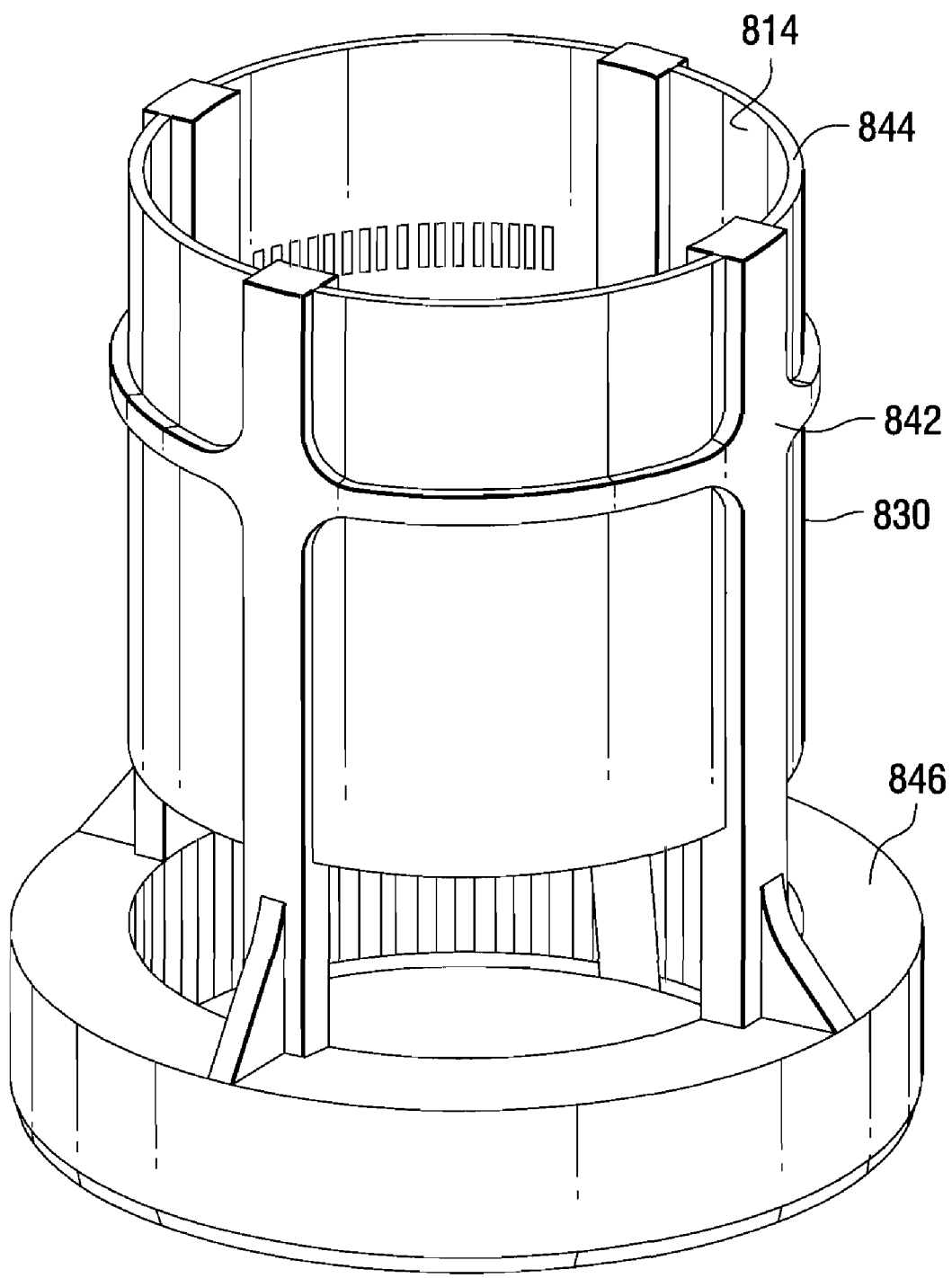

FIG. 42 is a perspective view of another component of FIG. 40.

Figure 43:
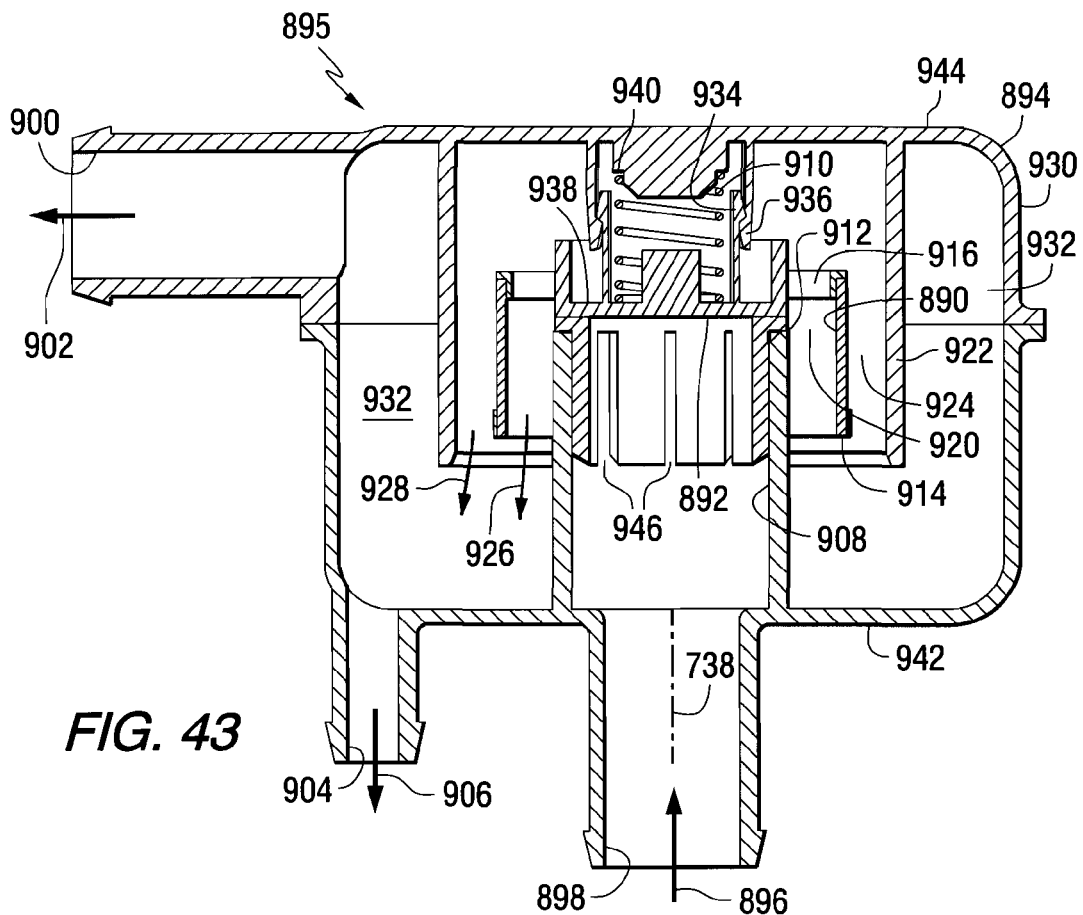

FIG. 43 is like FIG. 40 and shows another embodiment.

Figure 44:
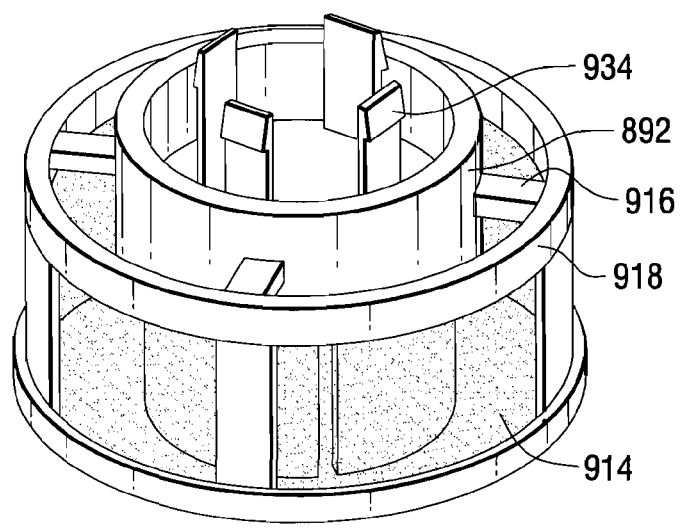

FIG. 44 is a perspective view of a component of FIG. 43.

Figure 45:
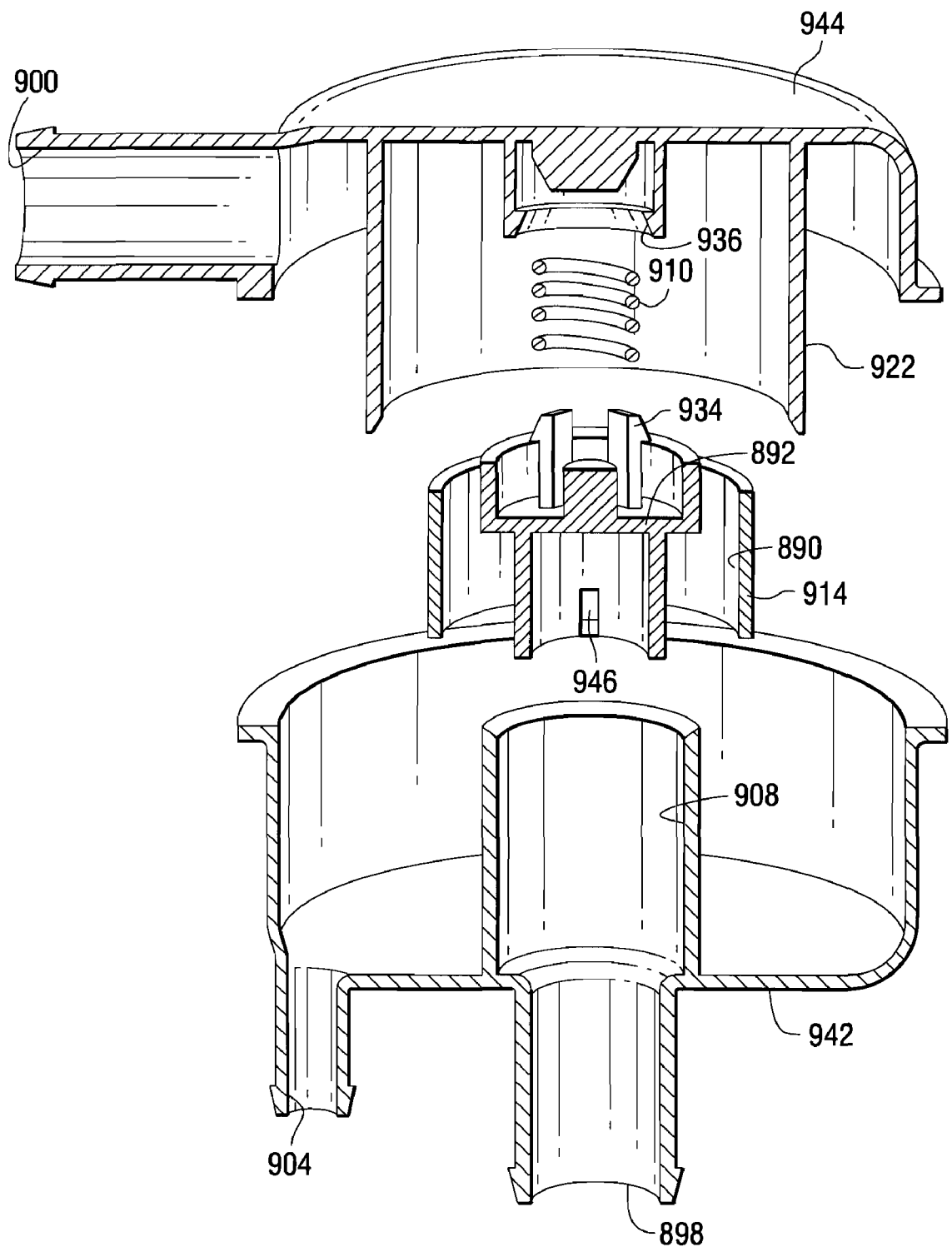

FIG. 45 is an exploded perspective view of the assembly of FIG. 43.

Figure 46:
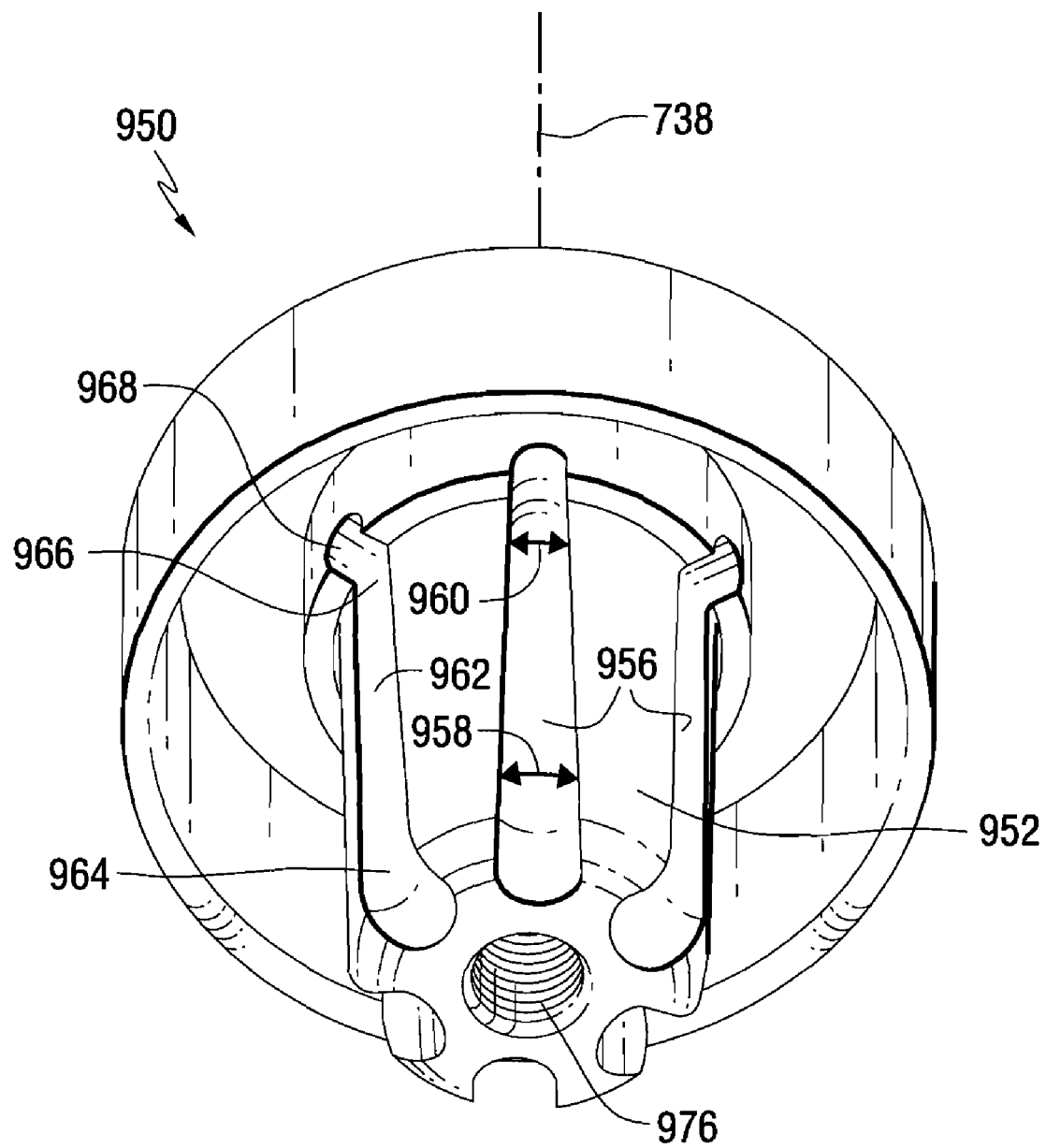

FIG. 46 is a perspective view of component in accordance with another embodiment.

Figure 47:
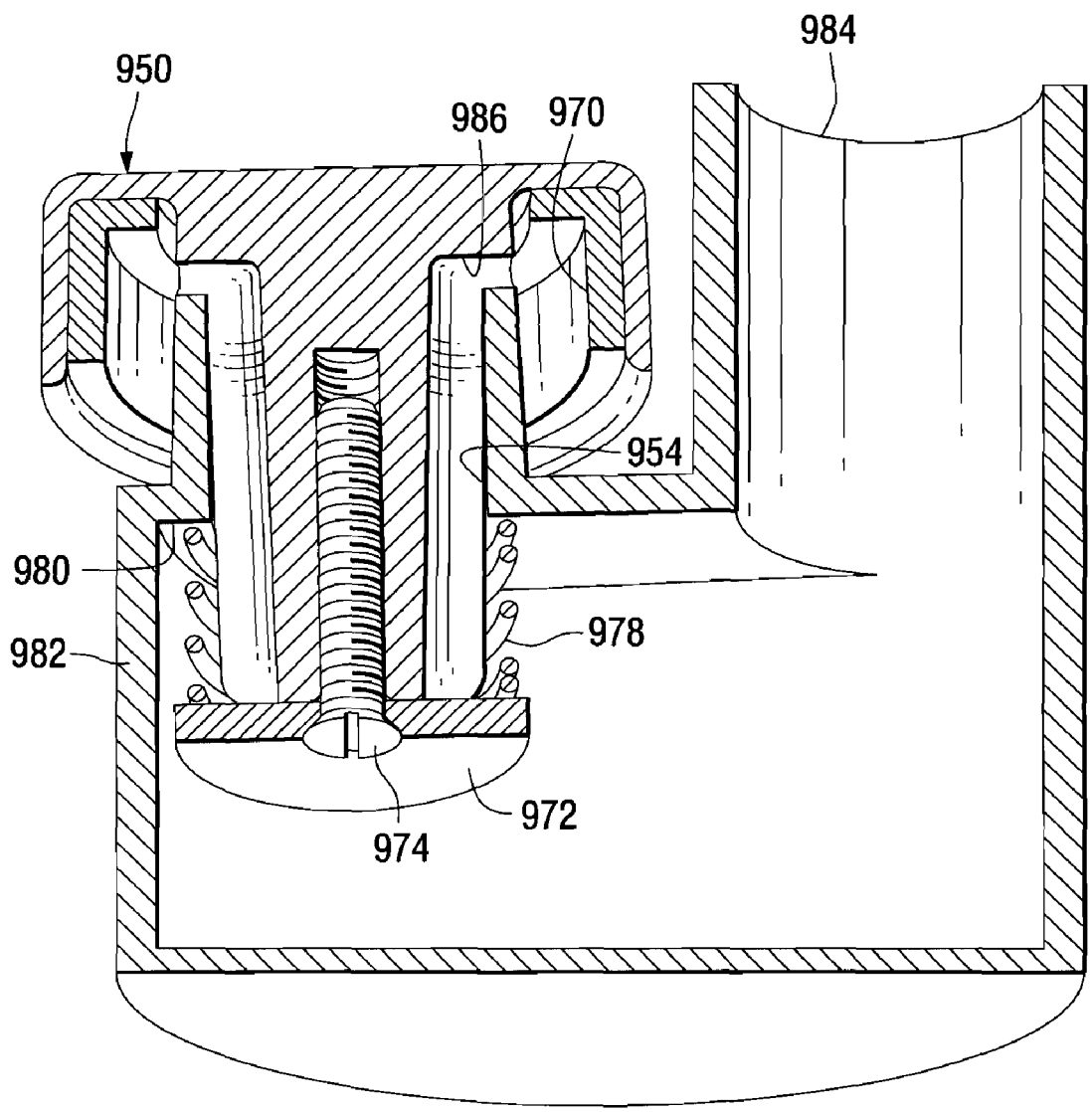

FIG. 47 is a view like FIG. 38 and using the component of FIG. 46.

DETAILED DESCRIPTION

Parent Application

The following description of FIGS. 1-37 is taken from the above noted '051 application, including the description of FIGS. 1-26 taken from the above noted parent '063 and '688 applications.

Figure 1:
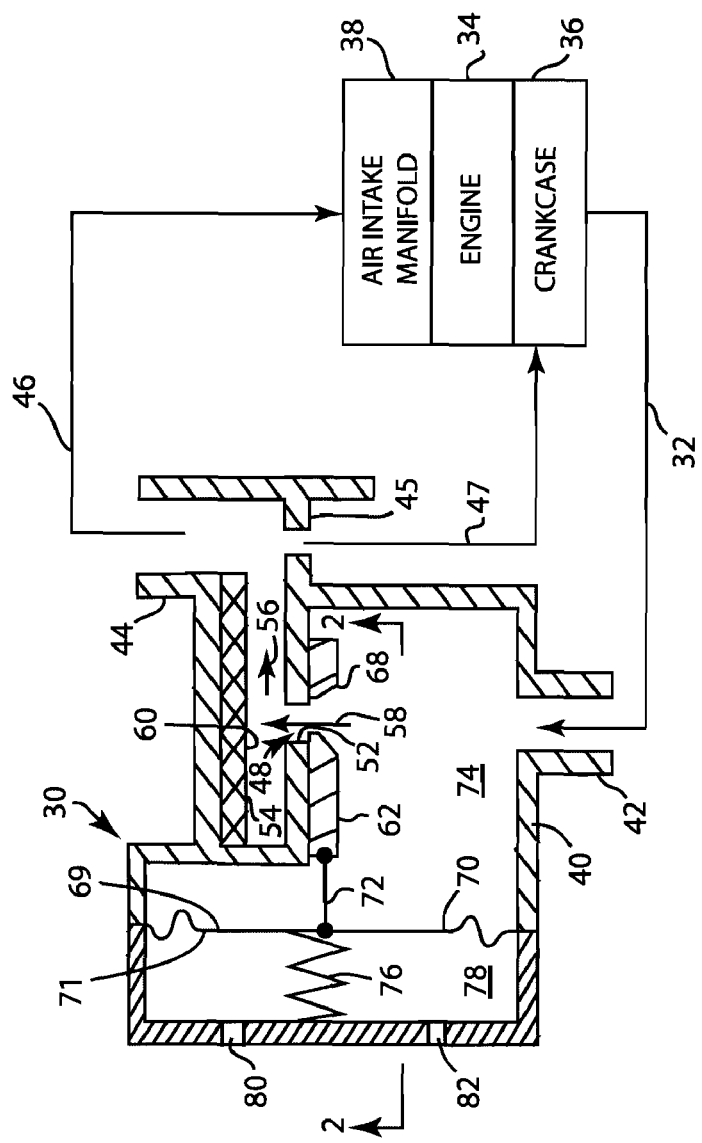

FIG. 1 shows an inertial gas-liquid impactor separator 30 for coalescing and removing liquid particles from a gas-liquid stream 32, shown in an exemplary crankcase ventilation separation application for an internal combustion engine 34. In such application, it is desired to vent blow-by gases from crankcase 36 of engine 34. Untreated, these gases contain particulate matter in the form of oil mist and soot. It is desirable to control the concentration of the contaminants, especially if the blow-by gases are to be recirculated back to the engine's air intake system, for example at air intake manifold 38. The oil mist droplets are generally less than 5µ in diameter, and hence are difficult to remove using conventional fibrous filter media while at the same time maintaining low flow resistance as the media collects and becomes saturated with oil and contaminants.

Separator 30 includes a housing 40 having an inlet 42 for receiving gas-liquid stream 32 from engine crankcase 36, an outlet 44 for discharging a gas stream 46 to air intake manifold 38, and a drain 45 draining separated fluid at 47 from impactor collector 54 and returning collected oil droplets at 47 to crankcase 36. Nozzle structure 48 in the housing has a plurality of nozzles provided by orifices such as 50, 52, FIGS. 1, 2, receiving the gas-liquid stream at 58 from inlet 42 and accelerating the gas-liquid stream through nozzles 50, 52. The plurality of nozzles provides a cumulative flow in parallel therethrough. An inertial impactor collector 54 in the housing is in the path of the accelerated gas-liquid stream at 58 and causes liquid particle separation by a sharp directional change as shown at 56. In the preferred embodiment, impactor collector 54 has a rough porous collection or impingement surface 60 causing liquid particle separation from the gas-liquid stream, and is like that shown in U.S. Pat. No. 6,290,738, incorporated herein by reference. Nozzle orifices 50, 52 may have a venturi or frustoconical shape as in the incorporated '738 patent.

Figure 2:
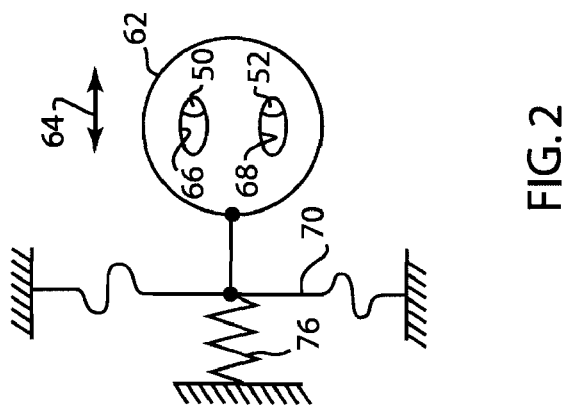
FIGS. 1-37 are taken from the noted parent '051 application, including FIGS. 1-22 taken from the noted parent '603 application, and FIGS. 23-26 taken from the noted parent '688 application.

A variable flow actuator 62 varies the cumulative flow through the plurality of nozzles in response to a given parameter. In one desirable embodiment, cumulative flow velocity is varied, though other flow characteristics may be varied. The gas-liquid stream flows axially along an axial flow direction at 58 through orifices 50, 52. Actuator 62 is movable along a given direction relative to the orifices to vary the noted cumulative flow. In one embodiment, actuator 62 is movable along the noted given direction relative to the orifices to vary the total area and hence the resultant flow velocity. In FIGS. 1, 2, actuator 62 is a disc or plate movable across one or more of the orifices to change the cross-sectional area thereof transverse to axial flow direction 58. Disc 62 is movable as shown at arrow 64 left-right in FIGS. 1, 2, transversely to axial flow direction 58. In the embodiment of FIGS. 1, 2, disc 62 as a plurality of elongated slots or openings 66, 68 aligned with respective nozzle orifices 50, 52 and transversely slidable therealong to vary the size thereof available to axial flow therethrough, and hence to vary the cumulative flow area. In a further embodiment, one or more of nozzle orifices 50, 52 may be closed or opened during movement of disc 62, to thus vary the number of orifices available to axial flow therethrough, to thus vary the noted cumulative flow area. In a further embodiment, movement of actuator disc 62 varies both the size and number of the orifices, for example movement of actuator disc 62 back and forth along direction 64 may expand and restrict the orifices along a cross-sectional area thereof transverse to flow direction 58, to vary the size of the orifices, and movement of actuator disc 62 back and forth along direction 64 may open and close other of the orifices, to vary the number of orifices through which the gas-liquid stream flows.

In one embodiment, the noted parameter to which variable flow actuator 62 responds is pressure of the gas-liquid stream. Housing 40 includes a pressure sensor 70 in the form of a diaphragm or membrane coupled through link 72 to actuator 62 to actuate the latter to move left-right at 64 in FIGS. 1, 2. As the pressure of the gas-liquid stream increases, diaphragm 70 moves leftwardly in FIG. 1, which in preferred form increases the size of orifices 50, 52, etc. (increases the cross-sectional flow area thereof) and/or increases the number of orifices 50, 52, etc. open to flow therethrough. The increasing pressure of the gas-liquid flow stream in housing chamber 74 overcomes the bias spring 76 to cause leftward movement of diaphragm 70. If the gas-liquid flow pressure decreases, then biasing spring 76 moves actuator disc 62 rightwardly in FIG. 1, preferably to reduce the size and/or number of orifices 50, 52, etc. In this manner, a desired pressure differential ΔP (delta P) is maintained, eliminating the need to make compromises between minimum and maximum flow rates, engine sizes, changing conditions such as engine wear, speed, braking, etc. The variable flow actuator maximizes efficiency by adapting to different engine sizes, flow ratings, and changing conditions during engine operation, and overcomes prior trade-offs required in a fixed flow separator. In the embodiment of FIG. 1, housing chamber 78 on the opposite side of diaphragm 70 from chamber 74 is vented to atmosphere as at vent openings 80, 82, for referencing ΔP, though other reference pressures may be used.

Figure 3:
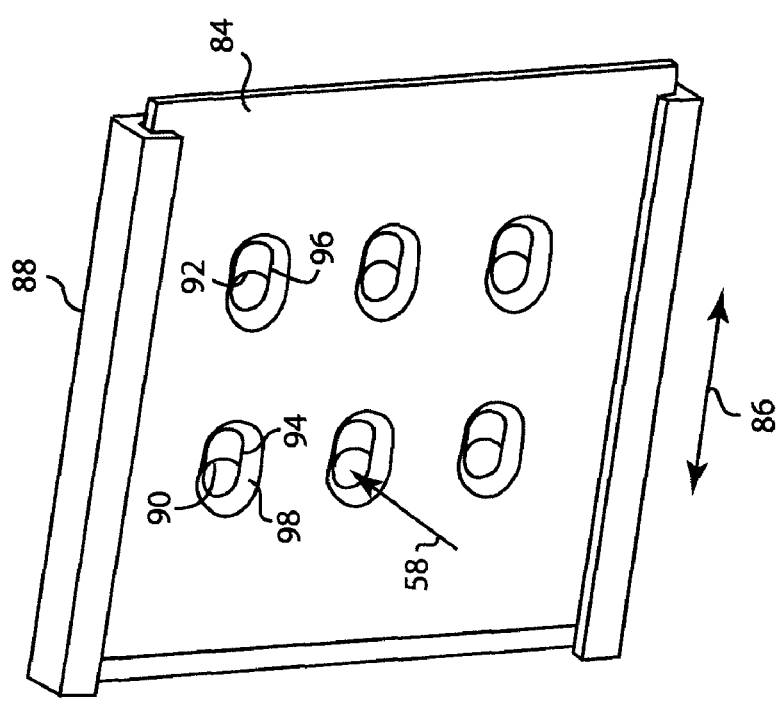
Figure 5:
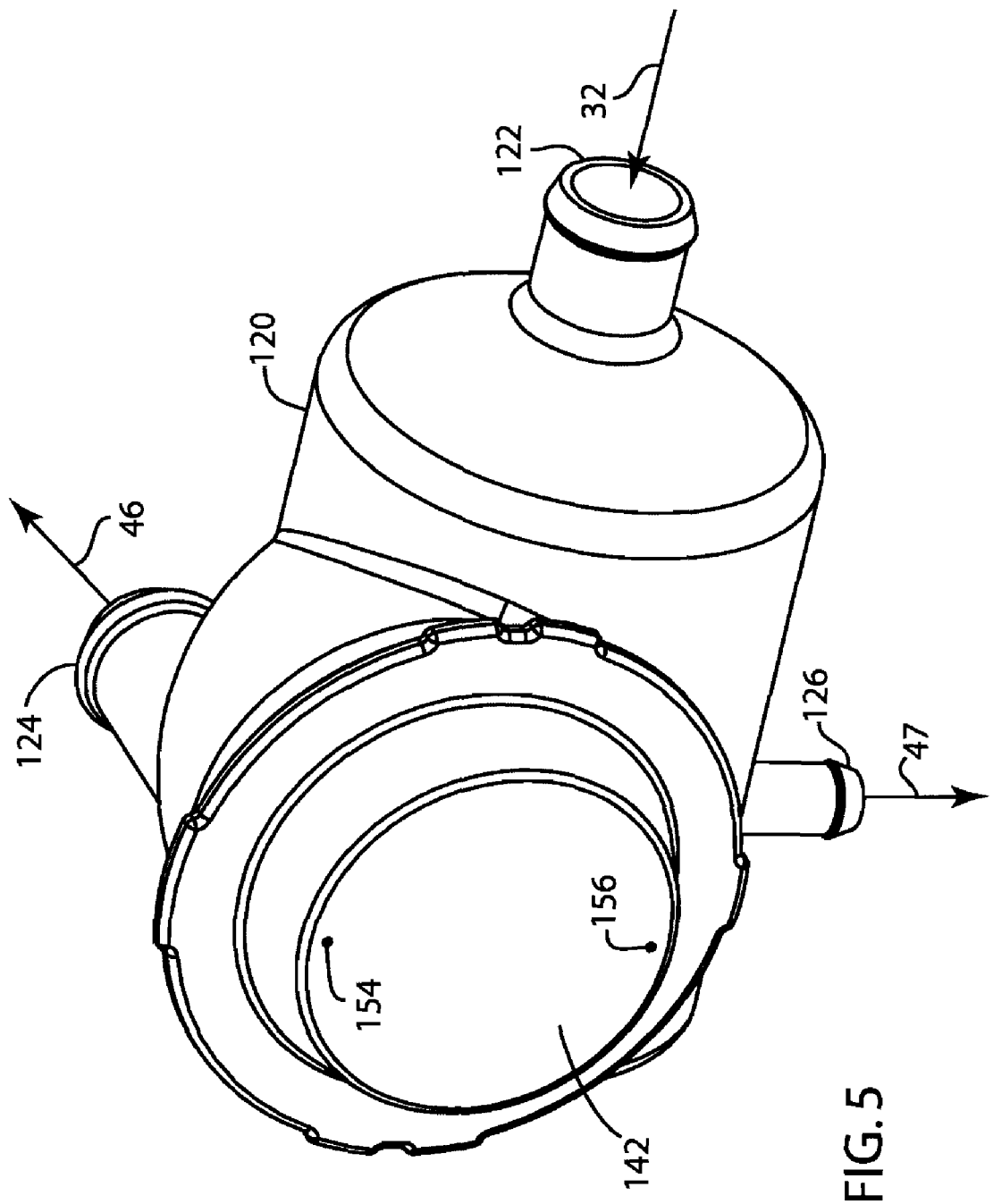
Figure 6:
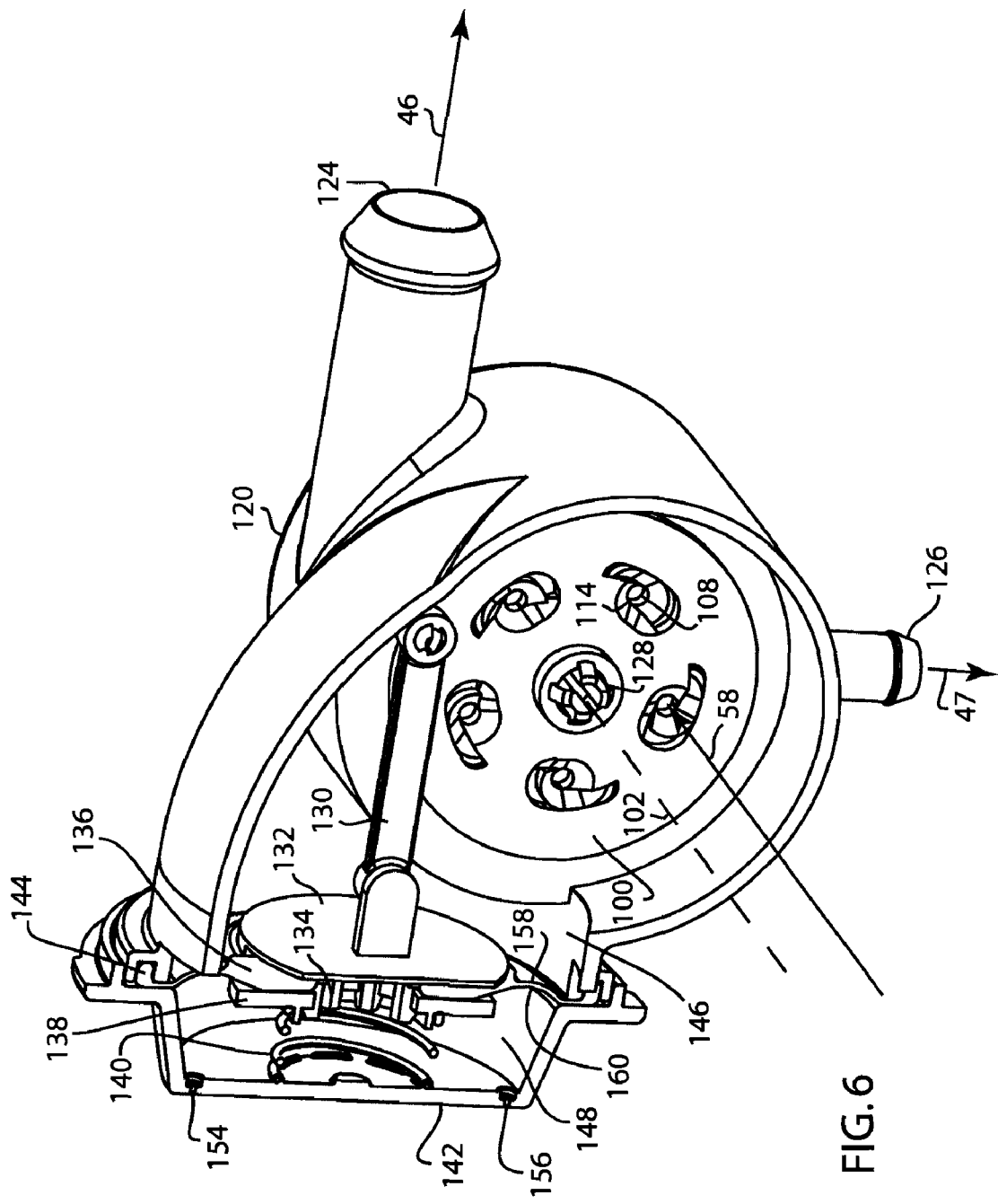
Figure 7:
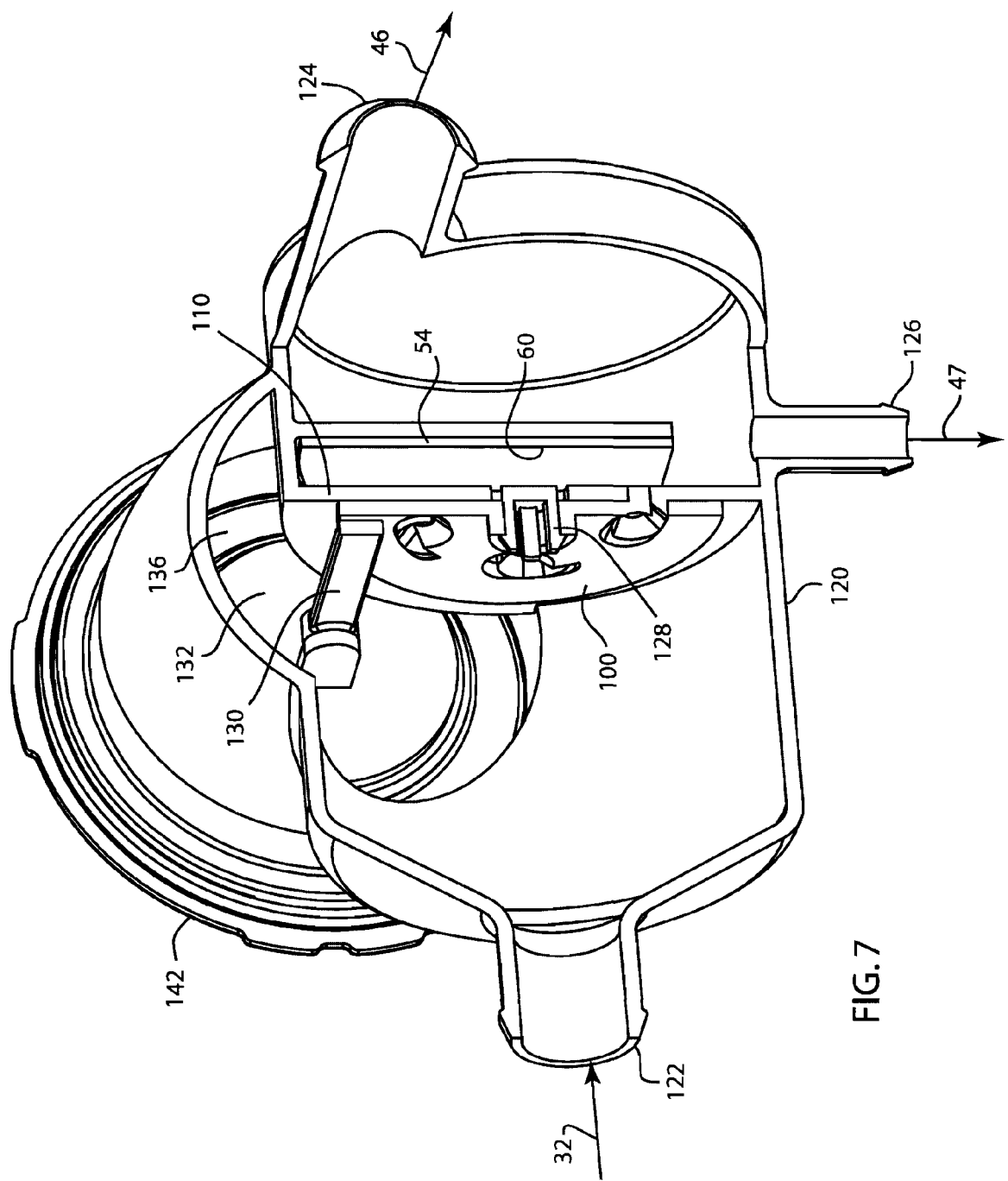
Figure 8:
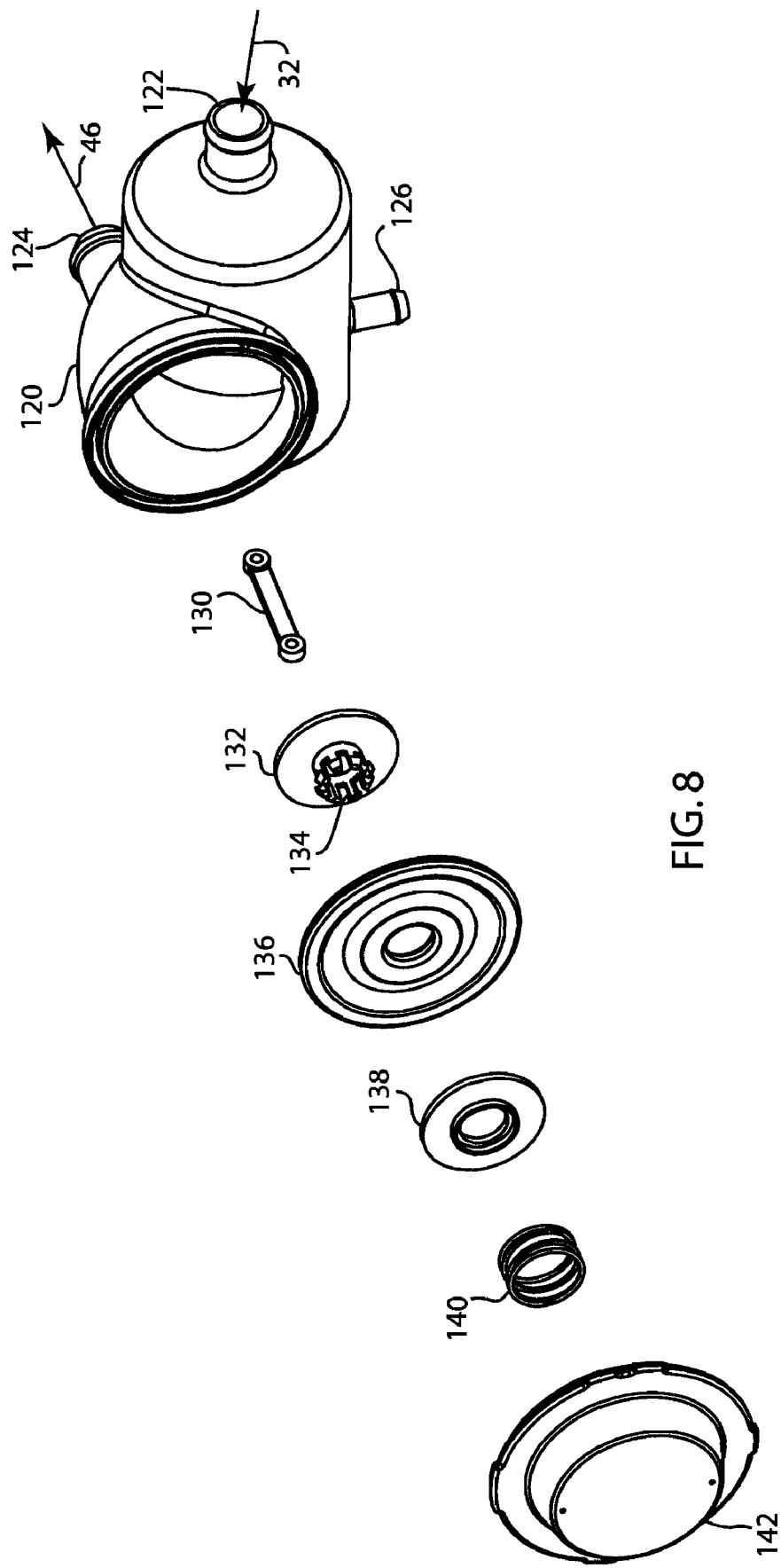

FIG. 3 shows a further embodiment having an actuator plate or disc 84 translationally slidable left-right as shown at arrow 86 along housing 88 to vary the size of nozzle orifices such as 90, 92, as elongated slots or openings 94, 96 of disc 84 moved therealong. Slots or openings 94, 96 may have a frustoconical taper 98 to enhance the noted venturi acceleration effect. As disc 84 moves leftwardly in FIG. 3, the size of venturi orifices 90, 92 increases, i.e. leftward movement of actuator disc 84 expands the size of orifices 90, 92 along a cross-sectional area thereof transverse to axial flow direction 58, to vary the size of the orifices. Rightward movement of actuator disc 84 restricts orifices 90, 92 along the cross-sectional area thereof transverse to axial flow direction 58. Alternatively, or additionally, leftward movement of actuator disc 84 may open additional orifices, and rightward movement of actuator disc 84 may close some orifices, to vary the number of orifices through which the gas-liquid stream flows.

Figure 4:
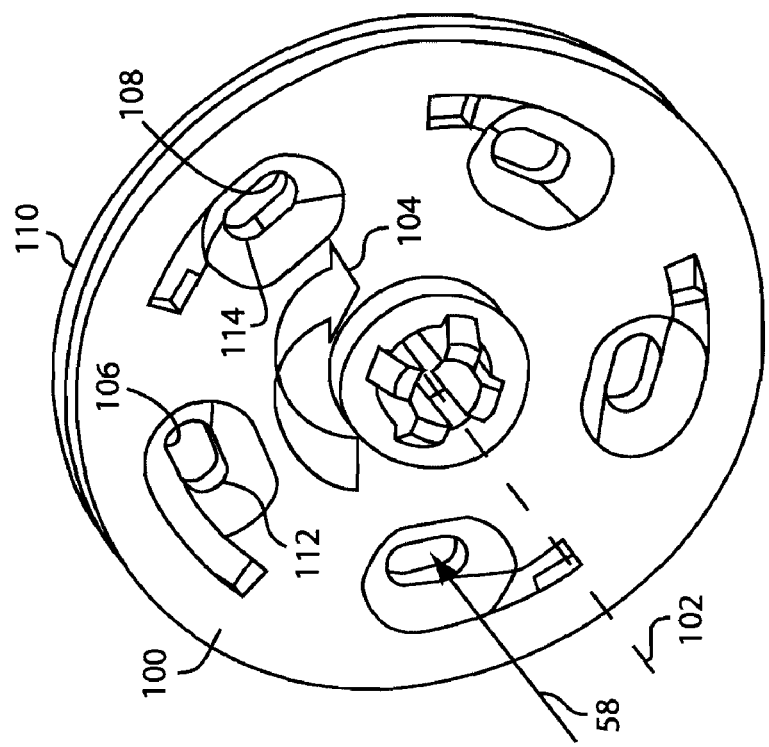

FIG. 4 shows another embodiment having an actuator disc 100 rotatable about a rotation axis 102 parallel to axial flow direction 58. Actuator disc 100 is rotatable clockwise as shown at arrow 104 about axis 102 to restrict and/or close one or more nozzle orifices 106, 108, etc., of housing wall 110, as slots 112, 114 in actuator disc 100 slide transversely thereacross.

FIGS. 5-10 show a preferred implementation of the embodiment of FIG. 4. Housing 120 has an inlet 122, comparable to inlet 42, FIG. 1, for receiving the gas-liquid stream 32, e.g. from crankcase 36. Housing 120 has an outlet 124, comparable to outlet 44, FIG. 1, for discharging gas stream 46, e.g. to air intake manifold 38. Housing 120 has a drain 126, comparable to drain 45, FIG. 1, draining separated fluid 47 from impactor collector 54, e.g. returning collected oil droplets at 47 to crankcase 36. Actuator disc 100 is rotationally mounted to housing spindle 128 to rotate about axis 102. Disc 100 is connected by link 130 to diaphragm plate 132 having legs 134 extending through diaphragm 136 and mounted on the opposite side to spring plate 138, such that diaphragm 136 is sandwiched between plates 132 and 138. Biasing spring 140 bears between spring plate 138 and closure cap 142 mounted to the housing and sealed thereto at perimeter 144 and providing a first chamber 146 on one side of the diaphragm, and a second chamber 148 on the other side of the diaphragm.

Figure 9:
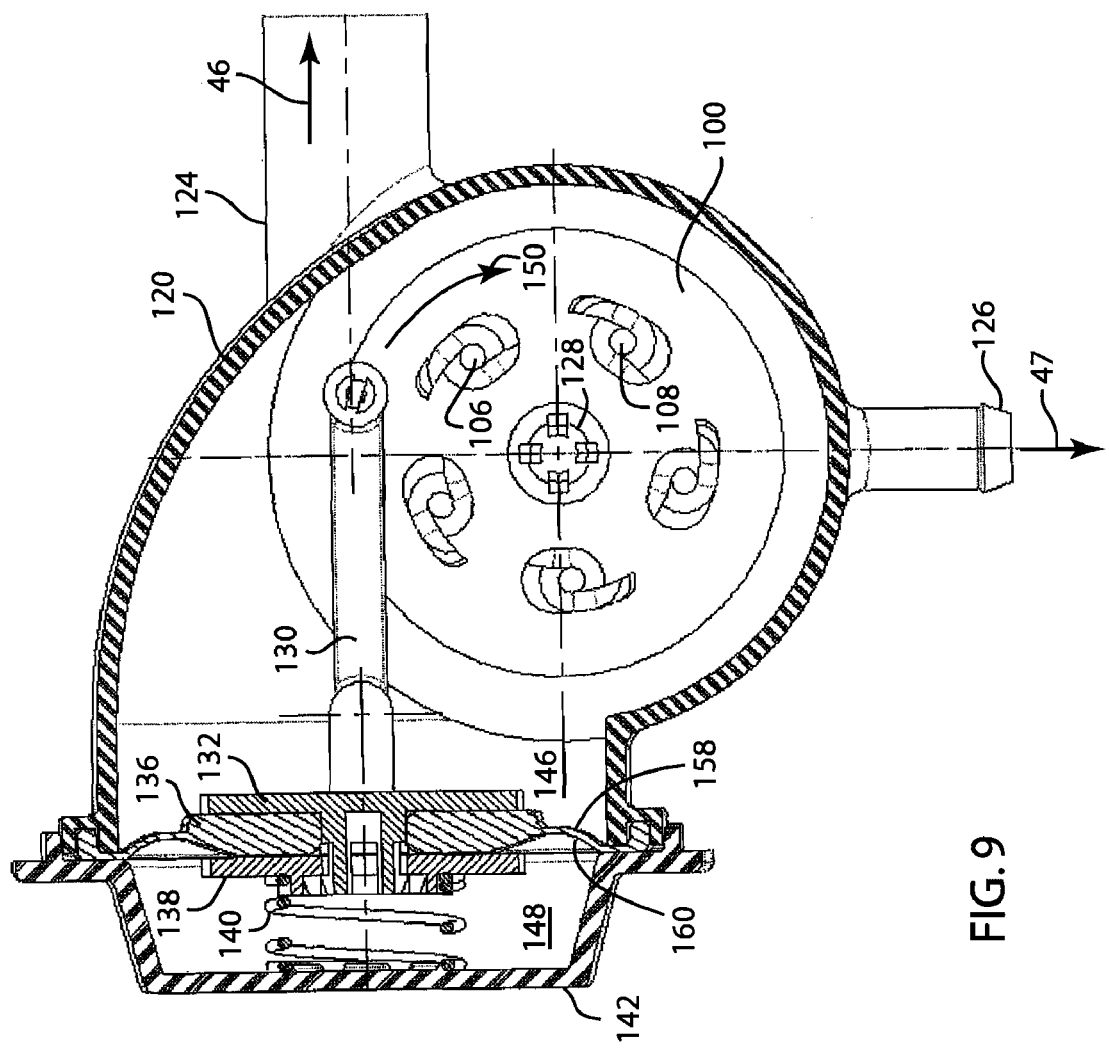
Figure 10:
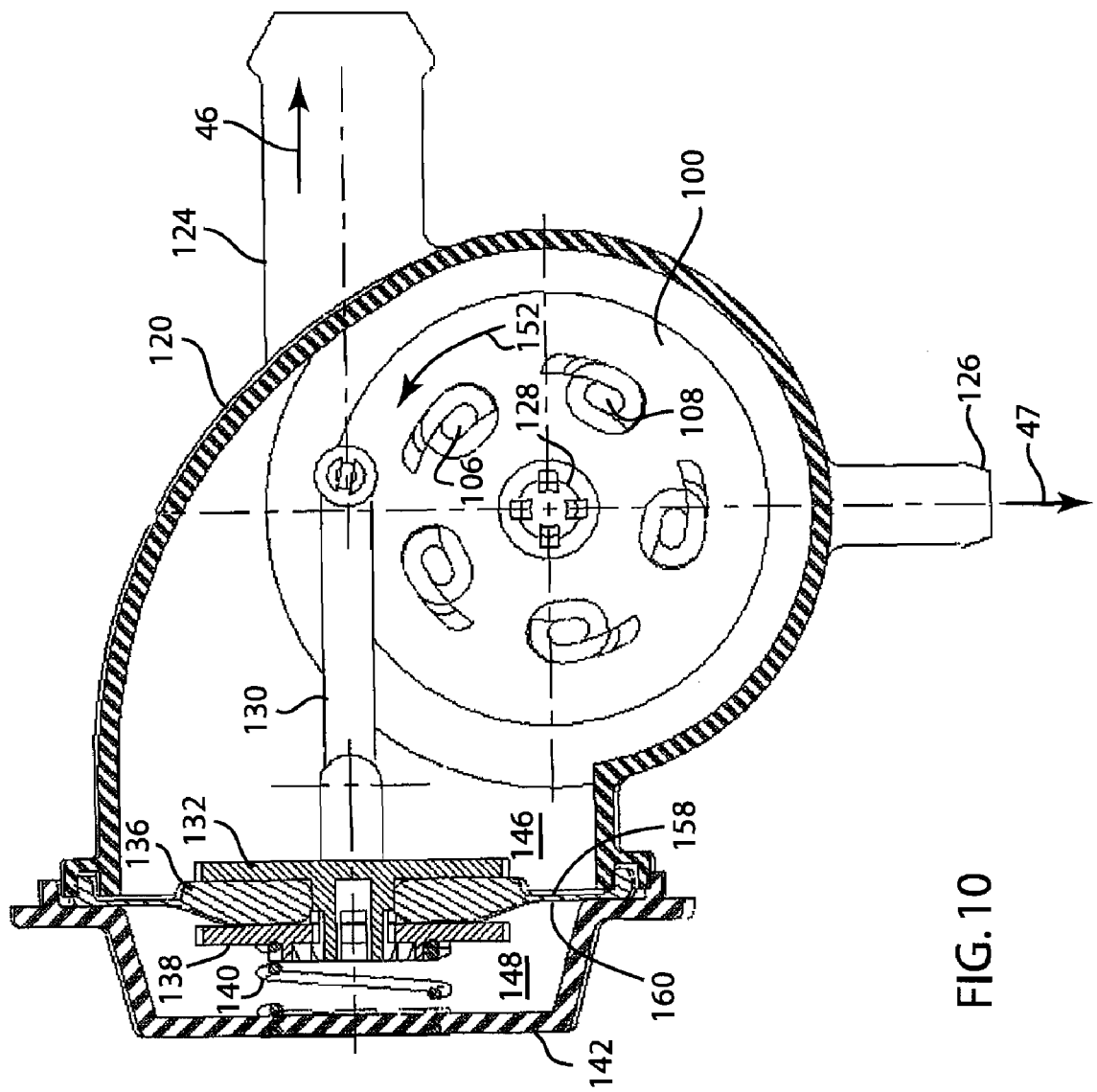

FIG. 9 shows a low pressure condition of the gas-liquid flow stream 32, with actuator disc 100 rotated clockwise as shown at arrow 150 to a first position minimizing cumulative flow through the plurality of nozzle orifices 106, 108, etc., for example restricting the size of one or more such orifices and/or closing one or more of such orifices. FIG. 10 shows a higher pressure condition of gas-liquid flow stream 32, with actuator disc 100 rotated counterclockwise as shown at arrow 152 to a second position maximizing cumulative flow through the plurality of nozzle orifices 106, 108, etc., e.g. by expanding one or more of such orifices and/or opening one or more of such orifices. The actuator has a plurality of positions between its minimum and maximum cumulative flow positions in response to pressure of the gas-liquid stream to maintain the pressure constant, i.e. maintain a constant ΔP relative to a given reference. The given reference may be atmospheric pressure, for example as provided by one or more vent openings 154, 156 in end cap 142 communicating with chamber 148.

In the embodiment of FIGS. 5-10, the noted pressure sensor is provided by diaphragm 136 having first and second opposite sides 158 and 160, with the first side 158 coupled through plate 132 and link 130 to actuator disc 100, comparably to diaphragm 70, FIG. 1, having first and second opposite sides 69 and 71, with first side 69 coupled through link 72 to actuator disc 62. One of the first and second sides of the diaphragm is exposed to pressure in the gas-liquid stream 32 to control movement of the actuator. In FIGS. 1 and 9, the noted first side 69, 158 of the respective diaphragm 70, 136 is exposed to pressure in the gas-liquid stream to control movement of the actuator. In other embodiments, to be described, the second side of the diaphragm is exposed to pressure in the gas-liquid stream to control movement of the actuator. In FIGS. 1-2 and 5-10, the biasing member 76, 140 is overcome by a given pressure in gas-liquid stream 32 in respective chamber 74, 146 on respective first side 69, 158 of respective diaphragm 70, 136.

Figure 11:
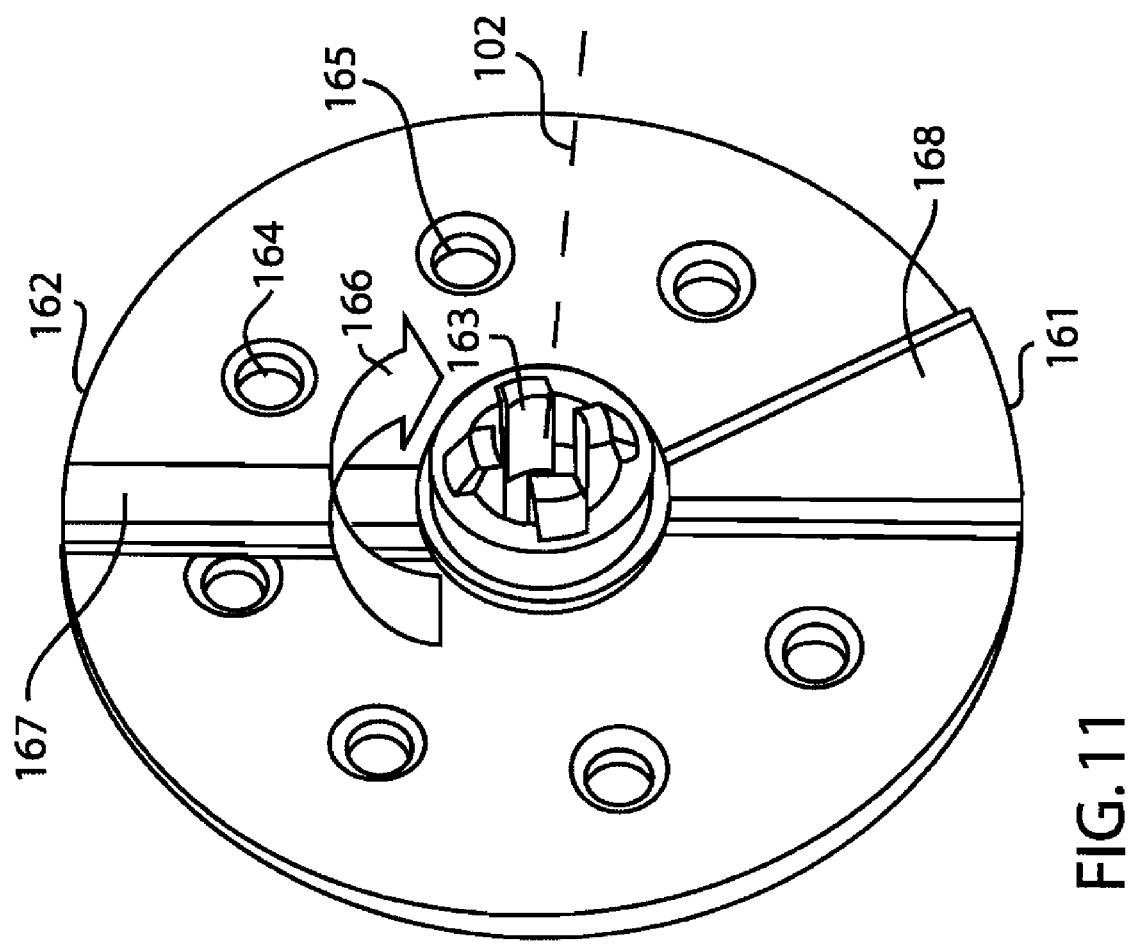

FIG. 11 shows another embodiment having an actuator disc 161 rotatable about rotation axis 102 parallel to axial flow direction 58. Actuator disc 161 is rotationally mounted on housing plate 162 at spindle 163 and is rotational to open or close one or more nozzle orifices such as 164, 165, etc. Upon rotation of disc 161 as shown at arrow 166, one or more radial arms 167, 168 of the disc, which may have differing arcuate lengths, open or close respective nozzle orifices, to thus vary the noted cumulative flow through the nozzle structure by varying the number of nozzle orifices available for flow therethrough.

Figure 12:
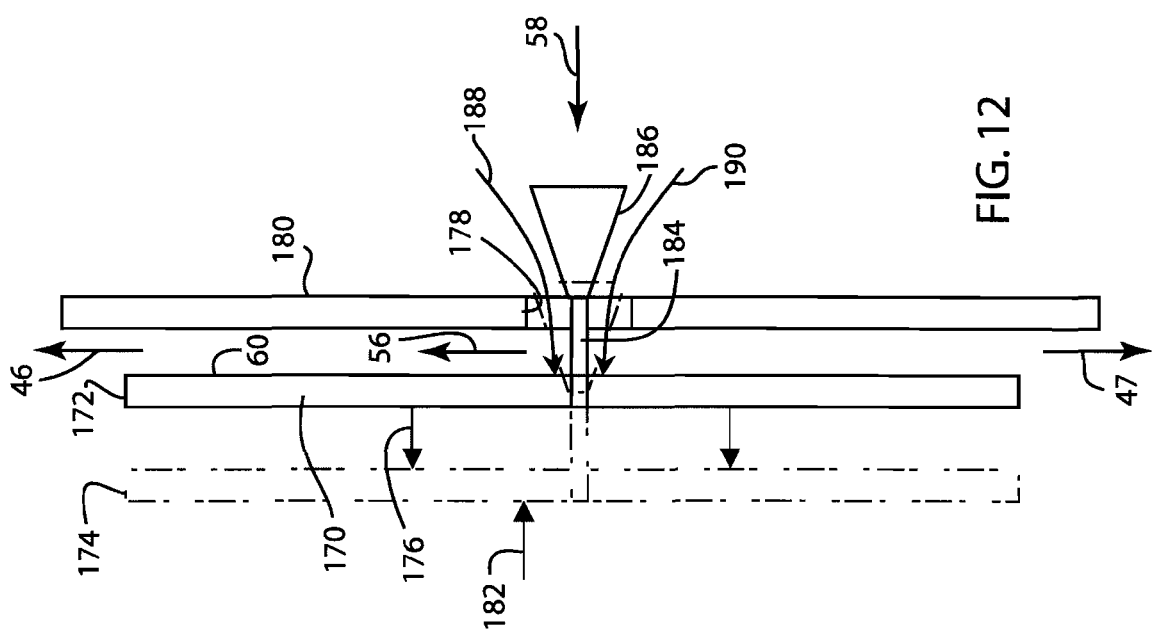

FIG. 12 shows another embodiment having an actuator disc 170 translational along a direction parallel to axial flow direction 58. Actuator 170 is movable from solid line position 172 to dashed line position 174 along arrow 176 in the same direction as axial flow direction 58 to decrease the noted cumulative flow of the gas-liquid stream by restricting or closing nozzle orifices such 178 in housing wall 180. Actuator 170 is movable from dashed line position 174 to solid line position 172 as shown at arrow 182 in the opposite direction to axial flow direction 58, to increase the noted cumulative flow. The actuator includes valve stems such as 184 having respective conically shaped valve heads such as 186 engageable with respective valve seats provided by the nozzle orifices such as 178. The valve head 186 is conically shaped along a taper which narrows toward a direction pointing in the same direction as axial flow direction 58. The valve seats may be conically shaped complementally to the valve heads. In an open valve condition as shown in solid line at 172, the gas-liquid stream flows as shown at 188, 190 through nozzle orifice 178 and strikes impaction surface 60, which may be the facing surface of actuator 170 or may be provided by an impactor collector such as 54 mounted thereto, causing liquid particle separation as above.

FIGS. 13-18 show a preferred implementation of the embodiment of FIG. 12. Housing 200 has an inlet 202, comparable to inlet 42, FIG. 1, for receiving the gas-liquid stream 32, e.g. from crankcase 36. Housing 200 has an outlet 204, comparable to outlet 44, FIG. 1, for discharging gas stream 46, e.g. to air intake manifold 38. Housing 200 has a drain 206, comparable to drain 45, FIG. 1, draining separated fluid 47 from impactor collector 54, e.g. returning collected oil droplets at 47 to crankcase 36. Inner housing wall 180 has a plurality of nozzle orifices 178, 208, etc. Actuator disc 170 has a plurality of valve stems 184, 210, etc. having respective valve heads 186, 212, etc. opening and closing and/or restricting and expanding respective nozzle orifices 178, 208, etc. Actuator disc 170 is mounted on diaphragm 214 which is sealed at its periphery 216 in the housing. The housing includes a chamber 218 receiving the gas-liquid stream from inlet 202, a subchamber 220 between inner housing wall 180 and first side 222 of diaphragm 214, and a chamber 224 on the second side 226 of the diaphragm. The housing is closed by a first closure cap 228 enclosing chamber 218, and a second closure cap 230 enclosing chamber 224.

Figure 13:
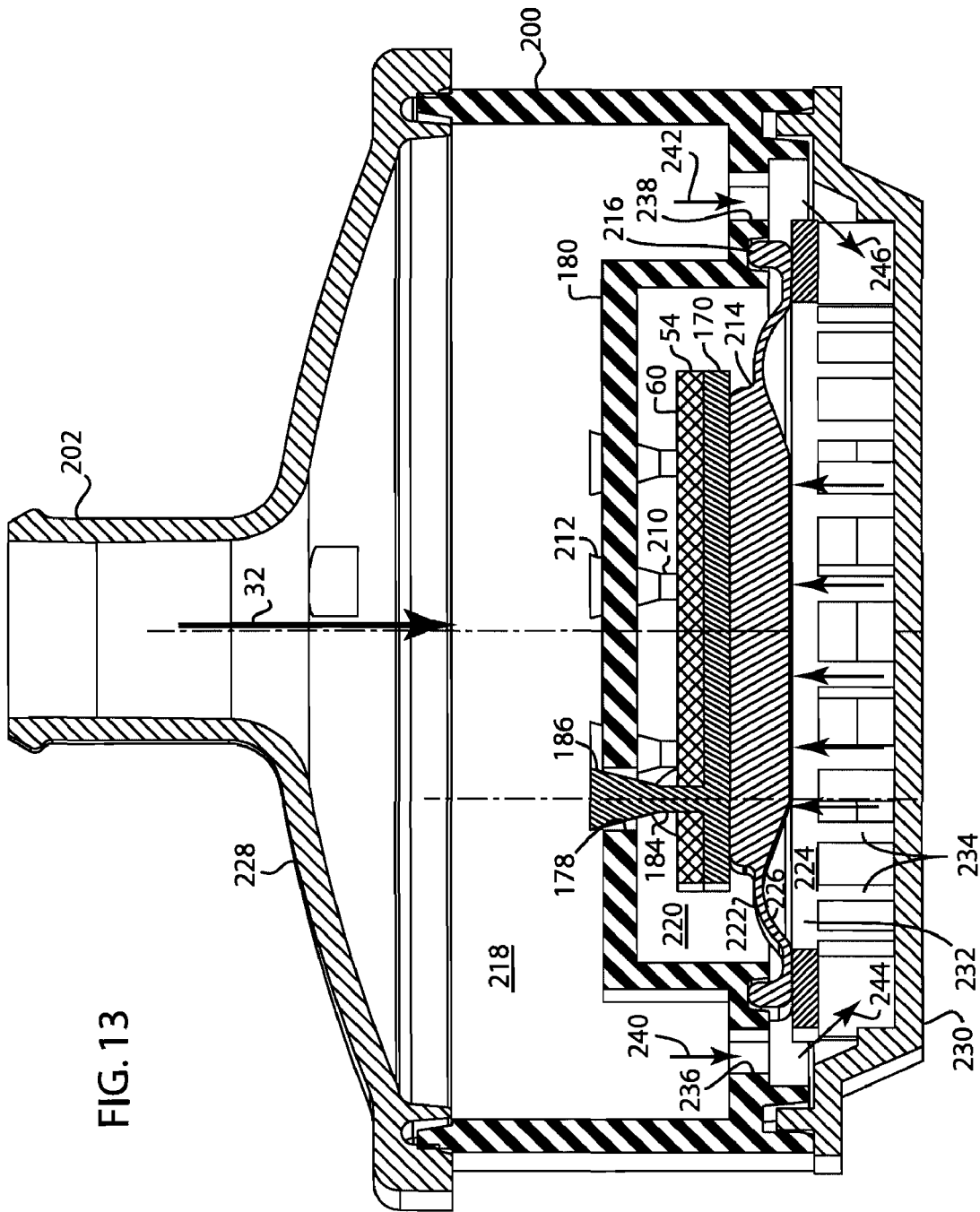

The gas-liquid stream 32 flows through housing inlet 202 into chamber 218 between closure cap 228 and inner housing wall 180. Subchamber 220 is between inner housing wall 180 and diaphragm 214 and receives the gas-liquid flow stream communicated through nozzle orifices 178, 208, etc., when open. Chamber 224 is between closure cap 230 and the noted second side 226 of diaphragm 214 and includes a spacer ring 232 having a plurality of spacer legs 234 for providing a plenum in chamber 224. A plurality of communication passages 236, 238, etc. provide communication of gas-liquid flow stream pressure therethrough as shown at arrows 240, 242, etc. from chamber 218 into chamber 224 as shown at arrows 244, 246, etc. The size and number of communication passages 236, 238, etc. are selected such that the ratio of pressure on second side 226 of diaphragm 214 resulting from and relative to the pressure of the gas-liquid stream is greater than the ratio of the pressure on first side 222 of diaphragm 214 relative to and resulting from the pressure of the gas-liquid stream. Diaphragm 214 is inherently biased, or alternatively has a non-stretched position, as shown in FIG. 13, with nozzle orifices 178, 208, etc. closed by valve heads 186, 212, etc., which is the dashed line position 174 shown in FIG. 12. This inherent bias or non-stretched position of the diaphragm has a bias toward such closed position of the nozzle orifices which is greater than the pressure in chamber 224 on second side 226 of the diaphragm, e.g. at low engine speed. As the pressure of the gas-liquid stream increases, the pressure in chamber 224 on second side 226 of the diaphragm increases and overcomes the inherent bias of diaphragm 214 to stretch and move the diaphragm to the position shown in FIG. 14, which is the solid line position 172 in FIG. 12, to begin to open nozzle orifices 178, 208, by moving valve heads 186, 212, etc. away from their respective valve seats along direction 182, FIG. 12. This opening movement of the valves is opposed and counterbalanced by the pressure in subchamber 220 on first side 222 of the diaphragm now available due to the gas-liquid stream flow as shown at arrows 188, 190 through the respective nozzle orifices into subchamber 220. The noted ratio of pressures on the first and second sides of the diaphragm control the opening and closing of the valves, and vary the size of the nozzle orifices, and if desired the number of orifices opened or closed.

The cumulative flow through the nozzles is varied by variable flow actuator 170 wherein movement of such actuator varies at least one of the size and number of orifices 178, 208, etc. The cumulative flow may further be varied by varying: the axial height of valve stems 184, 210, etc. stem-to-stem; the taper, width, etc. of valve heads 186, 212, etc. from head-to-head; the size of the orifices 178, 208, etc.; the pressure ratio on opposite sides 222 and 226 of the diaphragm by varying the size and number of communication passages 236, 238; and various combinations thereof.

Figure 14:
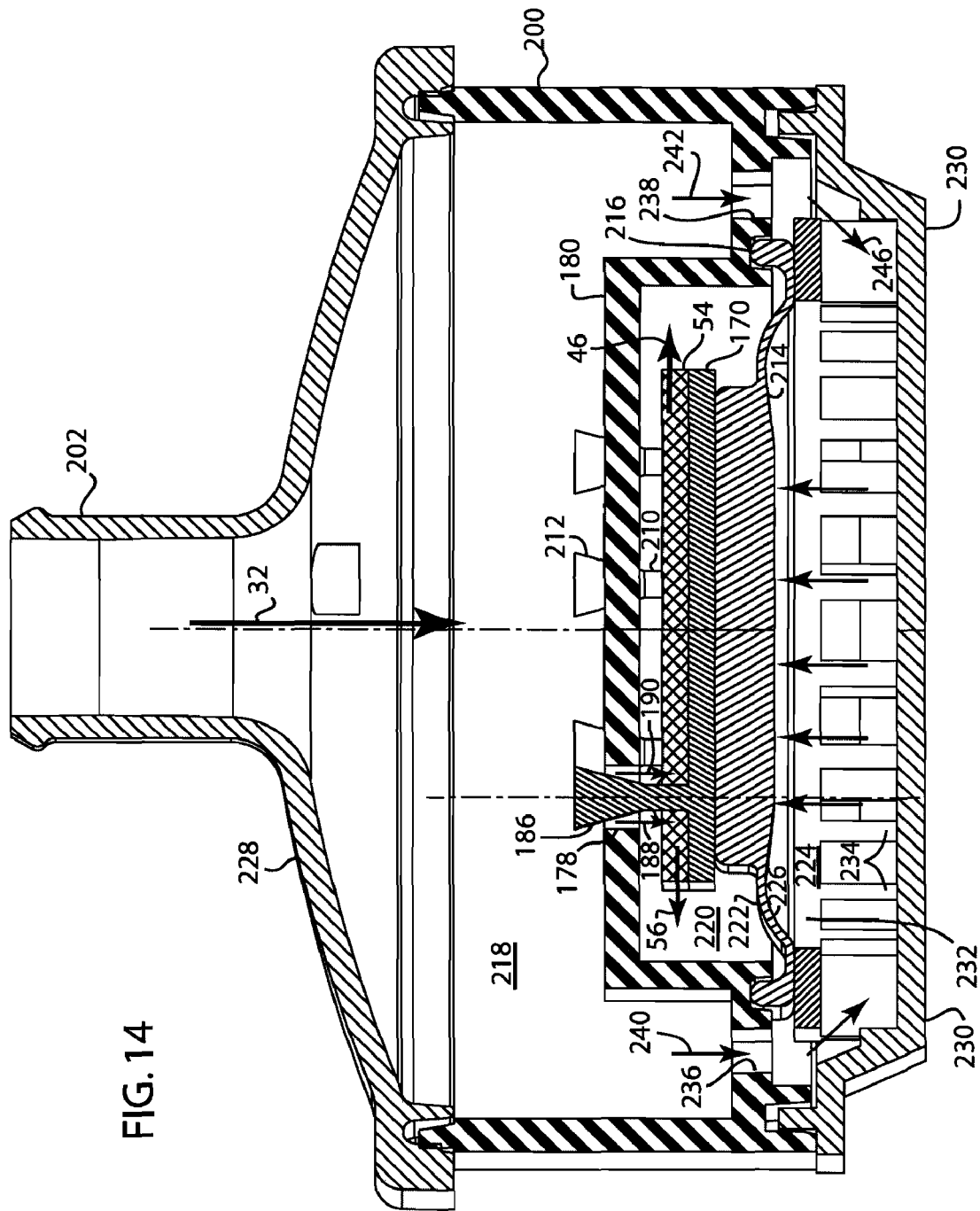
Figure 15:
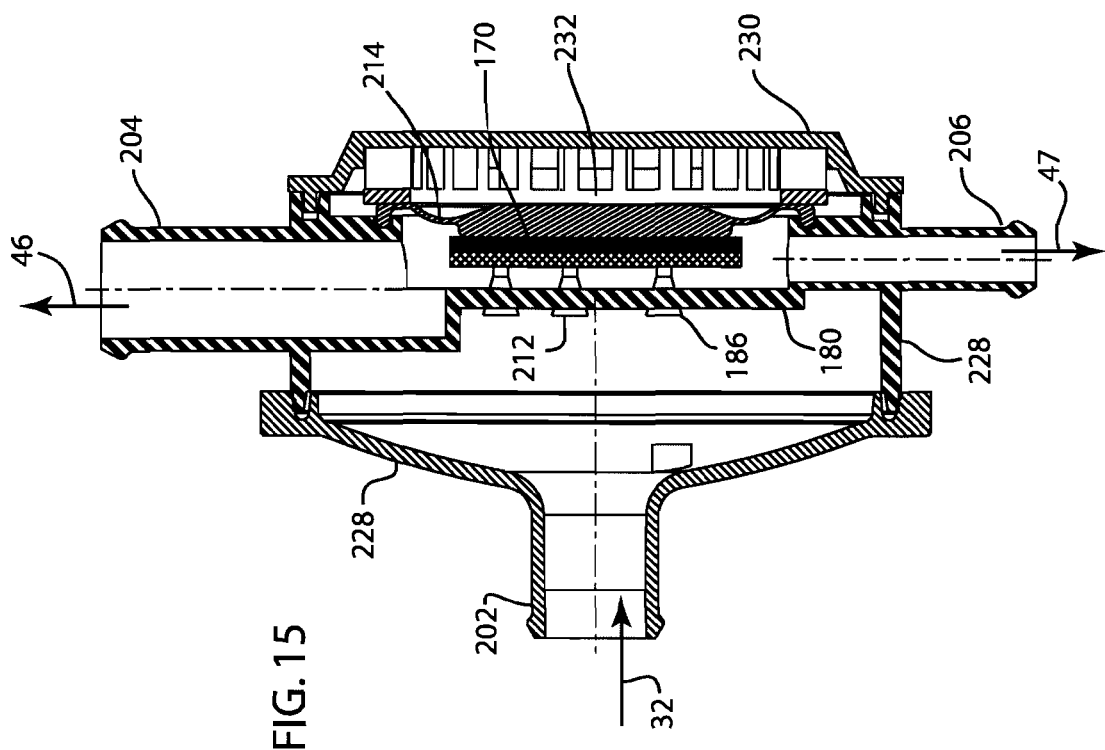
Figure 16:
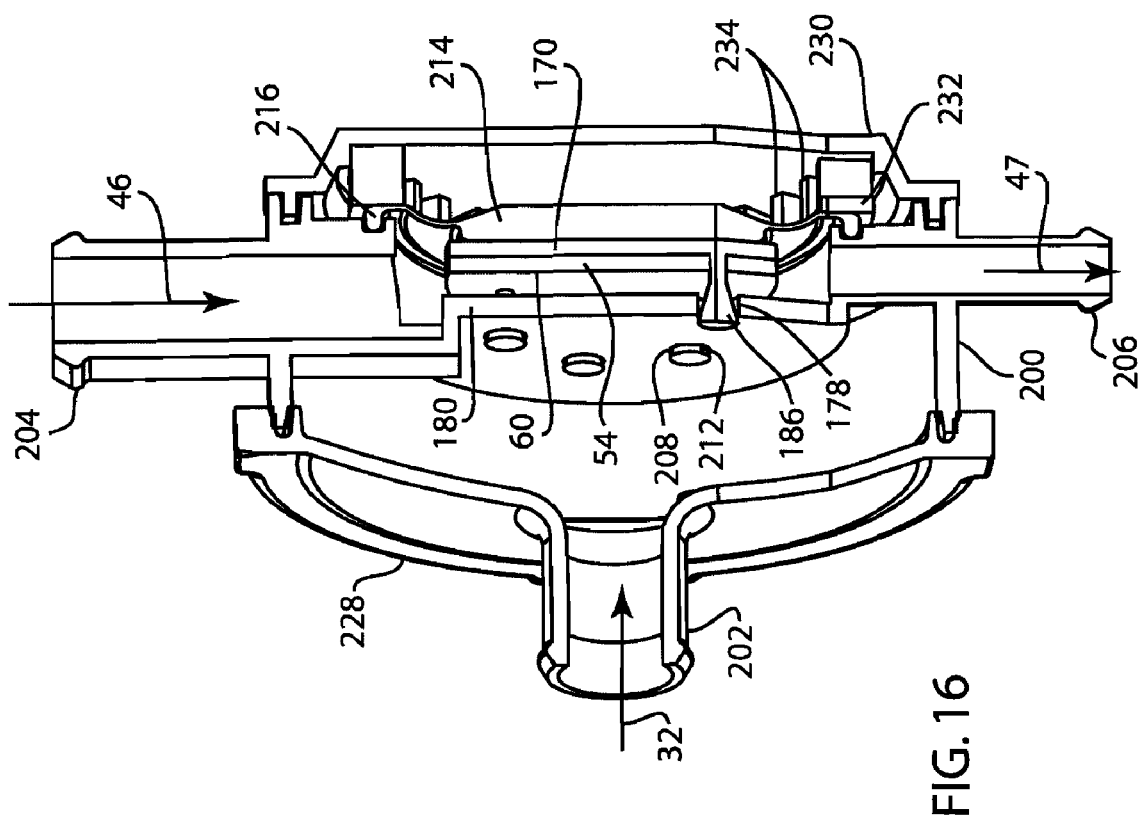
Figure 17:
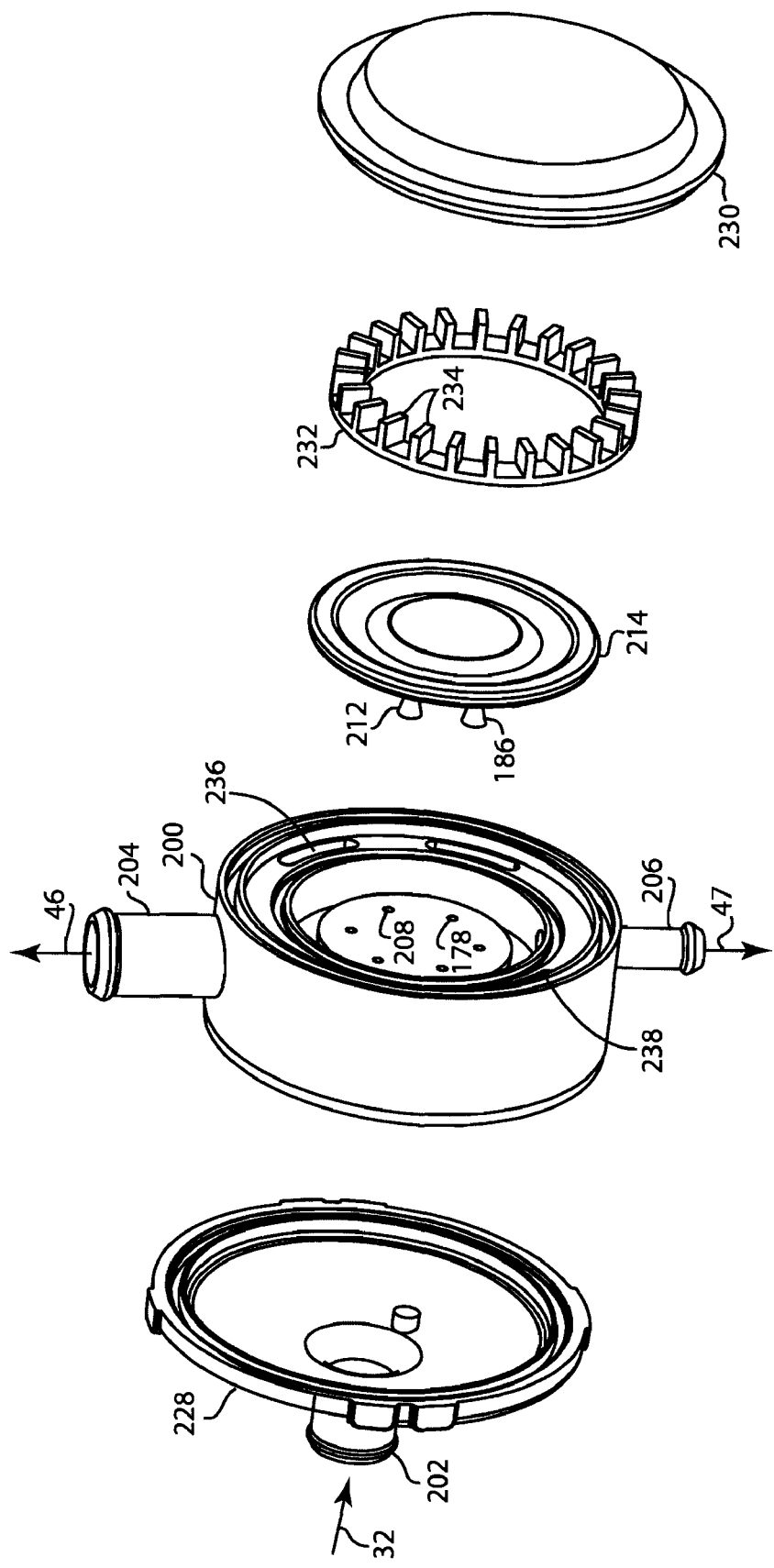
Figure 18:
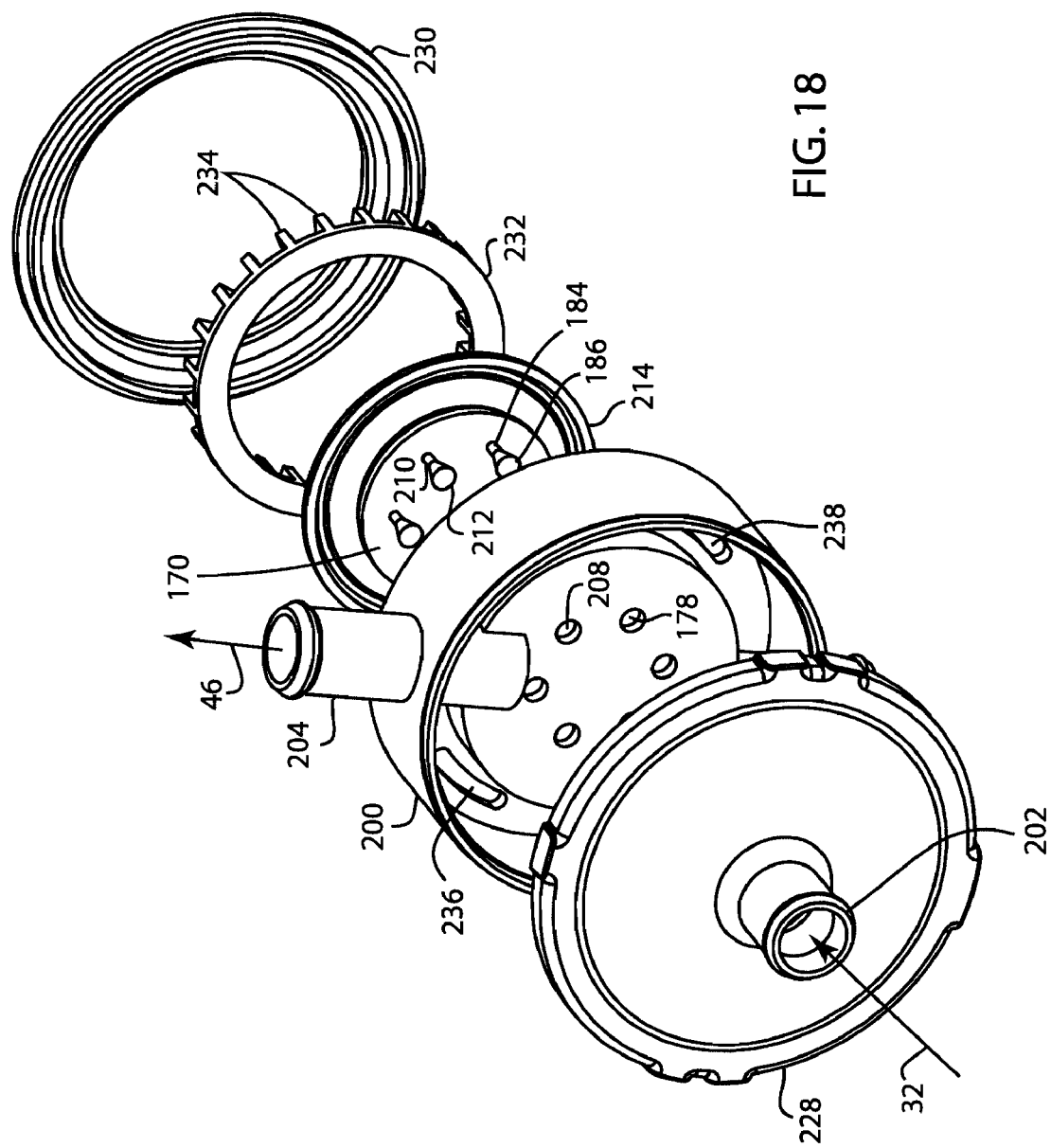

Actuator 170 has a first position as shown in FIG. 13 and in dashed line 174 in FIG. 12, minimizing or closingly stopping cumulative flow of the gas-liquid stream through the plurality of nozzle orifices 178, 208. The actuator has a second position as shown in FIG. 14 and in solid line 172 in FIG. 12, maximizing cumulative flow through the plurality of nozzle orifices 178, 208, etc. Actuator 170 is moved by the pressure sensor provided by diaphragm 214 between the noted first and second positions and a plurality of positions therebetween in response to pressure of the gas-liquid stream to maintain such pressure constant, i.e. maintain a constant ΔP if desired. As above, this overcomes prior trade-offs in a fixed separator which is non-adaptive to changing engine or flow conditions nor different engine sizes. Side 226 of the diaphragm is exposed to pressure in the gas-liquid stream in both of the noted first and second positions of the actuator and the intermediate positions therebetween. Side 222 of the diaphragm is exposed to pressure in the gas-liquid stream in the noted second position and intermediate positions of the actuator.

Figure 19:
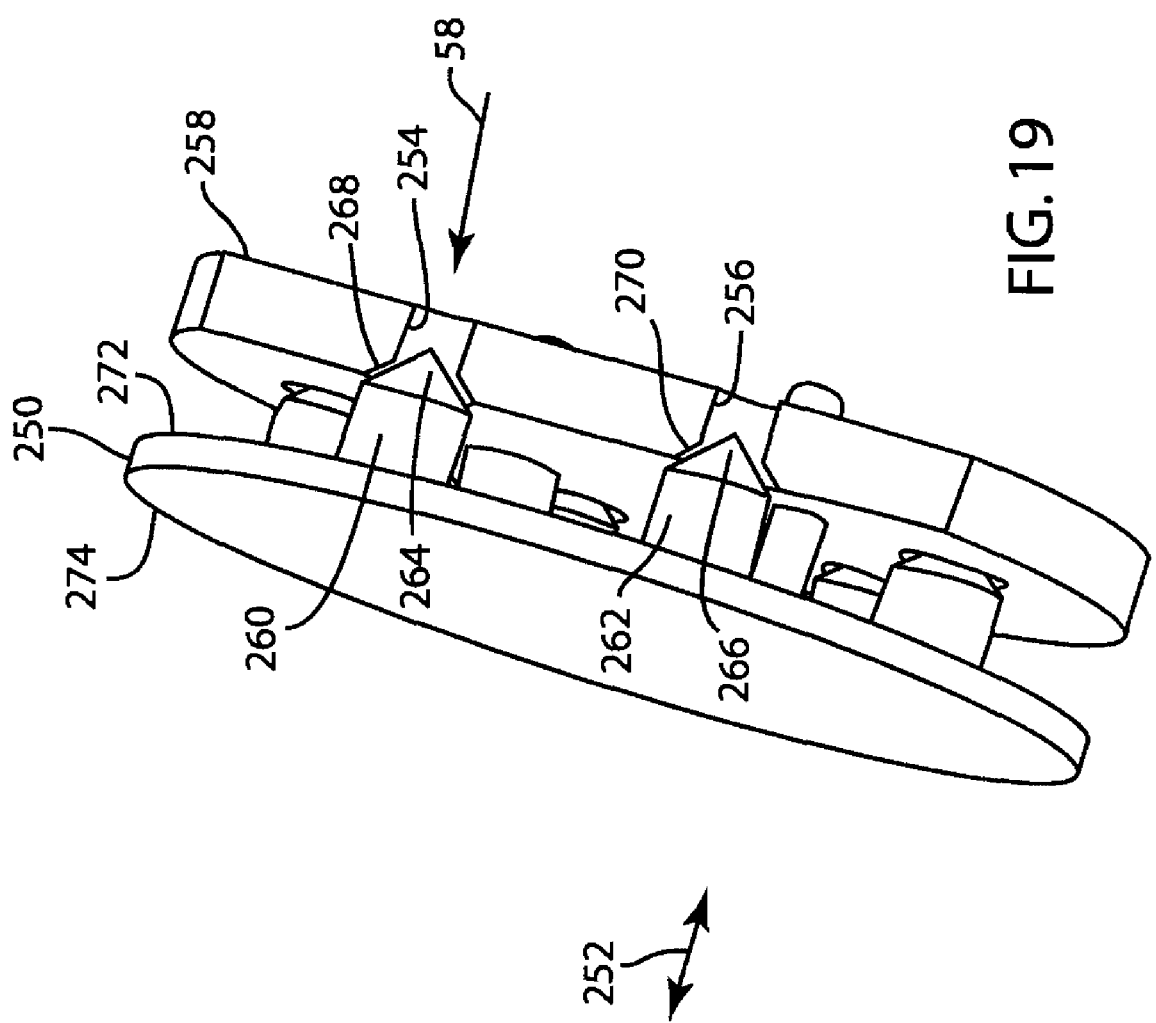

FIG. 19 shows a further embodiment, with an actuator 250 translational along a direction 252 parallel to axial flow direction 58, comparably to actuator 170, FIG. 12, for opening and closing, and/or enlarging and restricting nozzle orifices such as 254, 256, etc. in housing wall 258. Actuator 250 has a plurality of valve stems 260, 262, etc. having conically shaped valve heads 264, 266, etc., engageable with respective valve seats such as 268, 270, etc. which valve seats may be conically shaped complementally to the valve heads. Unlike FIG. 12, valve heads 264, 266 in FIG. 19 are conically shaped along a taper which narrows toward a direction pointing opposite to axial flow direction 58. Variable flow actuator 250 varies the cumulative flow of the gas-liquid flow stream through nozzle orifices 254, 256, etc. in response to a given parameter, by moving back and forth as shown at arrow 252. If pressure in the gas-liquid flow stream is the designated parameter, the pressure against valve heads 264, 266 may be used to open the valves, and the pressure against such valve heads and surface 272 of the actuator disc may be used to vary and expand the cumulative flow area by increasing the cross-sectional area of the nozzle orifices. A biasing spring such as 76, 140 may bear against surface 274 of the actuator disc to bias the actuator to a closed or restricted position. Actuator 250 moves in the same direction as axial flow direction 58 to increase the noted cumulative flow, and moves in the opposite direction to axial flow direction 58 to decrease the noted cumulative flow.

Figure 22:
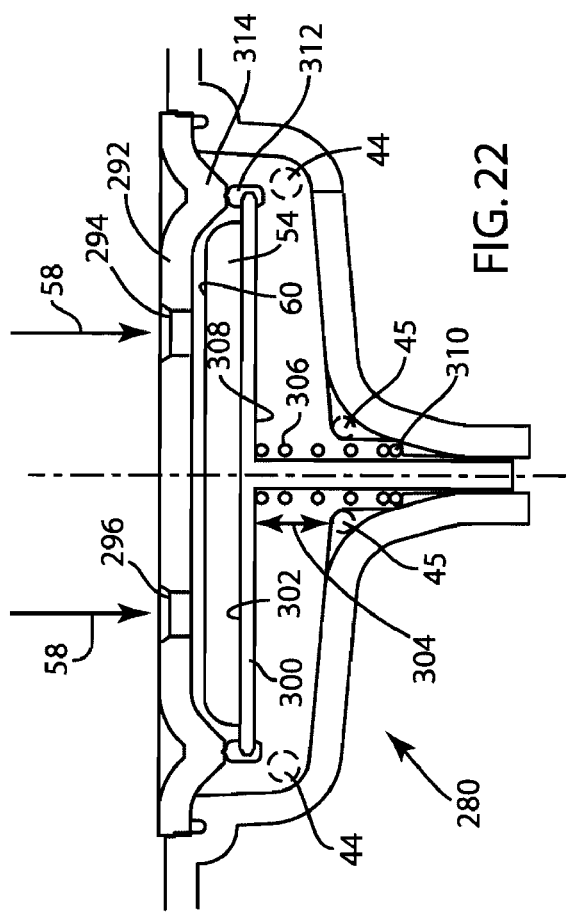
Figure 21:
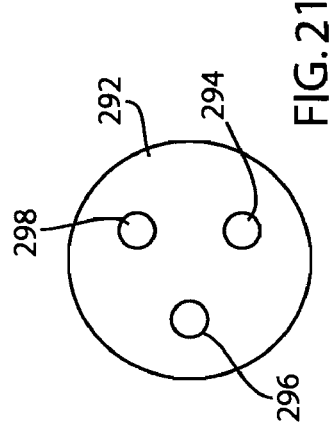
Figure 20:
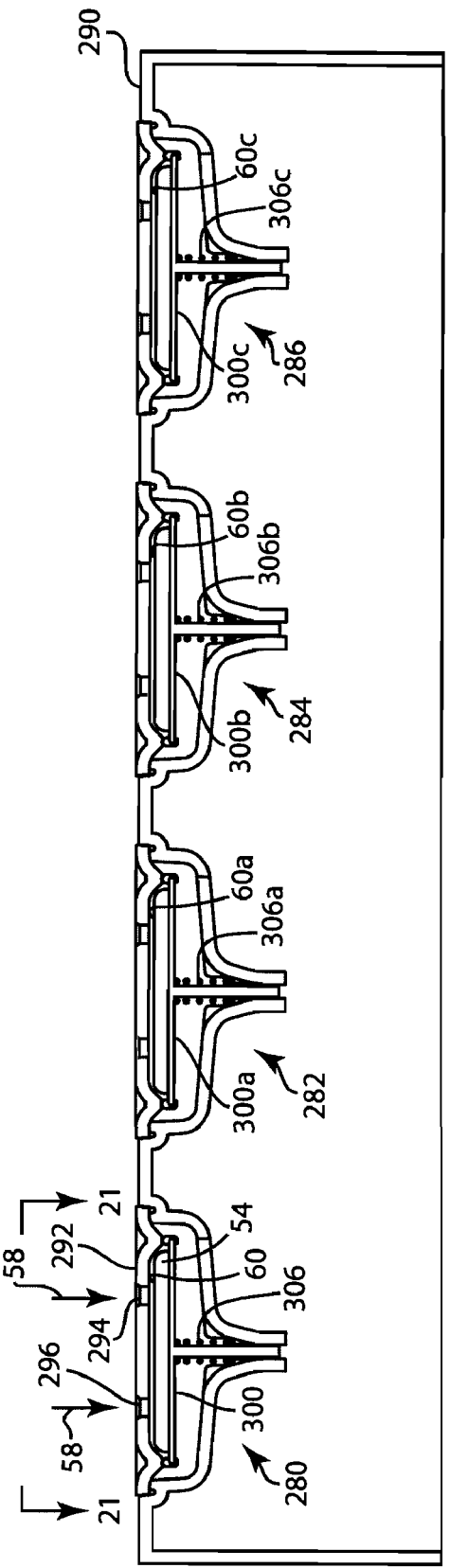

FIGS. 20-22 show a further embodiment having a plurality of actuator assemblies 280, 282, 284, 286 in housing 290. In actuator assembly 280, housing sub-wall 292 has a plurality of nozzle orifices such as 294, 296, 298, etc. through which the gas-liquid flow stream at 58 is accelerated and strikes inertial impactor collector 54 at impaction surface 60, as above, causing liquid particle separation from the gas-liquid stream. Impactor collector 54 is mounted on variable flow actuator 300, or alternatively face surface 302 of the actuator may provide the impaction surface 60. Actuator 300 is translational back and forth as shown at arrow 304 along a direction parallel to axial flow direction 58, and is biased to a closed position (upwardly in FIG. 22), by a spring 306 bearing between underside 308 of actuator disc 300 and a spring seat 310 of the housing. In the upwardly biased closed position shown in FIG. 22, an annular gasket 312 on the outer circumference of actuator disc 300 engages the lower apex of V-shaped valve seat 314 of the housing in sealing relation to block gas stream and liquid stream flow therepast. Actuator 300 is movable in a second direction (downwardly in FIG. 22) to a second open position wherein gasket 312 is moved downwardly away from and disengaged from valve seat 314 by a gap therebetween to permit gas stream flow therepast to the housing outlet, shown schematically at 44 in FIG. 22, and to permit liquid stream flow therepast to the housing drain, shown schematically at 45 in FIG. 22. The remaining actuator assemblies 282, 284, 286 are the same.

The inertial impactor collector of the above embodiments of FIGS. 1-19 is provided in FIGS. 20-22 as a plurality of impaction surfaces 60, 60a, 60b, 60c each receiving the gas-liquid stream through a respective set of one or more orifices 294, 296, 298, etc. The variable flow actuator is provided by a plurality of impaction buttons 300, 300a, 300b, 300c each carrying a respective impaction surface 60, 60a, 60b, 60c. Each impaction button is movable between the noted closed and open positions independently of the other impaction buttons. The noted cumulative flow of the gas-liquid stream at 58 is varied by varying the number of impaction buttons in at least one of the closed and open positions. For example, cumulative flow may be increased by opening one or more of the impaction buttons, and decreased by closing one or more impaction buttons. The impaction buttons are spring biased at different spring rates, to provide differential sequential opening and closing thereof. For example, each of springs 306, 306a, 306b, 306c has a different spring rate, such that, for example, impaction button 300 opens first in response to increasing pressure, and then impaction button 300a opens in response to further increasing pressure, and then impaction button 300b opens in response to yet further increasing pressure, and so on. Impaction buttons 300, 300a, 300b, 300c are translational along a direction parallel to axial flow direction 58, and are biased to the noted closed position (upwardly in FIG. 20) along the noted direction parallel to axial flow direction 58.

Referring to FIG. 1, gas-liquid stream 32 becomes gas stream 46 and flows from upstream to downstream through the housing from inlet 42 then through nozzle orifices 50, 52, etc. then to inertial impactor collector 54 at impaction surface 60 then to outlet 44. In the embodiments of FIGS. 1-19, the noted actuator is upstream of the inertial impactor collector. In the embodiment of FIGS. 20-22, the actuator is downstream of the inertial impactor collector.

Figure 23:
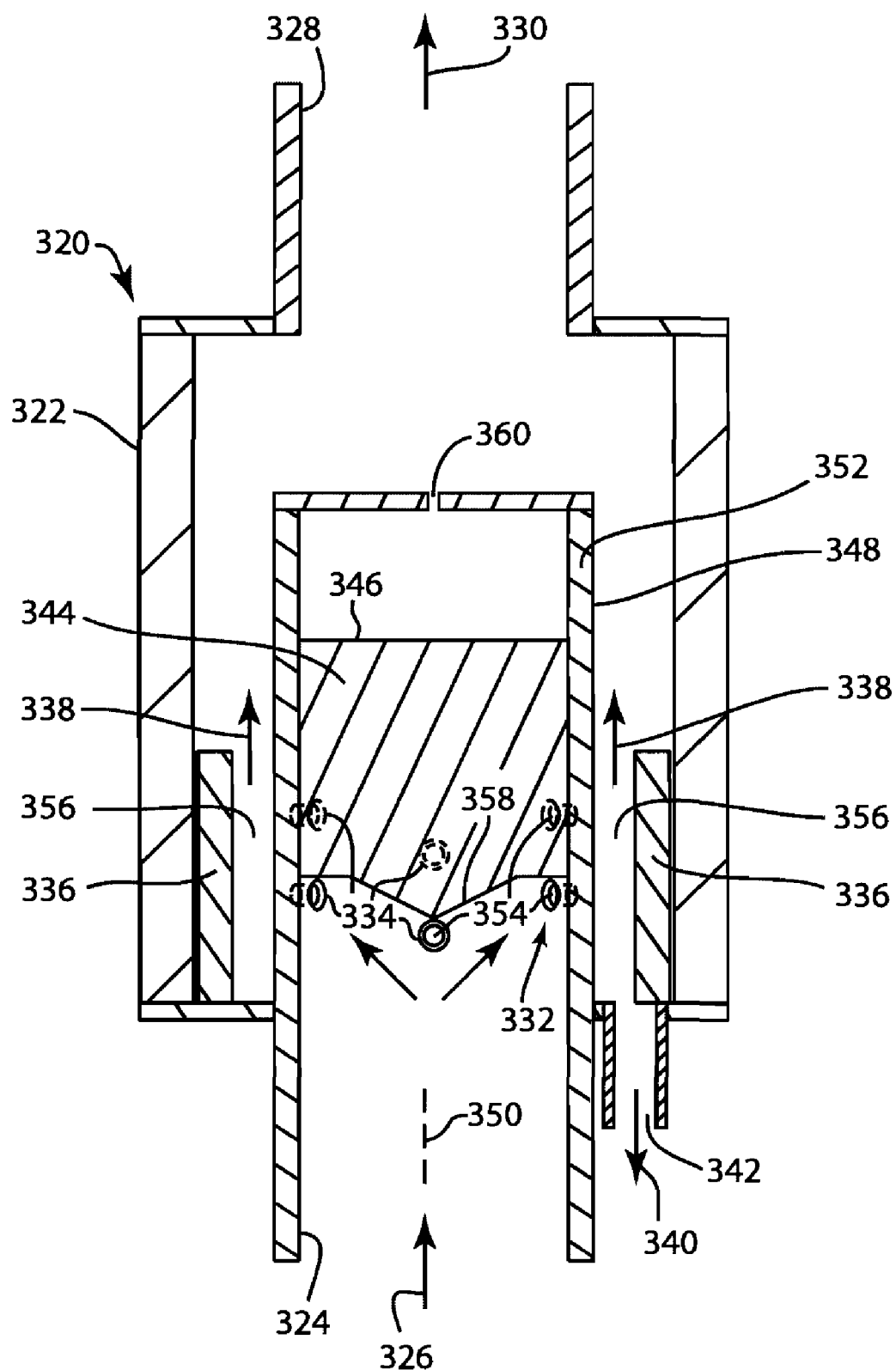

FIG. 23 shows an inertial gas-liquid separator 320 for removing liquid particles from a gas-liquid stream. A housing 322 has an inlet 324 for receiving a gas-liquid stream 326, and an outlet 328 for discharging a gas stream 330. Nozzle structure 332 in the housing includes a plurality of nozzles such as 334 receiving the gas-liquid stream from inlet 324 and accelerating the gas-liquid stream through the nozzles. An inertial impactor collector 336 is provided in the housing in the path of the accelerated gas-liquid stream and causes liquid particle separation from the gas-liquid stream, followed by flow of the gas stream as shown at 338, and drainage of liquid 340 at drain 342. A variable flow actuator 344 is movable, e.g. up and down in FIG. 23, to open and close a variable number of nozzles 334.

Variable flow actuator 344 is responsive to pressure of gas-liquid stream 326. The variable flow actuator responds to increasing pressure by moving, e.g. upwardly in FIG. 23, to open more of nozzles 334. The variable flow actuator responds to decreasing pressure to close more of nozzles 334, e.g. by moving downwardly in FIG. 23. In this manner, a substantially constant pressure drop is maintained across inertial gas-liquid separator 320 between inlet 324 and outlet 328 notwithstanding changing flow conditions of the gas-liquid stream therethrough. It is preferred that the distance between nozzles 334 and inertial compactor collector 336 be constant and unchanged by movement of variable flow actuator 344.

In FIG. 23, variable flow actuator 344 is provided by a piston 346 axially slidable along a cylinder 348 extending along an axis 350. The cylinder has cylinder wall 352 with a plurality of apertures 354 therethrough providing the noted plurality of nozzles. The apertures are covered and uncovered by piston 346 during sliding of the piston along the cylinder to respectively close and open the nozzles. Inertial impactor 336 is an annular member spaced radially outwardly of cylinder 348 by an annular acceleration gap 356 therebetween. Apertures 354 extend radially through cylinder wall 352. Gas-liquid stream 326 flows axially within cylinder 348 and then radially outwardly through apertures 354 uncovered by piston 346 and is accelerated into annular acceleration gap 356 and impact inertial impactor collector 336 causing liquid particle separation from the gas-liquid stream. Gas-liquid stream 326 flows in a given axial direction within cylinder 348, e.g. upwardly in FIG. 23. After the noted separation, the gas stream at 338 flows in the same given axial direction along the exterior of cylinder 348. The gas-liquid stream flows through inlet 324 in the noted given axial direction. The gas stream at 330 flows through outlet 328 in the same noted given axial direction.

Piston 346 has a leading surface 358 facing the incoming flow of the gas-liquid stream 326 thereagainst. Leading surface 358 is configured to directionally guide and direct flow to apertures 354 in cylinder wall 352. In one embodiment, such directional configuration is a cone shape or a convex shape or a channeled guide surface, etc.

In the embodiment of FIG. 23, piston 346 is a gravimetric piston relying on the weight of the piston to regulate flow. The noted axis of movement is vertical. Piston 346 has the noted bottom face 358 facing downwardly and receiving the incoming flow of the gas-liquid stream 326 thereagainst. Piston 346 slides upwardly in cylinder 348 in response to increasing pressure of the gas-liquid stream 326 to open up more of apertures 354. The piston slides downwardly in the cylinder in response to decreasing pressure of the gas-liquid stream 326 to close off more of apertures 354. The top of the cylinder includes a vent hole 360 to avoid creation of a vacuum within the cylinder during piston movement, so as not to impede movement of the piston.

Figure 24:
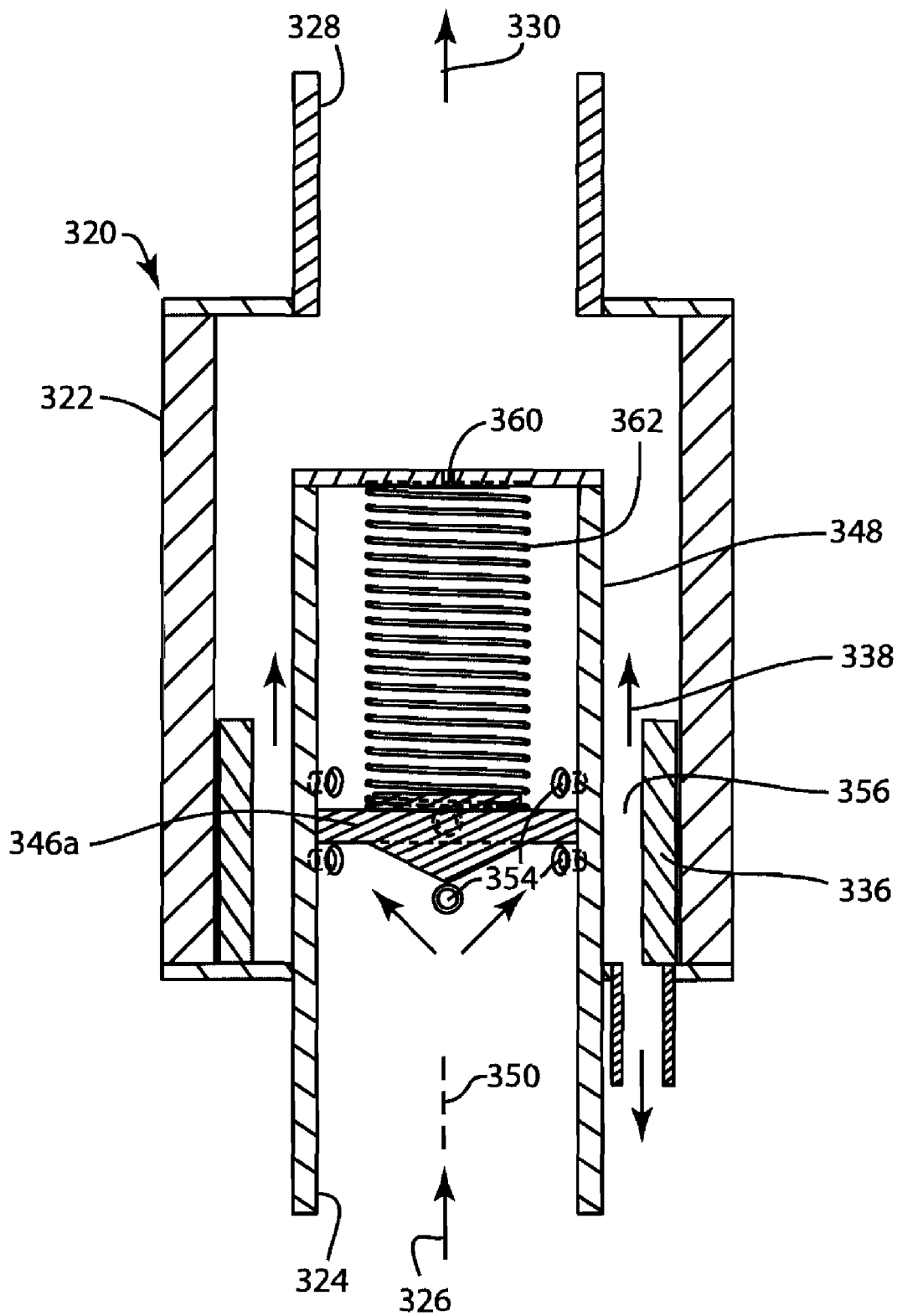

FIG. 24 shows another embodiment and uses like reference numerals from above where appropriate to facilitate understanding. A biasing member, such as spring 362, biases piston 346a against the incoming flow of gas-liquid stream 326 thereagainst. Piston 346a slides in a first axial direction, e.g. upwardly in FIG. 24, against the bias of biasing spring 362 in response to increasing pressure of gas-liquid stream 326 to open more of apertures 354. Piston 346a slides in a second opposite direction, e.g. downwardly in FIG. 24, as biased by biasing spring 362 in response to decreasing pressure of gas-liquid stream 326 to close off more of apertures 354.

Figure 25:
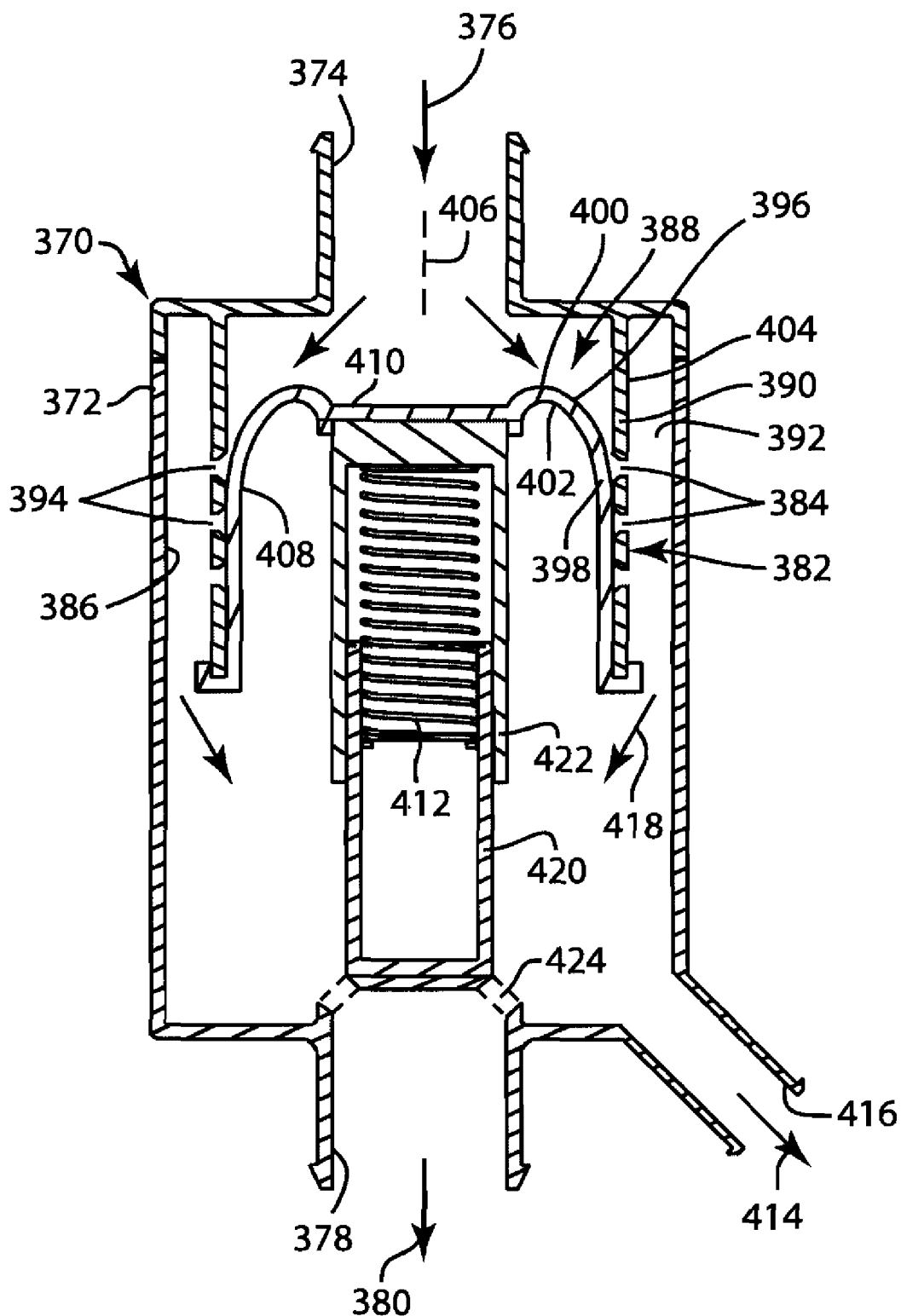

FIG. 25 shows another embodiment of an inertial gas-liquid separator 370 for removing liquid particles from a gas-liquid stream. A housing 372 has an inlet 374 for receiving a gas-liquid stream 376, and has an outlet 378 for discharging a gas stream 380. Nozzle structure 382 in the housing has a plurality of nozzles 384 receiving the gas-liquid stream from inlet 374 and accelerating the gas-liquid stream through the nozzles. An inertial impactor collector 386 is provided in the housing, which may be an interior wall of the housing, in the path of the accelerated gas-liquid stream. A variable flow actuator 388 in the housing is movable to open and close a variable number of nozzles 384.

Housing 372 has a wall 390 facing inertial impactor collector 386 and separated therefrom by an annular acceleration gap 392 therebetween. Wall 390 has a plurality of apertures 394 therethrough providing the noted nozzles 384. Variable flow actuator 388 is provided by a rolling diaphragm 396 having a resilient flexible region 398 covering and uncovering apertures 394 in a flexing motion to respectively close and open nozzles 384. Diaphragm 396 has a first side 400 communicating with inlet 374 and exposed to the incoming flow of the gas-liquid stream 376. The diaphragm has a second opposite side 402 communicating with outlet 378. First side 400 of the diaphragm has a changing effective area, which effective area is defined as the area exposed to incoming flow. The effective area of the diaphragm increases in response to increasing pressure of gas-liquid stream 376, and the diaphragm uncovers and opens up more of apertures 394. The effective area of the diaphragm decreases in response to decreasing pressure of gas-liquid stream 376, and the diaphragm covers and closes off more of apertures 394. Wall 390 is a cylindrical wall of a cylinder 404 in the housing and extending axially along axis 406. Apertures 394 extend radially through cylinder wall 390. Diaphragm 396 has an outer portion 408 extending axially along the interior of cylinder wall 390 and is flexible radially away therefrom to uncover and open more of the apertures 394. Diaphragm 400 has a central portion 410 spanning radially inwardly from the outer portion and movable in a first axial direction, e.g. downwardly in FIG. 25, to flex outer portion 408 of the diaphragm radially inwardly away from apertures 394 and out of engagement of cylinder wall 390 to uncover and open more of the apertures. Central portion 410 is movable in a second opposite axial direction, e.g. upwardly in FIG. 25, to flex outer portion 408 of the diaphragm radially outwardly toward apertures 394 and into engagement with cylinder wall 390 to cover and close off more of the apertures 394. Biasing spring 412 biases central portion 410 of the diaphragm in the noted second axial direction, e.g. upwardly in FIG. 25, and against the incoming flow of gas-liquid stream 376. The separated liquid drains as shown at arrow 414 at drain 416. The gas stream flows as shown at arrows 418 to outlet 378. A central column 420 supports an upper sleeve 422 in telescopic axial sliding relation which in turn supports upper central portion 410 of the diaphragm. The base of support column 420 has a plurality of slots or apertures 424 passing the gas flow therethrough to outlet 378.

Figure 26:
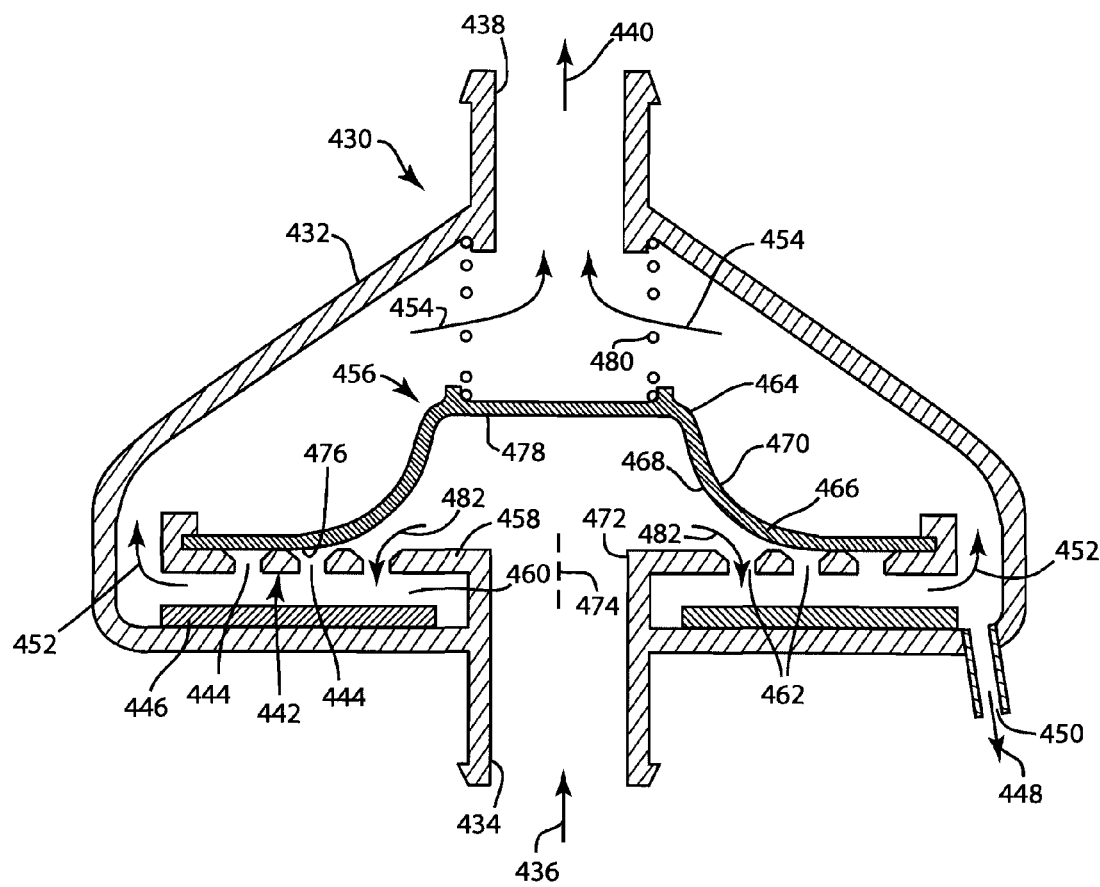

FIG. 26 shows another embodiment of an inertial gas-liquid separator 430 for removing liquid particles from a gas-liquid stream. Housing 432 has an inlet 434 for receiving a gas-liquid stream 436, and has an outlet 438 for discharging a gas stream 440. Nozzle structure 442 in the housing has a plurality of nozzles 444 receiving the gas-liquid stream from inlet 434 and accelerating the gas-liquid stream through nozzles 444. An inertial impactor collector 446 is provided in the housing in the path of the accelerated gas-liquid stream and causes liquid particle separation from the gas-liquid stream. The liquid drains as shown at arrow 448 at drain 450. The gas stream continues as shown at arrows 452, 454 to outlet 438. A variable flow actuator 456 is movable to open and close a variable number of nozzles 444. The housing has a wall 458 facing inertial impactor collector 446 and separated therefrom by an acceleration gap 460 therebetween. Wall 458 has a plurality of apertures 462 therethrough providing the noted nozzles. Variable flow actuator 456 is provided by a rolling diaphragm 464 having a resilient flexible region 466 covering and uncovering apertures 462 in a flexing motion to respectively close and open the nozzles. Diaphragm 464 has a first side 468 communicating with inlet 434 and exposed to the incoming flow of gas-liquid stream 436. The diaphragm has a second opposite side 470 communicating with outlet 438. First side 468 of the diaphragm has a changing effective area, such effective area being defined as the area exposed to incoming flow. The effective area of the diaphragm increases in response to increasing pressure of gas-liquid stream 436, and the diaphragm uncovers and opens more of apertures 462. The effective area of the diaphragm decreases in response to decreasing pressure of gas-liquid stream 436, and the diaphragm covers and closes off more of apertures 462.

Wall 458 is a plate having an incoming flow opening 472 therethrough communicating with inlet 434 and receiving the incoming flow of gas-liquid stream 436. The incoming flow flows axially along axis 474 through opening 472. Plate 458 extends laterally outwardly from opening 472. The plurality of apertures 462 extend axially through plate 458 and are laterally outward of opening 472. Diaphragm 464 has an outer portion 476 extending laterally along plate 458 and flexible axially, e.g. upwardly in FIG. 26, away therefrom to uncover and open up more of apertures 462. Diaphragm 464 has a central portion 478 spanning laterally inwardly from the outer portion and movable in a first axial direction, e.g. upwardly in FIG. 26, to flex outer portion 476 of the diaphragm axially away from apertures 462 and out of engagement of plate 458 to uncover and open up more of apertures 462. Central portion 478 of the diaphragm is movable in a second opposite axial direction, e.g. downwardly in FIG. 26, to flex outer portion 476 of the diaphragm axially toward apertures 462 and into engagement with plate 458 to cover and close off more of apertures 462. A biasing spring 480 biases central portion 478 of the diaphragm in the noted second axial direction, e.g. downwardly in FIG. 26, and against the incoming flow of gas-liquid stream 436. The gas-liquid stream 436 flows through opening 472 in the noted first axial direction, e.g. upwardly in FIG. 26, and then flows as shown at arrows 482 in the noted second axial direction, e.g. downwardly in FIG. 26. The gas stream flows from acceleration gap 460 as shown at arrows 452, 454 to outlet 440 in the noted first axial direction.

In the above noted embodiments, the system automatically adapts the number or size of apertures to the flow, to keep restriction as constant as possible. This is desirable, particularly in internal combustion engine applications in a truck in a braking mode. In other applications, a change in hole or aperture area is done step by step at extended intervals, for example manually at service intervals for the vehicle, particularly when crankcase pressure reaches a predetermined level. In one example, piston 346, FIG. 23, can be manually changed between different positions at service intervals and retained by a retainer such as a detent, latch, finger in slot, or the like, in a fixed axial position until the next further service interval, at which the service technician will determine if the piston should be moved to a different axial position to cover or uncover more or less apertures 354 until the next service interval, and so on. In another example, the discs such as 84 of FIG. 3 or 100 of FIG. 4 may be fixed in place at a service interval and remain so fixed until the next service interval, at which time they may be adjusted and moved by the service technician, and remain so adjusted until a subsequent service interval, and so on. In another example, a pair of discs may be provided which can be angularly rotated or slid relative to each other and locked in position, with a series of detents or clicks, with gradations indicating to the service technician a given setting corresponding to a given crankcase pressure reading. The mechanic will then manually slide or rotate a disc or other variable actuator to a given set position, to accommodate wear since the last service interval and to correspond to a current crankcase pressure reading as the engine ages.

Figure 27:
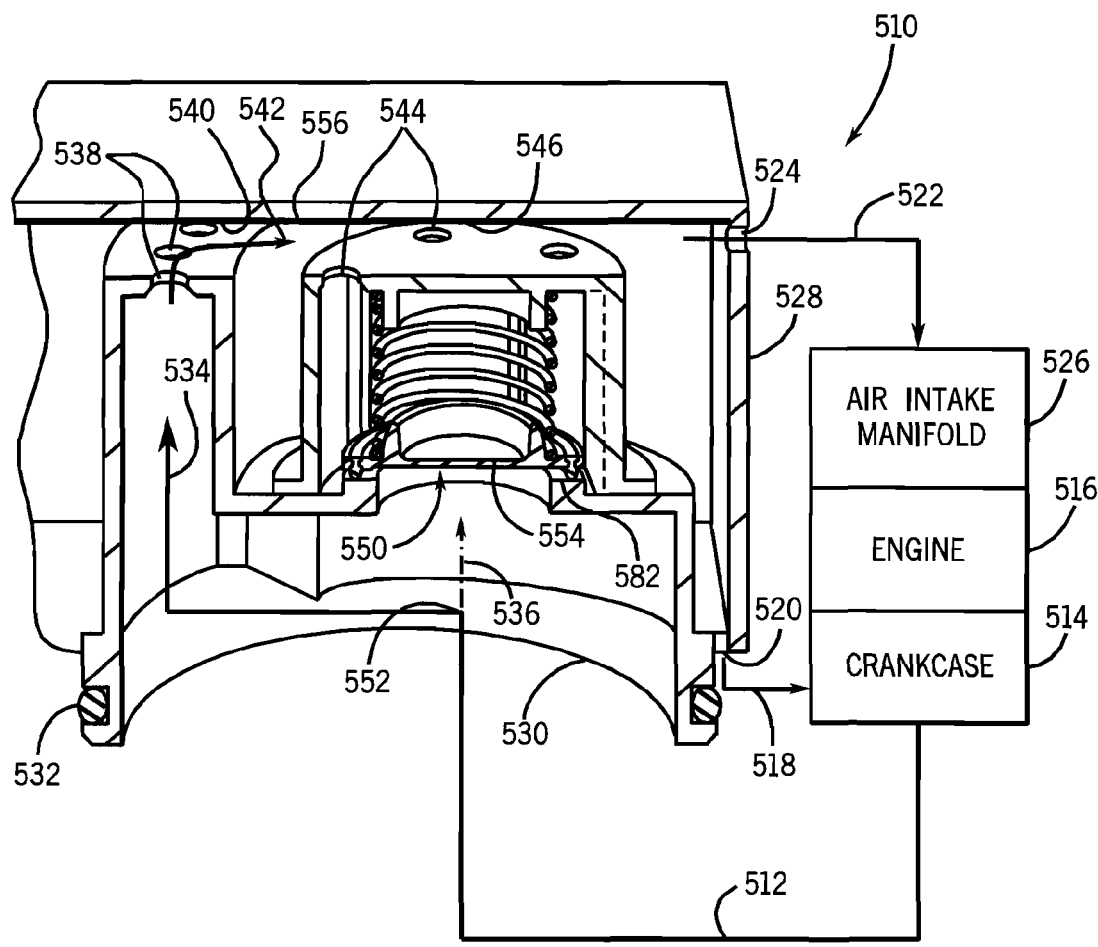

FIG. 27 shows an inertial gas-liquid separator 510 for removing liquid particles from a gas-liquid stream 512, for example oil particles from a blowby gas stream from crankcase 514 of internal combustion engine 516. In such embodiment, the separator returns separated oil 518 at drain 520 to crankcase 514, and returns separated air 522 at outlet 524 to air intake manifold 526 of the engine. In such application, it is desired to vent blowby gases from crankcase 514 of engine 516. Untreated, these gases contain particulate matter in the form of oil mist and soot. It is desirable to control the concentration of the contaminants, especially if the blowby gases are to be recirculated back to the engine's air intake system, for example at air intake manifold 526. The oil mist droplets are generally less than 5 μm in diameter, and hence are difficult to remove using conventional fibrous filter media while at the same time maintaining low flow resistance as the media collects and becomes saturated with oil and contaminants. The separator may be used in closed crankcase ventilation (CCV) systems and in open crankcase ventilation (OCV) systems, as well as other inertial gas-liquid impactor separator applications.

Figure 28:
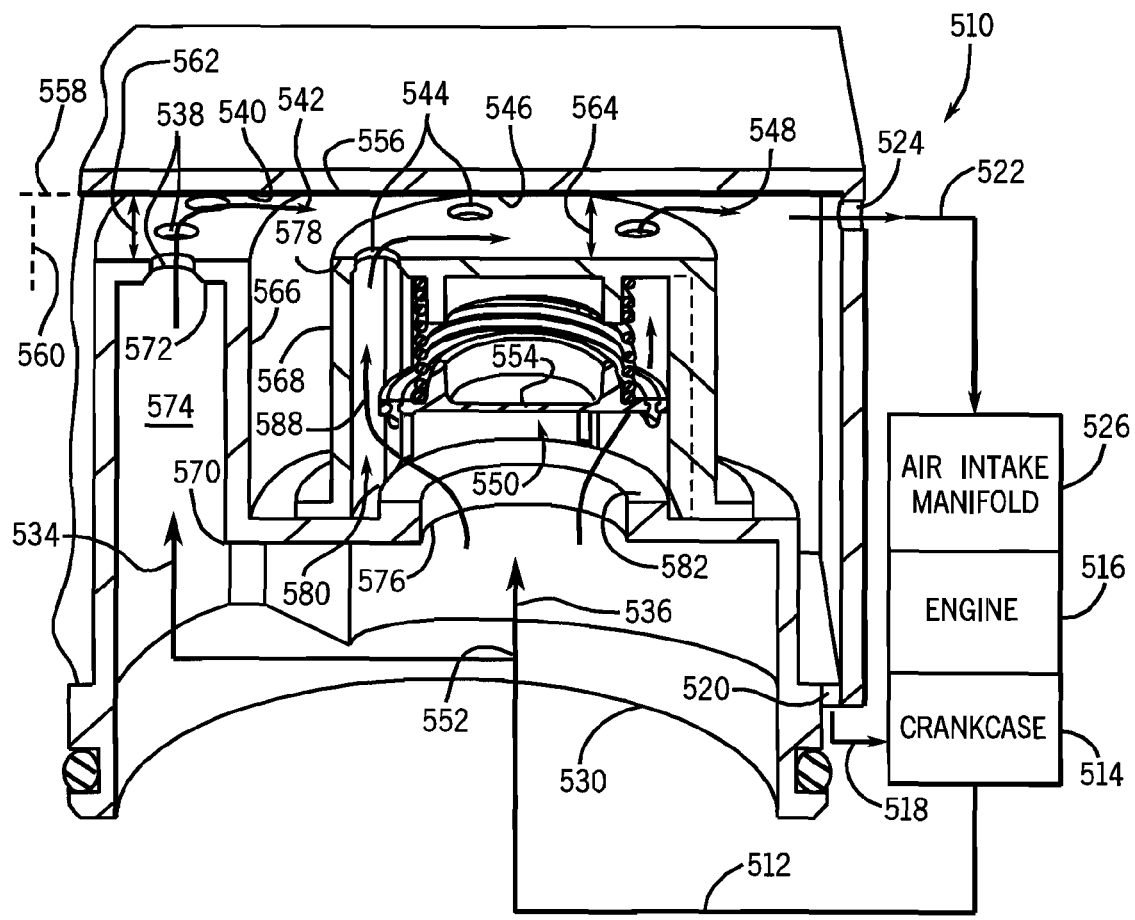

Separator 510 includes a housing 528 having an inlet 530 for receiving gas-liquid stream 512, and an outlet 524 for discharging a gas stream 522. The inlet may have a gasket such as O-ring 532 for sealed mounting to a component such as an engine crankcase. First and second flow branches 534 and 536, FIGS. 27, 28, are provided through the housing from inlet 530 to outlet 524. First flow branch 534 has a set of one or more nozzles 538 receiving gas-liquid stream 512 from inlet 530 and accelerating the gas-liquid stream in the first flow branch in a downstream direction through the first set of one or more nozzles 538 against a first inertial impactor collector 540 in the housing in the path of the accelerated gas-liquid stream through first flow branch 534 and causing liquid particle separation. Inertial impactor collector 540 in the housing is in the path of the accelerated gas-liquid stream and causes liquid particle separation by a sharp directional change as shown at 542. In the preferred embodiment, impactor collector 540 has a rough porous collection or impingement surface causing liquid particle separation from the gas-liquid stream, and is like that shown in U.S. Pat. No. 6,290,738, incorporated herein by reference. In another embodiment, a smooth impervious impingement surface is used, providing a sharp cut-off size particle separation, as noted in the '738 patent. Nozzles 538 may be provided by orifices having a venturi or frustoconical shape as in the incorporated '738 patent. Second flow branch 536 has a second set of one or more nozzles 544 receiving the gas-liquid stream from inlet 530 and accelerating the gas-liquid stream in second flow branch 536 in a downstream direction through the second set of one or more nozzles 544 and against a second inertial impactor collector 546 in the housing in the path of the accelerated gas-liquid stream through second flow branch 536 and causing liquid particle separation by a sharp directional change as shown at 548, FIG. 28. A variable controller 550 in second branch 536 controls flow therethrough.

Figure 29:
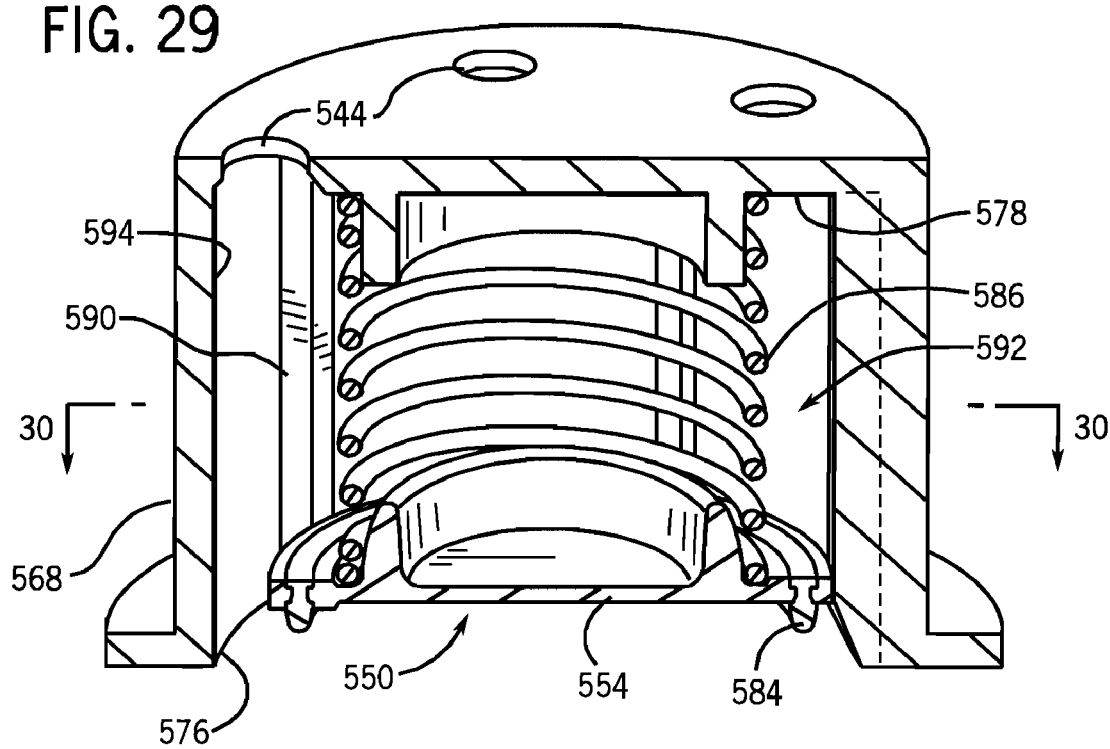
Figure 30:
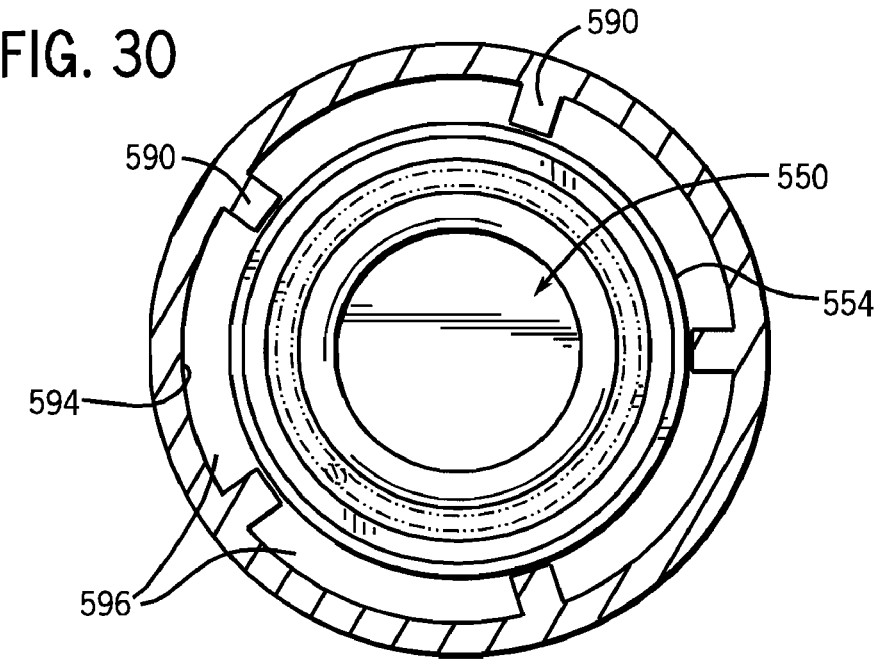
Figure 31:
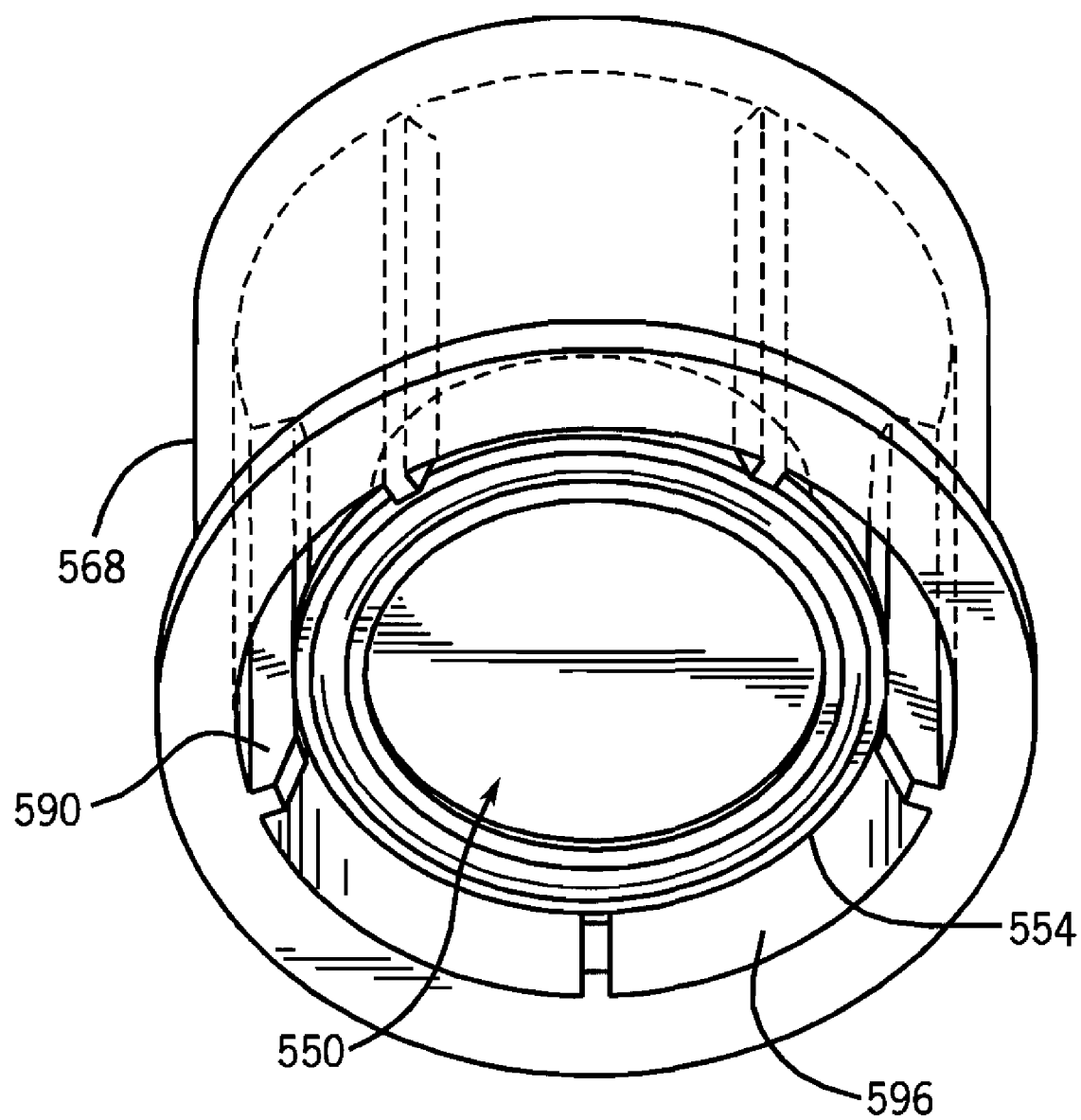

Variable controller 550, FIGS. 29-31, in second flow branch 536, FIGS. 27, 28, is responsive to pressure of gas-liquid stream 512. Variable controller 550 in second flow branch 536 is upstream of the noted second set of one or more nozzles 544. First and second flow branches 530 and 536 preferably diverge at a junction 552 downstream of inlet 530, and variable flow controller 550 is preferably downstream of such junction 552. First flow branch 534 is continuously open such that gas-liquid stream 512 can continuously flow therethrough and through the first set of one or more nozzles 538. Variable flow controller 550 includes a valve 554, to be described, actuatable to control flow through second flow branch 536 and the second set of one or more nozzles 544. Valve 554 is preferably a pressure relief valve responsive to increasing pressure of gas-liquid stream 512. Valve 554 may be actuatable between open and closed positions respectively passing and blocking flow through second flow branch 536 and the second set of one or more nozzles 544, which valve opens responsive to increasing pressure of gas-liquid stream 512. Flow branch 534 provides a first stage, and one or more flow branches such as 536 provide second, third and so on stages, one of which is shown at 536. Respective valves 554 may open at different pressures to provide a staggered sequentially opening multistage array providing staggered sequentially increasing flow area. In another embodiment, valve 554, rather than on/off, may provide a variable opening variably increasing the size of the opening to variably increase flow area through second branch 536 in response to increasing pressure of gas-liquid stream 512, including for example as in the above noted parent '603 and '688 applications. This multistage effect enables the above noted advantages including providing increased separation efficiency early in the life of the engine without suffering objectionably high pressure drop late in the life of the engine including end-of-life condition of the engine.

Gas-liquid stream 512 flows through the first and second sets of nozzles along parallel flow paths 534 and 536. The noted first and second inertial impactor collectors 540 and 546 share in one embodiment a common impaction plate 556 at impaction zones 540 and 546 laterally spaced along a lateral direction 558 normal to the direction of flow 560 along each of the noted parallel paths. The distance 562 between the first set of nozzles 538 and the first inertial impactor collector 540 is constant. Variable flow controller 550 is movable to control flow through second branch 536, and the distance 564 between the second set of one or more nozzles 544 and second inertial impactor collector 546 is constant, including during movement of variable flow controller 550. Distance 562 is preferably equal to distance 564.

First and second side-by-side chimneys 566 and 568 are provided in housing 528. Each chimney defines a respective axially extending flow path therethrough, as shown at 534 and 536. First chimney 566 has a first axial end 570 receiving gas-liquid stream 512 from housing inlet 530, and has a distally opposite second axial end 572 having the first set of one or more nozzles 538 therethrough. First chimney 566 has a first axial flow passage 574 therethrough between first and second axial ends 570 and 572, which axial flow passage 574 provides the noted first flow branch 534. Second chimney 568 has a first axial end 576 receiving gas-liquid stream 512 from housing inlet 530, and has a distally opposite second axial end 578 having the second set of one or more nozzles 544 therethrough. Second chimney 568 defines a second axial flow passage 580 therethrough between the first and second axial ends 576 and 578, which axial flow passage 580 provides the noted second flow branch 536.

Variable flow controller 550 is axially movable in second chimney 568, FIGS. 27, 28, along axial flow passage 580. Variable flow controller 550 preferably includes a valve member 554, which preferably includes a disc or the like, axially movable into and out of engagement with a valve seat 582 formed in second chimney 568, to respectively close and open second flow branch 536, as shown in FIGS. 27 and 28, respectively. Disc valve member 554 may include an annular gasket 584, FIG. 29, for sealingly engaging valve seat 582. Valve seat 582 is at the noted first axial end 576 of second chimney 568. A biasing member such as helical compression spring 586, FIG. 29, bears between the noted second axial end 578 of second chimney 568 and valve member disc 554 and biases valve member 554 to a normally closed position, FIG. 27, against valve seat 582. Valve member 554 is axially movable upwardly in FIGS. 27, 28 to an open position, FIG. 28, in response to pressure of gas-liquid stream 512 overcoming the bias of biasing member 586. Valve member 554 in the open position of FIG. 28 permits flow of the gas-liquid stream axially as shown at arrow 588 through second chimney 568 to the second set of one or more nozzles 544 at the noted second axial end 578 of chimney 568.

Variable flow controller 550 is preferably an axially movable valve member 554, as noted. Second chimney 568 has a plurality of guide track ribs 590, FIG. 31, extending axially along axial flow passage 580 and circumferentially spaced, FIG. 30, around and disposed radially outwardly of valve member 554 and guiding valve member 554, which may be a disc as above noted, for axial movement along such guide track ribs 590. Chimney 568 has an axially extending inner cavity 592, FIG. 29, having an inner cavity wall 594 spaced radially outwardly of valve member disc 554. Inner cavity wall 594 has the noted guide track ribs 590 protruding radially inwardly therefrom. Guide track ribs 590 are circumferentially spaced by arcuate gaps 596, FIG. 30, between respective guide track ribs 590 and between inner cavity wall 594 and valve member disc 554. Gas-liquid stream 512 in second flow branch 536 flows axially through arcuate gaps 596.

Figure 32:
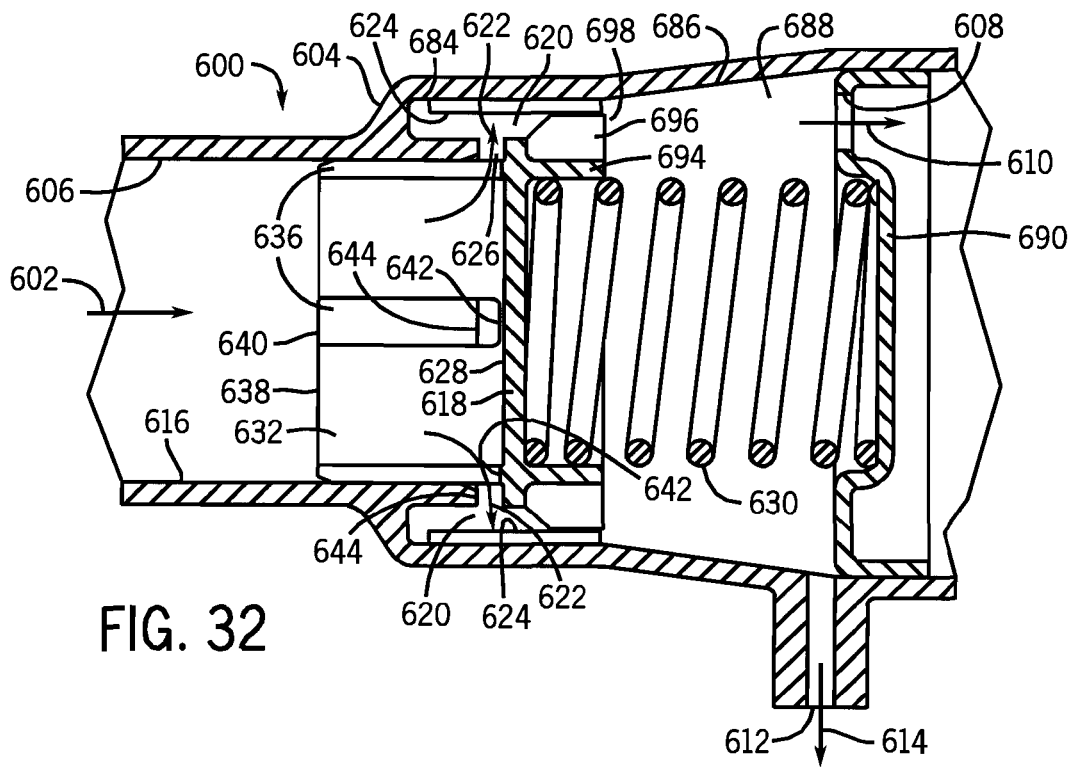

FIG. 32 shows an inertial gas-liquid separator 600 for removing liquid particles from a gas-liquid stream 602. The separator includes a housing 604 directing the gas-liquid stream from upstream to downstream therethrough (left to right in FIG. 32). The housing has an inlet 606 receiving the gas-liquid stream, an outlet 608 discharging a gas stream 610, and a drain port 612 discharging separated liquid 614. The housing has a housing sleeve 616 directing the gas-liquid flow axially along a downstream axial flow direction as shown at 602 against an axially movable plunger 618 which is biased in an upstream axial direction (leftwardly in FIG. 32) against the noted downstream axial flow. Variable nozzle orifice jet structure 620 co-acts between housing sleeve 616 and plunger 618 and accelerates the gas-liquid stream radially outwardly therethrough as shown at arrow 622 against an inertial impactor collector 624 in the housing for liquid particle separation. Variable orifice jet nozzle structure 620 has a variable orifice area 626 dependent upon axial movement (left-right) of plunger 618 relative to housing sleeve 616.

Plunger 618 has a laterally spanning disc 628 facing axially upstream (leftwardly in FIG. 32) and impinged by gas-liquid stream 602 flowing axially downstream (rightwardly in FIG. 32) through housing sleeve 616 and against disc 628. The greater the pressure of gas-liquid stream 602 the greater the axial downstream movement of plunger 618 against the bias thereof, supplied by biasing spring 630, and the greater the variable orifice area 626. Plunger 618 has a plunger sleeve 632, FIG. 36, extending axially upstream (leftwardly in FIGS. 32, 36) from disc 628 and telescopically axially slidable along housing sleeve 616 in guided relation. Variable orifice jet nozzle structure 620 is formed along plunger sleeve 632. Plunger sleeve 632 is axially telescopically movable between retracted and extended positions relative to housing sleeve 616. The extended position is in the downstream axial direction against the bias of biasing spring 630 and increases variable orifice area 626. Plunger sleeve 632 is provided by a circumferential sidewall 634, FIG. 36, extending axially upstream from disc 628. Variable orifice jet nozzle structure 620 formed along plunger sleeve 632 is provided by one or more axially elongated slots 636 extending axially along and radially through sidewall 634 and passing the gas-liquid stream radially therethrough as shown at arrow 622. Circumferential sidewall 634 of plunger sleeve 632 has an upstream axial end 638. The one or more axially elongated slots 636 have open upstream ends 640 at upstream axial end 638 of circumferential sidewall 634, and have closed downstream ends 642, FIG. 32. Housing sleeve 616 has a downstream axial end 644. The greater the downstream axial movement and extension of plunger sleeve 632 relative to housing sleeve 616 the greater the exposed axial length of the one or more axially elongated slots 636 downstream beyond the downstream axial end 644 of housing sleeve 616 which are radially exposed to inertial impactor collector 624.

Figure 33:
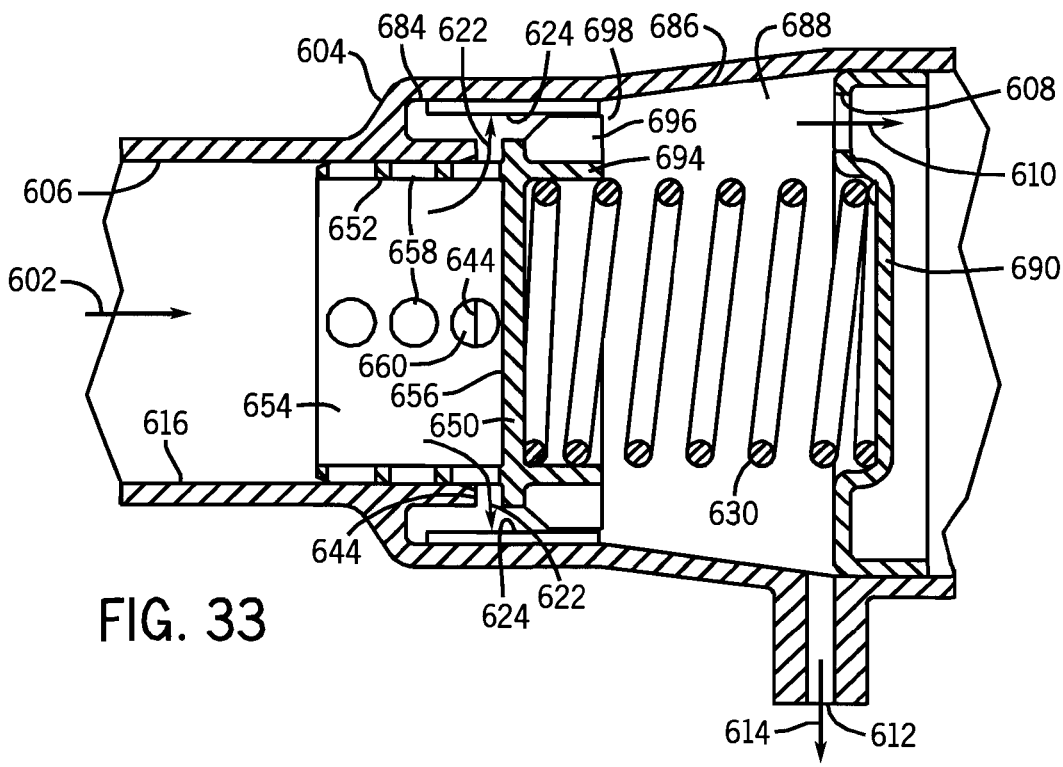

FIG. 33 shows another embodiment and uses like reference numerals from above where appropriate to facilitate understanding. Plunger 650 has a plunger sleeve 652 provided by a circumferential sidewall 654 extending axially upstream from plunger disc 656. The variable orifice jet nozzle structure is formed along plunger sleeve 652 by a plurality of apertures 658 through circumferential sidewall 652 and passing the gas-liquid stream radially outwardly therethrough as shown at arrow 622. Two of the apertures such as 658, 660 are at differing axial locations along circumferential sidewall 654. The greater the downstream axial movement and extension of plunger sleeve 652 relative to housing sleeve 616 the greater the number of exposed apertures 660, 658, etc. beyond downstream axial end 644 of housing sleeve 616 which are radially exposed to inertial impactor collector 624.

Figure 34:
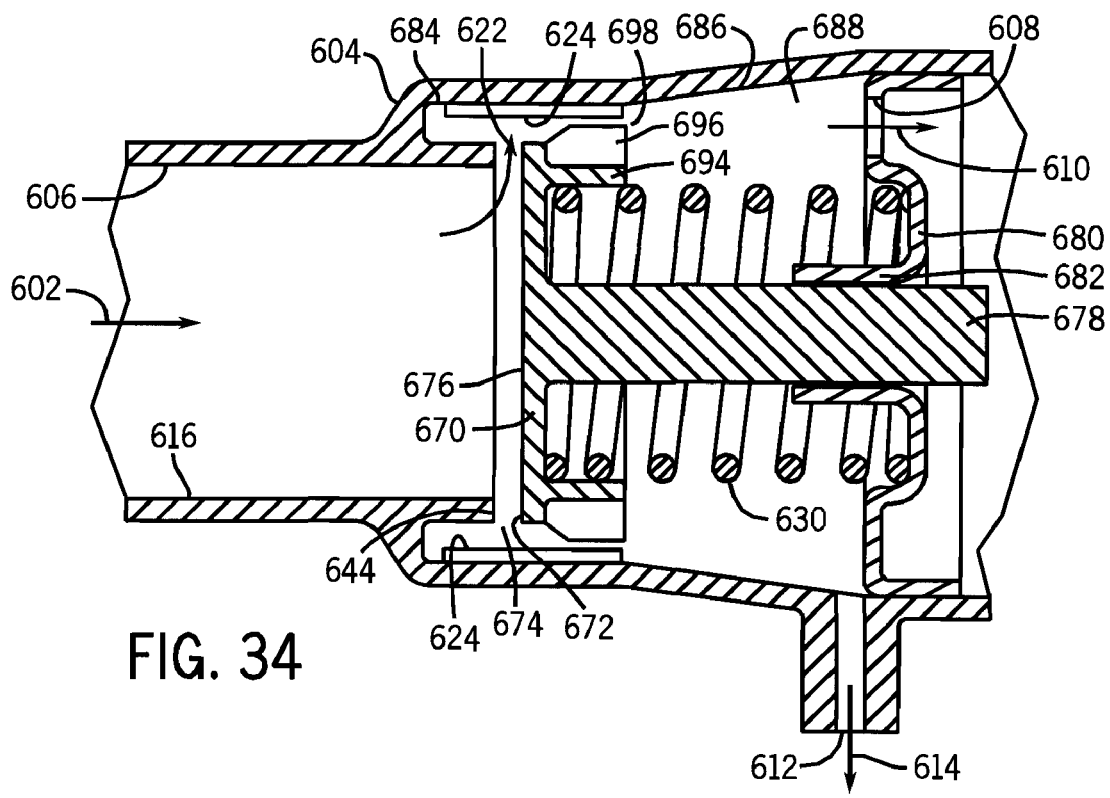
Figure 35:
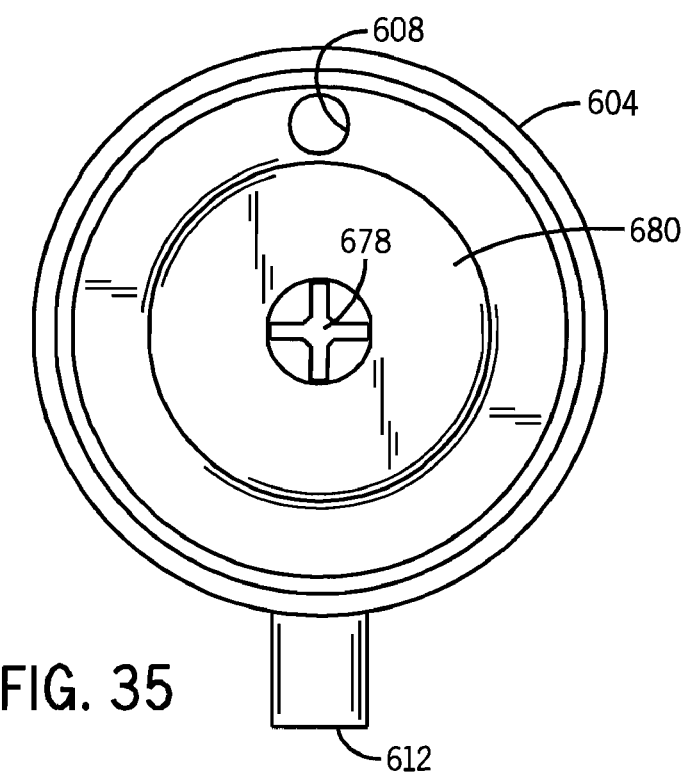

FIGS. 34, 35 show another embodiment, and use like reference numerals from above where appropriate to facilitate understanding. Plunger 670 has a flange 672 facing upstream toward downstream axial end 644 of housing sleeve 616 and variably separable therefrom by a variable axial gap 674 therebetween providing the variable orifice area through which the gas-liquid stream flows radially outwardly as shown at arrow 622 against inertial impactor collector 624. Variable axial gap 674 is dependent upon axial movement (left-right in FIG. 34) of plunger 670. Flange 672 is an outer circumferential perimeter of disc 676. Plunger 670 has a downstream position with flange 672 axially spaced downstream (rightwardly in FIG. 34) from downstream axial end 644 of housing sleeve 616 and with variable axial gap 674 being a continuous annulus passing the gas-liquid stream radially therethrough as shown at arrow 622 and against inertial impactor collector 624. Plunger 670 has a stem 678, FIGS. 34, 35, extending axially downstream (rightwardly in FIG. 34) from disc 676. A bracket 680 is mounted in the housing downstream of inertial impactor collector 624 and receives stem 678 in axially slidable relation at sleeve 682 to guide axial movement of plunger 670.

The housing sleeve, FIGS. 32-34, includes an upstream housing sleeve as shown at 616 having a downstream axial end 644, and includes a downstream housing sleeve 684 having an inner surface having inertial impactor collector 624 thereon and facing radially inwardly toward the noted variable orifice jet nozzle structure. Downstream housing sleeve 684 extends axially downstream (rightwardly in FIGS. 32-34) from inertial impactor collector 624 along a taper 686 providing increased plenum volume 688. A bracket 690 in FIGS. 32, 33, 680 in FIG. 34, is mounted in the housing and provides a wall spanning the downstream housing sleeve 684 downstream of the inertial impactor collector and the plunger and the drain port. Opening 608 through the wall provides the noted outlet discharging the gas stream therethrough as shown at arrow 610. Drain port 612 is gravitationally below outlet 608. The separated liquid and the gas stream flow axially downstream (rightwardly in FIGS. 32-34) from inertial impactor collector 624 in the same axial direction along downstream housing sleeve 684. Helical compression spring 630 axially bears between the respective bracket 690, 680 and the plunger 618, 650, 670 and biases the plunger in an upstream axial direction (leftwardly in FIGS. 32-34).

Figure 36:
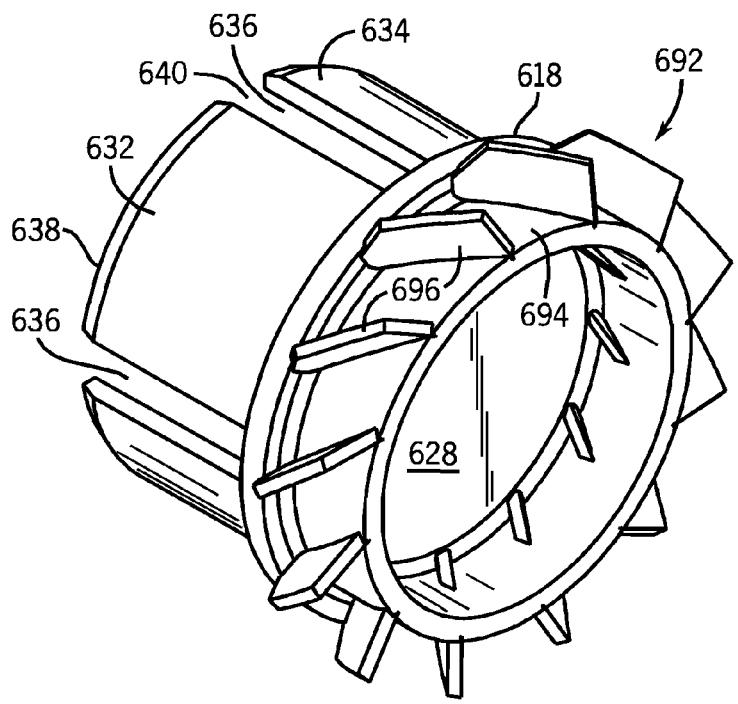

Post-impaction vortex flow separation structure 692, FIG. 36, is provided in the housing downstream of inertial impactor collector 624 and creating swirling divergent vortex flow aiding removal of separated liquid particles. Plunger 618 has a plunger skirt 694, FIGS. 32, 36, extending axially downstream (rightwardly in FIG. 32) from the area of liquid particle separation. Plunger skirt 694 has a plurality of angled directional vanes 696, FIG. 36, creating the swirling divergent vortex flow. Plunger skirt 694 and vanes 696 provide the noted post-impaction vortex flow separation structure. Downstream housing sleeve 684 is spaced radially outwardly of plunger skirt 694 by an annular space 698. Vanes 696 extend from plunger skirt 694 radially outwardly into annular space 698. Downstream plunger skirt 694 and vanes 696 may be provided on plungers 650, 670 as shown.

Figure 37:
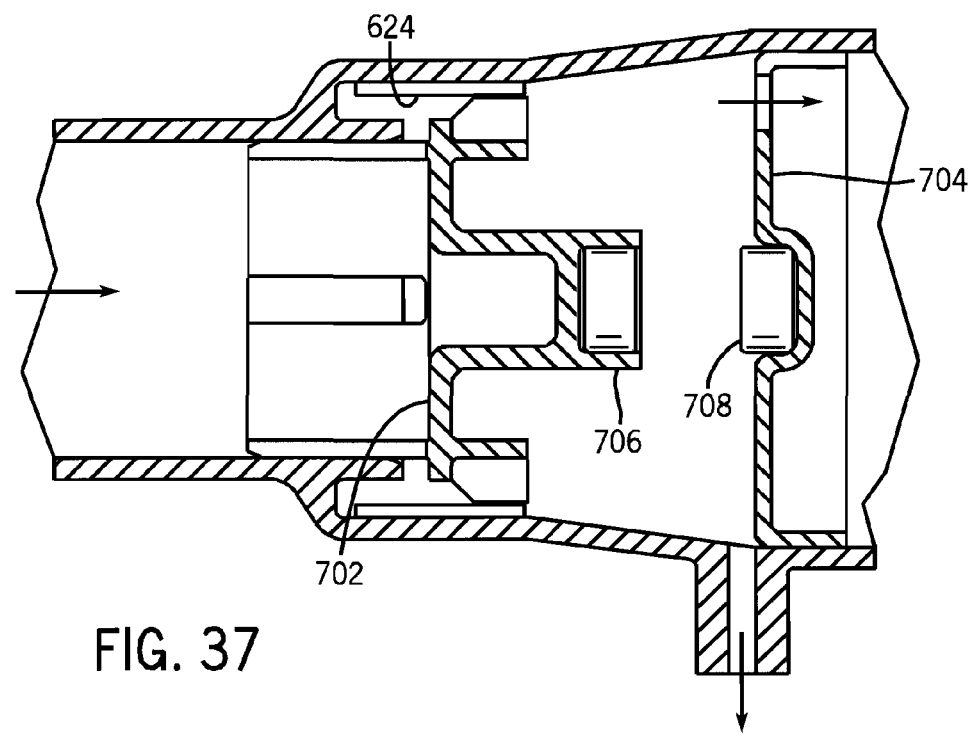

FIG. 37 shows a further embodiment and uses like reference numerals from above where appropriate to facilitate understanding. Plunger 702 is magnetically biased in the upstream axial direction (leftwardly in FIG. 37). Bracket 704 in the housing is downstream of inertial impactor collector 624. First and second opposing magnets 706 and 708 are provided, with the first magnet 706 being on plunger 702, and the second magnet 708 being on bracket 704. Magnets 706 and 708 apply opposing repelling magnetic force therebetween to magnetically bias plunger 702 in the upstream axial direction (leftwardly in FIG. 37).

Present Application

FIG. 38 shows an inertial gas-liquid separator 720 for removing liquid particles from a gas-liquid stream 722. A housing 724 directs the gas-liquid stream from upstream to downstream therethrough. The housing has an inlet 726 receiving the gas-liquid stream, an outlet 728 discharging a gas stream as shown at arrow 730, and a drain port 732 discharging separated liquid 734. The housing has a housing sleeve 736 directing gas-liquid flow axially along axis 738 along a downstream axial flow direction (downwardly in FIG. 38) against an axially movable plunger 740 which is biased by spring 742 in an upstream axial direction (upwardly in FIG. 38) against the downstream axial flow. Variable nozzle orifice jet structure 744 co-acts between housing sleeve 736 and plunger 740 and accelerates the gas-liquid stream radially therethrough as shown at arrow 746 against an inertial impactor collector 748 in the housing for liquid particle separation. The variable orifice jet nozzle structure has a variable orifice area variable along axial direction 738 and dependent upon axial movement of plunger 740 relative to housing sleeve 736. FIG. 38 shows the plunger in a downwardly extended open position. FIG. 39 shows the plunger in an upwardly retracted closed position.

Plunger 740, FIGS. 38, 39 has a laterally spanning disc 750 facing axially upstream (upwardly in FIGS. 38, 39) and impinged by the gas-liquid stream 722 flowing axially downstream through housing sleeve 736 and against disc 750. The greater the pressure of the gas-liquid stream the greater the axial downstream movement of plunger 740 against the bias of spring 742 and the greater the variable orifice area at 744. Plunger 740 has a plunger sleeve 752 extending axially upstream from disc 750 and telescopically axially slidable along housing sleeve 736 in guided relation. Variable orifice jet nozzle structure 744 is formed along plunger sleeve 752. The plunger sleeve is axially telescopically movable between retracted and extended positions, FIGS. 39 and 38 respectively, relative to housing sleeve 736. The extended position is in the downstream axial direction against the bias of spring 742 and increases the variable orifice area at 744.

Plunger sleeve 752 is provided by a circumferential sidewall 754 extending axially upstream from disc 750. The variable orifice jet nozzle structure formed along plunger sleeve 752 is provided by one or more axially elongated slots 756 extending axially along and radially through the sidewall and passing the gas-liquid stream radially therethrough, as shown at arrow 746. Slots 756 define legs 758 therebetween formed by portions of the circumferential sidewall. Legs 758 are circumferentially spaced by slots 756 therebetween and extend axially upstream from disc 750 to respective radially outwardly extending feet 760. Feet 760 have a respective first stop surface 762 facing axially downstream (downwardly in FIG. 39). Housing 724 has a second stop surface 764 facing axially upstream (upwardly in FIG. 39) and spaced axially downstream from first stop surface 762. The biasing member 742 is a compression spring circumscribing legs 758 and slots 756, and having an upstream axial end 766 bearing against first stop surface 762, and having a downstream axial end 768 bearing against second stop surface 764. Legs 758 and feet 760 retain compression spring 742 without additional spring-retention support components.

Housing 724, FIGS. 38, 39 has permeable first sidewall 770 spaced radially outwardly of variable orifice jet nozzle structure 744 by a first gap 772 through which the gas-liquid stream is accelerated, FIG. 38. Inertial impactor collector 748 is at first sidewall 770. The housing has a second sidewall 774 spaced radially outwardly of first sidewall 770 by a second gap 776. Inertial impactor collector 748 is permeable and is provided by coalescing media and enables partial flow-through of the gas-liquid stream, such that a portion of the gas-liquid stream, as shown at arrow 778 in FIG. 38, undergoes liquid particle separation by inertial impaction at inertial impactor collector 748, and another portion of the gas-liquid stream, as shown at arrow 780, undergoes liquid particle separation by coalescence in the noted coalescing media. The housing has a post-impaction-separation flow path flowing axially in first gap 772 as shown at arrow 778, and has a post-coalescence-separation flow path flowing axially in second gap 776 as shown at arrow 780.

FIGS. 40-42 show an inertial gas-liquid separator 790 for removing liquid particles from a gas-liquid stream 792. A housing 794 directs the gas-liquid stream 792 from upstream to downstream therethrough. The housing has an inlet 796 receiving the gas-liquid stream 792, an outlet 798 discharging a gas stream as shown at 800, and a drain port 802 discharging separated liquid as shown at arrow 804. The housing has a housing sleeve 806 directing gas-liquid flow axially along axis 738 along a downstream axial flow direction (upwardly in FIGS. 40-42) against an axially movable plunger 808 which is biased by spring 810 in an upstream axial direction (downwardly in FIG. 40) against the noted downstream axial flow. Variable nozzle orifice jet structure 812 co-acts between housing sleeve 806 and plunger 808 and accelerates the gas-liquid stream radially therethrough against an inertial impactor collector 814 in the housing for liquid particle separation. The acceleration is not shown in FIG. 40 because the plunger is in the downwardly retracted closed position. Variable orifice jet nozzle structure 812, FIG. 41, has a variable orifice area variable along axial direction 738 and dependent upon axial movement of plunger 808 relative to housing sleeve 806.

Plunger 808, FIGS. 40, 41, has a laterally spanning disc 816, FIG. 40, facing axially upstream (downwardly in FIG. 40) and impinged by the gas-liquid stream 792 flowing axially downstream (upwardly in FIG. 40) through housing sleeve 806 and against disc 816. The greater the pressure of the gas-liquid stream 792 the greater the axial downstream movement of plunger 808 upwardly against the bias of spring 810 and the greater the variable orifice area at 812. Plunger 808 has a plunger sleeve 818 extending axially upstream (downwardly in FIGS. 40, 41) from disc 816 and telescopically axially slidable along housing sleeve 806 in guided relation. Variable orifice jet nozzle structure 812 is formed along plunger sleeve 818.

Plunger sleeve 818 is axially telescopically movable between retracted and extended positions relative to housing sleeve 806, the extended position being in the downstream axial direction (upwardly in FIG. 40) against the bias of spring 810 and increasing the variable orifice area at 812. Plunger sleeve 818 is provided by a circumferential sidewall 820 extending axially upstream from disc 816. Variable orifice jet nozzle structure 812 formed along plunger sleeve 818 is provided by one or more axially elongated slots 822 extending axially along and radially through sidewall 820 and passing the gas-liquid stream radially outwardly therethrough. Slots 822 define legs 824 therebetween formed by portions of cylindrical sidewall 820. Legs 824 are circumferentially spaced by slots 822 therebetween and extend axially upstream from disc 816. Spring 810 bears between axially facing stop surfaces 826 and 828 of plunger 808 and housing 794, respectively.

Housing 794, FIG. 40, has a permeable first sidewall 830, FIGS. 40, 42, spaced radially outwardly of variable orifice jet nozzle structure 812 by a first gap 832 through which the gas-liquid stream is radially accelerated. Inertial impactor collector 814 is at first sidewall 830. The housing has a second sidewall 834 spaced radially outwardly of first sidewall 830 by a second gap 836. Inertial impactor collector 814 is permeable and is provided by coalescing media and enables partial flow-through of the gas-liquid stream therethrough, such that a portion of the gas-liquid stream undergoes liquid particle separation by inertial impaction at inertial impactor collector 814, and another portion of the gas-liquid stream undergoes liquid particle separation by coalescence in the noted coalescing media. The housing has a post-impaction-separation flow path flowing axially in first gap 832 as shown at arrow 838, and has a post-coalescence-separation flow path flowing axially in second gap 836 as shown at arrow 840.

First sidewall 830 includes a permeable grid 842, FIG. 42, supporting the inertial impactor collector 814 including the noted coalescing media as shown at 844. Grid or framework 842 is fixedly mounted in housing 794 at face or flange 846, and housing sleeve 806 extends axially upwardly thereinto and is circumscribed thereby and is spaced radially inwardly thereof. Second sidewall 834 is provided by a downwardly extending shroud circumscribing second gap 836 and guiding flow downwardly therealong for gravity feed of separated liquid to drain port 802. Housing 794 has third sidewall 848 spaced radially outwardly of second sidewall 834 by a third gap 850. First and second sidewalls 830 and 834 are internal sidewalls within housing 794. Third sidewall 848 is an outer sidewall having outlet 798 therethrough. Third gap 850 is a plenum, with first and second gaps 832 and 836 merging in plenum 850, and the plenum 850 communicating the gas stream from first and second gaps 832 and 836 to outlet 798. Likewise in FIG. 38, housing 724 has a third sidewall 852 spaced radially outwardly of second sidewall 774 by a third gap 854. First and second sidewalls 770 and 774 are internal sidewalls within housing 724. Third sidewall 852 is an outer sidewall having outlet 728 therethrough. Third gap 854 is a plenum, with first and second gaps 772 and 776 merging in plenum 854, and the plenum 854 communicating the gas stream from first and second gaps 772 and 776 to outlet 728.

In each of the embodiments in FIGS. 38-42, the inertial impactor collector 748, 814, is spaced radially outwardly of the variable orifice jet nozzle structure 744, 812 by a gap 772, 832 providing a radial acceleration zone. The radial acceleration zone has first and second axial extension spans, e.g. at 778 and 856 in FIG. 38, extending axially distally oppositely (e.g. axially downwardly and upwardly), from the radial acceleration zone, to provide multi-directional jet deflection at the inertial impactor collector, including first and second opposite axial directions therefrom. This is significant because testing has found that increased separation efficiency results when the flow may deflect in multidirectional paths, including opposite axial directions in the orientation of FIGS. 38-42, in contrast to an acceleration path directed at a corner or the like allowing only a 90 degree deflection to only a single axial direction.

The plunger 740, 808 slides axially along the housing sleeve 736, 806 along a respective interface 858, 860 therebetween. The variable orifice jet nozzle structure 744, 812 is provided by one or more axially extending slots formed in at least one of the plunger and the housing sleeve and extending axially along such interface. The slots, such as 756, 822 have a variable exposed axial length according to axial movement of the respective plunger 740, 808. The slots have a width transverse to the noted length. The orifice area is equal to the length times the width. The slots have an aspect ratio defined by the length divided by the width. The plunger preferably has a working axial displacement range along axis 738 controlling the noted aspect ratio and preferably limiting the aspect ratio to a value less than 10, and further preferably less than 5. At aspect ratio values less than 10, separation efficiency continually increases until an aspect ratio of 1 is reached. At aspect ratios less than 1, separation efficiency starts to decrease again. At aspect ratios greater than 10, there is little change in separation efficiency.

In the embodiment of FIGS. 40-42, grid or framework 842 is preferably a plastic cage co-molded with inertial impactor collector 814 and the coalescing media 844 thereof and spaced radially outwardly of variable orifice jet nozzle structure 812 by the noted gap 832 through which the gas-liquid stream is radially accelerated. Coalescing media 844 also provides impaction media for the inertial impactor collector, and cage 842 supports and holds media 844 in a circular shape without sonic bonding, whereby to avoid the difficulty of attempting to sonically bond a cylindrical media to a cylindrical support as comparably done for flat impaction media. This provides desirable manufacturing quality and efficiency. Cage 842, including media 844 co-molded therewith, is preferably press-fit into lower housing section 864. Plunger 808 is preferably snap-fit into the housing after spring 810 is installed, namely plunger 808 is preferably snap-fit axial-insertion mounted in housing 794 at plunger ears 861 which are inserted axially upwardly and snap-fit past housing ears 862 which deflect laterally and then snap-fit behind and under plunger ears 860, which axial snap-fit insertion engagement retains spring 810 in place.

Housing 794 has first and second mating opposing housing sections 864 and 866. Inlet 792 and housing sleeve 806 are part of first housing section 864. Outlet 798 and plunger 808 are part of second housing section 866. Plunger 808 is biased by compression spring 810 bearing between plunger 808 at plunger stop surface 826 and spring-stop surface 828 in second housing section 866. Plunger 808 is snap-fit mounted to second housing section 866 independently of first housing section 864 as a self-contained subassembly with compression spring 810 trapped and retained in place and compressed between plunger 808 and spring-stop 828 including during assembly and disassembly of first housing section 864 to second housing section 866. Plunger 808 is trapped in and axially reciprocal in second housing section 866 whether or not second housing section 866 is assembled to first housing section 864. Plunger 808 slides axially along housing sleeve 806 along interface 860 therebetween. Variable orifice jet nozzle structure 812 is provided by the noted one or more axially extending slots 822 formed in at least one of the plunger and the housing sleeve and extending along interface 860. Plunger 808 has axially extended and retracted positions, namely upwardly and downwardly, respectively, in the orientation of FIGS. 40-42. The plunger is in the extended position during high flow rate conditions of gas-liquid stream 792. The plunger is in its retracted position during low flow rate conditions of the gas-liquid stream, including engine idle when used in internal combustion engine blowby applications.

Optionally a low flow rate escape path passage 870, FIG. 41, is formed in at least one of the plunger and the housing sleeve and passes the gas-liquid stream 792 therethrough when plunger 808 is in its retracted position, downwardly as shown in FIG. 40. Likewise, in FIG. 39, a low flow rate escape path passage 872 is optionally formed in at least one of the plunger and the housing sleeve and passes gas-liquid stream 722 therethrough when plunger 740 is in its retracted position, upwardly in FIGS. 38, 39. In the open extended position of the respective plunger 740, 808, axially extending slots 756, 822 are fully open and provide maximum flow therethrough. In the closed retracted position of the respective plunger, the slots are closed and shut-off. Low flow rate escape path passage 872 is open when plunger 740 is in its closed retracted position (upwardly in FIGS. 38, 39). Low flow rate escape path passage 870 is open when plunger 808 is in its closed retracted position (downwardly in FIGS. 40, 41). Low flow rate escape path passages 872, 870 are formed through the respective plunger and through which the gas-liquid stream flows when the plunger is in the closed retracted position. In some cases, if the application allows a non-zero cracking pressure (pressure at which the valve opens, i.e. plunger 740, 808 lifts off its respective valve seat, e.g. 872, 882 to be described), the low flow rate passage 872, 870 is not necessary and may be undesirable because it reduces the impaction efficiency since it decreases the jet velocity (i.e. decreases pressure drop) at low flow conditions.

In FIG. 39, at least one of the slots, such as slot 756a has a greater axial length than at least others of the slots 756 by a given additional axial extension slot length, as shown at 872, wherein the given optional additional axial extension slot length 872 remains unclosed when plunger 740 is in its closed retracted position (upwardly in FIG. 39). Gas-liquid stream 722 flows through the noted given additional axial extension slot length 872 when plunger 740 is in its closed retracted position (upwardly in FIG. 39). In FIG. 41, at least one of the slots, e.g. slot 822a, has a greater axial length than at least others of the slots 822 by a given additional axial extension slot length, e.g. as shown at 870. The noted given optional additional axial extension slot length 870 remains unclosed when plunger 808 is in its closed retracted position (downwardly in FIG. 40). Gas-liquid stream 792 flows through the given additional axial extension slot length 870 when plunger 808 is in its closed retracted position.

Plunger 740, FIG. 39, has the noted laterally extending disc or flange 750 with a valve surface 874 facing upstream (upwardly in FIG. 39). Housing sleeve 736 has a valve seat 876 facing downstream (downwardly in FIG. 39) and engaged by valve surface 874 of disc 750 in the closed retracted position of plunger 740 to close and shut-off axial slots 756. The noted given additional axial extension slot length 872 extends along disc 750 and passes flow therethrough when valve seat 876 is engaged by valve surface 874. Plunger 740 at valve surface 874 engages housing sleeve 736 at valve seat 876 in closed-valve relation when plunger 740 is in its closed retracted position (upwardly in FIG. 39), and is movable to an open-valve condition (downwardly to the position in FIG. 38) in response to a pressure drop overcoming a valve cracking pressure including the bias of spring 742. Low flow rate escape path passage 872 remains open at pressure drops below the noted cracking pressure.

Plunger 808, FIGS. 40, 41, has a laterally extending disc or flange 878 with a valve surface 880 facing upstream (downwardly in FIGS. 40, 41). Housing sleeve 806 has a valve seat 882 facing downstream (upwardly in FIG. 40) and engaged by valve surface 880 of disc 878 in the closed retracted position of plunger 808 to close and shut off axial slots 822. The noted given additional axial extension slot length 870 extends along disc 878 and passes flow therethrough when valve seat 882 is engaged by valve surface 880. Plunger 808 at valve surface 880 engages housing sleeve 806 at valve seat 882 in closed-valve relation when plunger 808 is in its closed retracted position (downwardly in FIG. 40), and is movable to an open-valve condition in response to a pressure drop overcoming a valve cracking pressure including the bias of spring 810. Low flow rate escape path passage 870 remains open at pressure drops below the noted cracking pressure.

Axial movement of the plunger 740, 808 from its retracted to its extended position increases the axial length of the noted slots 756, 822 uncovered by the respective housing sleeve 736, 806, for increased flow. Axial movement of the plunger 740, 808 from its extended to its retracted position decreases the axial length of the slots 756, 822 uncovered by the housing sleeve 736, 806, for decreased flow. Plunger 740 as the noted annular sidewall 754 defining a hollow interior 884. Variable orifice jet nozzle structure is provided by the noted plurality of axially extending slots 756 formed radially through sidewall 754 and spaced around the annulus of the sidewall. Gas-liquid stream 722 flows axially downwardly in hollow interior 884 and then radially outwardly through slots 756. Plunger 808 has the noted annular sidewall 820 defining a hollow interior 886. Variable orifice jet nozzle structure 812 is provided by the noted plurality of axially extending slots 822 formed radially through sidewall 820 and spaced around the annulus of the sidewall. Gas-liquid stream 792 flows axially upwardly in hollow interior 886 and then radially outwardly through slots 822.

In FIGS. 38, 39, inertial impactor collector 748 is stationary in housing 724, and plunger 740 moves relative to inertial impactor collector 748. In FIGS. 40-42, inertial impactor collector 814 is stationary in housing 794, and plunger 808 moves relative to inertial impactor collector 814.

In another embodiment as illustrated in FIGS. 43-45, inertial impactor collector 890 is mounted to plunger 892 and moves therewith relative to housing 894. Inertial gas-liquid separator 895 is provided for removing liquid particles from gas-liquid stream 896 and includes the noted housing 894 directing gas-liquid stream 896 from upstream to downstream through the housing. Housing 894 has an inlet 898 receiving the gas-liquid stream 896, an outlet 900 discharging a gas stream as shown at arrow 902, and a drain port 904 discharging separated liquid as shown at arrow 906. Housing 894 has a housing sleeve 908 directing gas-liquid flow 896 axially along axis 738 along a downstream axial flow direction (upwardly in FIGS. 43-45) against axially movable plunger 892 which is biased by spring 910 in an upstream axial direction (downwardly in FIG. 43) against the noted downstream axial flow. Variable nozzle orifice jet structure 912 co-acts between housing sleeve 908 and plunger 892 and accelerates the gas-liquid stream radially therethrough against inertial impactor collector 890 in the housing for liquid particle separation. Variable orifice jet nozzle structure 912 has a variable orifice area variable along axial direction 738 and dependent upon axial movement of plunger 892 relative to housing sleeve 908, as above.

A permeable first sidewall 914 is mounted to plunger 892 by radial spokes 916, FIG. 44, extending radially outwardly from plunger 892 to an outer cage 918 supporting media 914 and spacing the permeable sidewall provided by media 914 radially outwardly of variable orifice jet nozzle structure 912 by a gap 920, FIG. 43, through which the gas-liquid stream is accelerated radially outwardly. Inertial impactor collector 890 is at sidewall 914. Housing 894 has a second sidewall 922 spaced radially outwardly of first sidewall 914 by a second gap 924. Inertial impactor collector 890 is permeable and includes coalescing media 914 and enables partial flow-through of the gas-liquid stream therethrough, such that a portion of the gas-liquid stream undergoes liquid particle separation by inertial impaction at inertial impactor collector 890, and another portion of the gas-liquid stream undergoes liquid particle separation by coalescence in the coalescing media 914. Housing 894 has a post-impaction-separation flowpath flowing axially in first gap 920 as shown at arrow 926. The housing has a post-coalescence-separation flowpath flowing axially in second gap 924 as shown at arrow 928. First sidewall 914 includes a permeable grid or cage as shown at 918 supporting inertial impactor 890 including coalescing media 914. Second sidewall 922 is provided by a shroud extending downwardly in the housing and circumscribing second gap 924 and guiding flow downwardly therealong for gravity feed of separated liquid to drain port 904.

Housing 894 has a third sidewall 930 spaced radially outwardly of second sidewall 922 by a third gap 932. First and second sidewalls 914 and 922 are internal sidewalls within housing 894. Third sidewall 930 is an outer sidewall having the noted outlet 900 therethrough. Third gap 932 is a plenum, with first and second gaps 920 and 924 merging in the plenum, and the plenum 932 communicating the gas stream from first and second gaps 920 and 924 to outlet 900.

Grid or framework 918 is preferably a plastic cage co-molded with the inertial impactor collector and spaced radially outwardly of variable orifice jet nozzle structure 912 by gap 920 through which the gas-liquid stream is accelerated radially outwardly. Inertial impactor collector 890 preferably includes impaction media 914, and cage 918 supports and holds the media in a circular shape without sonic bonding. Cage 918, including media 914 co-molded therewith, is mounted to and spaced radially outwardly of plunger 892 by radial spokes 916. Plunger 892, including cage 918, is snap-fit axial-insertion mounted in the housing, preferably by plunger ears 934 axially inserted upwardly and snap-fit past housing ears 936 which deflect laterally outwardly and then snap back behind and below ears 934, with spring 910 held in place and axially bearing between plunger stop surface 938 and housing stop surface 940, as above.

Housing 894 has first and second mating opposing housing sections 942 and 944. Inlet 898 and housing sleeve 908 are part of first housing section 942. Outlet 900 and plunger 892 are part of second housing section 944. Plunger 892 is biased by compression spring 910 bearing between plunger 892 at plunger stop surface 938 and spring-stop surface 940 in second housing section 944. Plunger 892, including inertial impactor collector 890 mounted thereto, is snap-fit mounted to second housing section 944 independently of first housing section 942 as a self-contained subassembly with compression spring 910 trapped and retained in place and compressed between plunger 892 and spring stop 940 including during assembly and disassembly of first housing section 942 to second housing section 944. Plunger 892, including inertial impactor collector 890 mounted thereto, is trapped and axially reciprocal in second housing section 944 whether or not second housing section 944 is assembled to first housing section 942. Plunger 892 includes axially extending slots 946 comparable to slots 822 above.

FIGS. 46, 47 show an alternate plunger 950 for use in the above constructions. The plunger has an outer surface 952 facing radially outwardly toward housing sleeve 954. The variable orifice jet nozzle structure is provided by one or more slots 956 extending axially along axis 738 and provided by respective grooves in outer surface 952 of the plunger and extending axially therealong. Grooves 956 have an axially extending length and a laterally extending width. At least one of the grooves tapers to a varying width as it extends axially, e.g. a larger lateral width 958 as compared with lateral width 960. Preferably each of the grooves has a first section 962 extending axially from a first end 964 to a second end 966, and the groove has an optional second section 968 extending radially outwardly from second end 966 of first section 962. Plunger 950 is axially reciprocal between extended and retracted positions in sleeve 954. Axial movement of plunger 950 from its retracted to its extended position (e.g. upwardly in FIG. 47) increases the axial length of first section 962 of the groove uncovered by housing sleeve 954, for increased flow. Axial movement of plunger 950 from its extended to its retracted position (e.g. downwardly in FIG. 47) decreases the axial length of first section 962 of the groove uncovered by housing sleeve 954, for decreased flow. Second section 968 of the groove remains open and uncovered by housing sleeve 954 when plunger 950 is in its retracted position (downward in FIG. 47). This is desirable for accommodating engine idle when used in internal combustion engine blowby applications, for the reasons noted above in conjunction with low flow rate escape path passages 872, 870. Second section 968 of the groove provides this low flow rate escape path passage. The flow is accelerated against inertial impactor collector 970. A plate 972 is secured to the plunger, e.g. by a screw 974 threaded into central threaded bore 976. Compression spring 978 bears between plate 972 and stop surface 980 of housing 982. Increasing gas-liquid flow stream pressure from inlet 984 against plunger disc surface 986 overcomes the bias of spring 978 to increase the axial length of first section 962 of groove 956 to provide increased flow, as above.

In further embodiments, the radially accelerated gas-liquid jet blowby flow impacts on a solid surface covered by media at 770, 830, 914, rather than a permeable backing surface. The housing has an axially extending backing 770, 830, 914 supporting the inertial impactor collector 748, 814, 890, respectively, and spaced radially outwardly of the variable orifice jet nozzle structure 744, 812, 912, respectively, by a gap 772, 832, 920, respectively, through which the gas-liquid stream is accelerated. In one embodiment, the inertial impactor collector is provided by the noted impaction media, and backing 770, 830, 914 supports and holds the media in a circular shape without sonic bonding, whereby to avoid the difficulty of attempting to sonically bond a cylindrical media to a cylindrical support as comparably done for flat impaction media. In a further embodiment, the backing 770, 830, 914 is provided by a plastic cage as above noted co-molded with the inertial impactor media. In another embodiment, the backing 770, 842 is a separator support member stationarily mounted in the housing. In one embodiment, separator support member 842 is press-fit mounted in the housing. In a further embodiment, the backing 918 is a separator support member snap-fit mounted in the housing. In a further embodiment, the backing 918 is a separator support member mounted to plunger 892 and movable therewith in the housing. In a further embodiment, plunger 892 and separator support member 918 are snap-fit mounted in the housing. In further embodiments, the separator support member 770, 842, 918, the sidewalls 770, 830, 914, and/or the inertial impactor collector 748, 814, 890 are selected from the group consisting of a solid surface, a semi-permeable surface, a permeable surface, or a combination of these. In further embodiments, one or more of the noted additional gaps and sidewalls are eliminated, e.g. 776, 774, 836, 834, 924, 922.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein:
said plunger has a laterally spanning disc facing axially upstream and impinged by said gas-liquid stream flowing axially downstream through said housing sleeve and against said disc, the greater the pressure of said gas-liquid stream the greater the axial downstream movement of said plunger against the bias thereof and the greater said variable orifice area;
said plunger has a plunger sleeve extending axially upstream from said disc and telescopically axially slidable along said housing sleeve in guided relation;
said variable orifice jet nozzle structure is formed along said plunger sleeve;
said plunger sleeve is axially telescopically movable between retracted and extended positions relative to said housing sleeve, said extended position being in said downstream axial direction against said bias and increasing said variable orifice area;
said plunger sleeve comprises a circumferential sidewall extending axially upstream from said disc;
said variable orifice jet nozzle structure formed along said plunger sleeve comprises one or more axially elongated slots extending axially along and radially through said sidewall and passing said gas-liquid stream radially therethrough;
said slots define legs therebetween formed by portions of said circumferential sidewall;
said legs are circumferentially spaced by said slots therebetween and extend axially upstream from said disc to respective radially outwardly extending feet;
said feet have a respective first stop surface facing axially downstream;
said housing has a second stop surface facing axially upstream and spaced axially downstream from said first stop surface;
and comprising a compression spring circumscribing said legs and said slots, and have an upstream axial end bearing against said first stop surface, and have a downstream axial end bearing against said second stop surface.

2. The inertial gas-liquid separator according to claim 1 wherein said legs and said feet retain said compression spring without additional spring-retention support components.

3. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein:
said housing has a permeable first sidewall spaced radially outwardly of said variable orifice jet nozzle structure by a first gap through which said gas-liquid stream is accelerated;
said inertial impactor collector is at said first sidewall;
said housing has a second sidewall spaced radially outwardly of said first sidewall by a second gap;
said inertial impactor collector is permeable and comprises coalescing media and enables partial flow-through of said gas-liquid stream, such that
a portion of said gas-liquid stream undergoes liquid particle separation by inertial impaction at said inertial impactor collector, and
another portion of said gas-liquid stream undergoes liquid particle separation by coalescence in said coalescing media;
said housing has a post-impaction-separation flow path flowing axially in said first gap;
said housing has a post-coalescence-separation flow path flowing axially in said second gap.

4. The inertial gas-liquid separator according to claim 3 wherein:
said first sidewall comprises a permeable grid supporting said inertial impactor collector including said coalescing media;
said second sidewall comprises a shroud circumscribing said second gap and guiding flow downwardly thereaolong for gravity feed of separated liquid to said drain port.

5. The inertial gas-liquid separator according to claim 4 wherein:
said housing has a third sidewall spaced radially outwardly of said second sidewall by a third gap;
said first and second sidewalls are internal sidewalls within said housing;
said third sidewall is an outer sidewall having said outlet therethrough;
said third gap is a plenum, with said first and second gaps merging in said plenum, and said plenum communicating said gas stream from said first and second gaps to said outlet.

6. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein:
said inertial impactor collector is spaced radially outwardly of said variable orifice jet nozzle structure by a gap providing a radial acceleration zone;
said radial acceleration zone has first and second axial extension spans extending axially distally oppositely from said radial acceleration zone to provide multi-directional jet deflection at said inertial impactor collector, including first and second opposite axial directions therefrom.

7. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein said plunger slides axially along said housing sleeve along an interface therebetween, and said variable orifice jet nozzle structure comprises one or more axially extending slots formed in at least one of said plunger and said housing sleeve and extending axially along said interface.

8. The inertial gas-liquid separator according to claim 7 wherein:
said slots have a variable exposed axial length according to axial movement of said plunger;
said slots have a width transverse to said length;
said orifice area is equal to said length times said width;
said slots have an aspect ratio defined by said length divided by said width;
said plunger has a working axial displacement range controlling said aspect ratio and limiting said aspect ratio to a value less than 10.

9. The inertial gas-liquid separator according to claim 8 wherein said aspect ratio is less than 5.

10. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein said housing has an axially extending backing supporting said inertial impactor collector and spaced radially outwardly of said variable orifice jet nozzle structure by a gap through which said gas-liquid stream is accelerated.

11. The inertial gas-liquid separator according to claim 10 wherein said inertial impactor collector comprises impaction media, and said backing supports and holds said media in a circular shape without sonic bonding, whereby to avoid the difficulty of attempting to sonically bond a cylindrical media to a cylindrical support as comparably done for flat impaction media.

12. The inertial gas-liquid separator according to claim 10 wherein said backing comprises a plastic cage co-molded with said inertial impactor media.

13. The inertial gas-liquid separator according to claim 10 wherein said backing comprises a separator support member stationarily mounted in said housing.

14. The inertial gas-liquid separator according to claim 13 wherein said separator support member is press-fit mounted in said housing.

15. The inertial gas-liquid separator according to claim 10 wherein said backing comprises a separator support member snap-fit mounted in said housing.

16. The inertial gas-liquid separator according to claim 10 wherein said backing comprises a separator support member mounted to said plunger and movable therewith in said housing.

17. The inertial gas-liquid separator according to claim 16 wherein said plunger and said separator support member are snap-fit mounted in said housing.

18. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein:
said plunger slides axially along said housing sleeve along an interface therebetween;
said variable orifice jet nozzle structure comprises one or more axially extending slots formed in at least one of said plunger and said housing sleeve and extending along said interface;
said plunger has axially extended and retracted positions;
said plunger is in said extended position during high flow rate conditions of said gas-liquid stream;
said plunger is in said retracted position during low flow rate conditions of said gas-liquid stream, including engine idle when used in internal combustion engine blowby applications;
and comprising at least one low flow rate escape path passage formed in at least one of said plunger and said housing sleeve and passing said gas-liquid stream therethrough when said plunger is in said retracted position.

19. The inertial gas-liquid separator according to claim 18 comprising a plurality of said axially extending slots which are fully open and provide maximum flow therethrough in an open said extended position of said plunger, and which are closed and shut-off in a closed said retracted position of said plunger, wherein said low flow rate escape path passage is open when said plunger is in said closed retracted position.

20. The inertial gas-liquid separator according to claim 19 wherein said low flow rate escape path passage is formed through said plunger and through which said gas-liquid stream flows when said plunger is in said closed retracted position.

21. The inertial gas-liquid separator according to claim 19 wherein at least one of said slots has a greater axial length than at least others of said slots by a given additional axial extension slot length, and wherein said given additional axial extension slot length remains unclosed when said plunger is in said closed retracted position and through which said gas-liquid stream flows when said plunger is in said closed retracted position.

22. The inertial gas-liquid separator according to claim 21 wherein:

said plunger has a laterally extended disc with a valve surface facing upstream;

said housing sleeve has a valve seat facing downstream and engaged by said valve surface of said disc in said closed retracted position of said plunger to close and shut off said axial slots;

said given additional axial extension slot length extends along said disc and passes flow therethrough when said valve seat is engaged by said valve surface.

23. The inertial gas-liquid separator according to claim 19 wherein said plunger engages said housing sleeve in closed-valve relation when said plunger is in said closed retracted position, and is movable to an open-valve condition in response to a pressure drop overcoming a valve cracking pressure including said bias, wherein said low flow rate escape path passage remains open at pressure drops below said cracking pressure.

24. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein:

said variable orifice jet nozzle structure comprises a plurality of axially extending slots along said plunger;

said plunger is axially reciprocal between extended and retracted positions;

axial movement of said plunger from said retracted to said extended position increases the axial length of said slots uncovered by said housing sleeve, for increased flow;

axial movement of said plunger from said extended to said retracted position decreases the axial length of said slots uncovered by said housing sleeve, for decreased flow.

25. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein:

said plunger comprises an annular sidewall defining a hollow interior;

said variable orifice jet nozzle structure comprises a plurality of axially extending slots formed radially through said sidewall and spaced around the annulus of said sidewall;

said gas-liquid stream flows axially in said hollow interior and then radially outwardly through said slots.

26. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein:

said plunger has an outer surface facing radially outwardly toward said housing sleeve;

said variable orifice jet nozzle structure comprises one or more slots comprising respective grooves in said outer surface of said plunger and extending axially therealong.

27. The inertial gas-liquid separator according to claim 26 wherein:

said grooves have an axially extending length and a laterally extending width;

at least one of said grooves tapers to a varying width as it extends axially.

28. The inertial gas-liquid separator according to claim 26 wherein:

at least one of said grooves has a first section extending axially from a first end to a second end;

said one groove has a second section extending radially outwardly from said second end of said first section.

29. The inertial gas-liquid separator according to claim 28 wherein:

said plunger is axially reciprocal between extended and retracted positions;

axial movement of said plunger from said retracted to said extended position increases the axial length of said first section of said groove uncovered by said housing sleeve, for increased flow;

axial movement of said plunger from said extended to said retracted position decreases the axial length of said first section of said groove uncovered by said housing sleeve, for decreased flow;

said second section of said groove remains open and uncovered by said housing sleeve when said plunger is in said retracted position.

30. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein said inertial impactor collector is stationary in said housing, and said plunger moves relative to said inertial impactor collector, and comprising a separator support member supporting said inertial impactor collector and mounted to said housing and spaced radially outwardly of said variable orifice jet nozzle structure by a gap through which said gas-liquid stream is accelerated, wherein said separator support member is permeable.

31. An inertial gas-liquid separator for removing liquid particles from a gas-liquid stream comprising a housing directing said gas-liquid stream from upstream to downstream therethrough, said housing having an inlet receiving said gas-liquid stream, an outlet discharging a gas stream, and a drain port discharging separated liquid, said housing having a housing sleeve directing gas-liquid flow axially along a downstream axial flow direction against an axially movable plunger which is biased in an upstream axial direction against said downstream axial flow, variable nozzle orifice jet structure co-acting between said housing sleeve and said plunger and accelerating said gas-liquid stream radially therethrough against an inertial impactor collector in said housing for liquid particle separation, said variable orifice jet nozzle structure having a variable orifice area variable along said axial direction and dependent upon axial movement of said plunger relative to said housing sleeve, wherein said inertial impactor collector is mounted to said plunger and moves therewith relative to said housing.

32. The inertial gas-liquid separator according to claim 31 comprising a permeable first sidewall mounted to said plunger and spaced radially outwardly of said variable orifice jet nozzle structure by a first gap through which said gas-liquid stream is accelerated, and wherein:
said inertial impactor collector is at said first sidewall;
said housing has a second sidewall spaced radially outwardly of said first sidewall by a second gap;
said inertial impactor collector is permeable and comprises coalescing media and enables partial flow-through of said gas-liquid stream, such that
a portion of said gas-liquid stream undergoes liquid particle separation by inertial impaction at said inertial impactor collector, and
another portion of said gas-liquid stream undergoes liquid particle separation by coalescence in said coalescing media;
said housing has a post-impaction-separation flow path flowing axially in said first gap;
said housing has a post-coalescence-separation flow path flowing axially in said second gap.

33. The inertial gas-liquid separator according to claim 32 wherein:
said first sidewall comprises a permeable grid supporting said inertial impactor collector including said coalescing media;
said second sidewall comprises a shroud circumscribing said second gap and guiding flow downwardly thereaong for gravity feed of separated liquid to said drain port.

34. The inertial gas-liquid separator according to claim 33 wherein:
said housing a third sidewall spaced radially outwardly of said second sidewall by a third gap;
said first and second sidewalls are internal sidewalls within said housing;
said third sidewall is an outer sidewall having said outlet therethrough;
said third gap is a plenum, with said first and second gaps merging in said plenum, and said plenum communicating said gas stream from said first and second gaps to said outlet.

35. The inertial gas-liquid separator according to claim 31 comprising a separator support member supporting said inertial impactor collector and mounted to said plunger and spaced radially outwardly of said variable orifice jet nozzle structure by a gap through which said gas-liquid stream is accelerated.

36. The inertial gas-liquid separator according to claim 35 wherein said inertial impactor collector comprises impaction media, and said separator support member supports and holds said media in a circular shape without sonic bonding.

37. The inertial gas-liquid separator according to claim 35 wherein:
said separator support member, with said inertial impactor collector supported thereby, is mounted to and spaced radially outwardly of said plunger;
said plunger including said separator support member is snap-fit axial-insertion mounted in said housing.

38. The inertial gas-liquid separator according to claim 31 comprising a plastic cage co-molded with said inertial impactor collector and spaced radially outwardly of said variable orifice jet nozzle structure by a gap through which said gas-liquid stream is accelerated.

39. The inertial gas-liquid separator according to claim 38 wherein said inertial impactor collector comprises impaction media, and said cage supports and holds said media in a circular shape without sonic bonding.

40. The inertial gas-liquid separator according to claim 38 wherein:
said cage, including said inertial impactor collector co-molded therewith, is mounted to and spaced radially outwardly of said plunger;
said plunger including said cage is snap-fit axial-insertion mounted in said housing.

41. The inertial gas-liquid separator according to claim 31 wherein:
said housing comprises first and second mating opposing housing sections;
said inlet and said housing sleeve are part of said first housing section;
said outlet and said plunger are part of said second housing section;
said plunger is biased by a compression spring bearing between said plunger and a spring-stop in said second housing section;
said plunger, including said inertial impactor collector mounted thereto, is snap-fit mounted to said second housing section independently of said first housing section as a self-contained subassembly with said compression spring trapped and retained in place and compressed between said plunger and said spring-stop including during assembly and disassembly of said first housing section to said second housing section;
said plunger, including said inertial impactor collector mounted thereto, is trapped and axially reciprocal in said second housing section whether or not said second housing section is assembled to said first housing section.

* * * * *